(12) United States Patent
Sitrick et al.

(10) Patent No.: US 7,098,392 B2
(45) Date of Patent: Aug. 29, 2006

(54) ELECTRONIC IMAGE VISUALIZATION SYSTEM AND COMMUNICATION METHODOLOGIES

(76) Inventors: David H. Sitrick, 820 Burchell, Highland Park, IL (US) 60035; Russell T. Fling, 1369 Green Trails Dr., Naperville, IL (US) 60540

(*) Notice: Subject to any disclaimer, the term of this patent is extended or adjusted under 35 U.S.C. 154(b) by 280 days.

(21) Appl. No.: 10/353,656

(22) Filed: Jan. 29, 2003

(65) Prior Publication Data

US 2003/0110925 A1 Jun. 19, 2003

Related U.S. Application Data

(63) Continuation-in-part of application No. 10/323,526, filed on Dec. 18, 2002, and a continuation-in-part of application No. 09/492,218, filed on Jan. 27, 2000, and a continuation-in-part of application No. 09/039,952, filed on Mar. 16, 1998, now Pat. No. 6,084,168, and a continuation-in-part of application No. 08/677,469, filed on Jul. 10, 1996, now Pat. No. 5,728,960.

(51) Int. Cl.
*G09B 15/08* (2006.01)

(52) U.S. Cl. .......................... 84/477 R; 84/609; 84/615; 84/649; 84/653; 84/483.1

(58) Field of Classification Search ........... 84/600–602, 84/609–610, 615, 649–650, 653, 477 R, 84/478, 483.1, 483.2
See application file for complete search history.

(56) References Cited

U.S. PATENT DOCUMENTS

| | | | | |
|---|---|---|---|---|
| 5,400,687 A | * | 3/1995 | Ishii ........................ | 84/477 R |
| 6,526,424 B1 | * | 2/2003 | Kanno et al. ............... | 715/512 |
| 6,574,625 B1 | * | 6/2003 | Bates et al. ................... | 707/5 |
| 6,740,802 B1 | * | 5/2004 | Browne, Jr. .................. | 84/609 |

\* cited by examiner

*Primary Examiner*—Marlon Fletcher
(74) *Attorney, Agent, or Firm*—Sitrick & Sitrick

(57) ABSTRACT

An electronic image visualization system, such as a music stand system and display, management and communications methodologies relating thereto are presented. The electronic music stand system is comprised of a performer subsystem comprising a processing subsystem, librarian logic, performance logic, and communications management logic. The communications management logic provides management of communication via the communications interface with external apparatus responsive to the performance logic and the librarian logic. The user input apparatus and the display apparatus can be integrated into a touch-screen input display. The user input apparatus can alternatively be at least one of a touch-tablet, a stylus-based writing tablet, a mouse, a keyboard, a joystick, a game controller, and a switch. In a preferred embodiment, the librarian logic, the performance logic and the communications management logic are defined by program data stored in the data storage apparatus, and the processor is responsive to the program data for managing data formatting, displaying music, and management of communications of data with the external apparatus. In one embodiment, two Performer subsystems are operable alternatively as one of a single appliance as a linked set a linked mode and as two independent appliances a stand-alone mode, wherein in the linked mode each of the two Performer subsystems operate cooperatively with each other as a linked set to provide a two page display on the video presentation, and wherein in the stand alone mode each of the two Performer subsystems operates independently and mutually exclusive of the other to provide two independent and mutually exclusive single page displays on the video presentation. The present invention also relates to a method for providing for video display of music responsive to the music data stored in a music database. The method is comprised of defining a page of music image data from the music database; defining ordered logical sections; storing the mapping in a memory for selective retrieval; and providing for the video display of the music responsive to the mapping and the storing.

66 Claims, 27 Drawing Sheets

ELECTRONIC IMAGE VISUALIZATION SYSTEM AND COMMUNICATION METHODOLOGIES

RELATED APPLICATIONS

This is a continuation-in-part application of Ser. No. 10/323,526 filed Dec. 18, 2002—a continuation-in-part application of Ser. No. 09/492,218 filed Jan. 27, 2000—a continuation-in-part application of Ser. No. 09/039,952 filed Mar. 16, 1998, now issued as U.S. Pat. No. 6,084,168—a continuation-in-part application of Ser. No. 08/677,469 filed Jul. 10, 1996, now issued as U.S. Pat. No. 5,728,960.

FEDERALLY SPONSORED RESEARCH OR DEVELOPMENT

Not Applicable.

BACKGROUND OF THE INVENTION

The present invention relates to the field of music. More particularly, the present invention relates to an architecture, system, apparatus and methodology relating to the construction and utilization of a subsystem (or a plurality of subsystems) for displaying musical compositions, either batch or in a real time environment, and processing and communicating music data and/or user performances.

Music is usually only available in the written form for one (or a fixed set of) performer/instrument types in a fixed key. Adaptations or variations of musical arrangements are complex and costly. Remotely located musicians are unable to effectively practice together. Small communities each with only a few musicians are limited to practicing with the few musicians they have.

Performers of music have many inconveniences to deal with. One such inconvenience deals with the composing, distribution, and utilization of music display presentation, traditionally sheet music. Another major problem relates to the inconvenience of scheduling and physical gathering of multiple musicians (including instrumentalists and vocalists), which when combined in their performance provide a musical ensemble or orchestra. For example, high school band practice requires that all students be available to practice at the same time at the same place (i.e., the school music room). However, this creates difficulties in that many students have other activities which conflict with band practice which is then incomplete. Additionally, when composing, musicians often will come up with an idea when physically not with another musician.

Musicians typically work from sheet music. When composing, they write the notes down on paper that has a number of staffs. If the musician transposes a composition from one key to another, the notes are also written down on the staff paper. The scores for different instruments must also be generated and written down. All of the scores are then copied for distribution to other musicians and/or music stores.

When performing, the sheet music must be found, for all parts to be played, manually distributed, manually set-up, manually handled (turn pages, etc.). There is also an unfulfilled need for quick access to a more comprehensive database of music for the performing musician, whether he is solo or part of an orchestra. Also, musicians often perform audience requests, and require access to sheet music for requested songs. Presently, there are various combinations of songs compiled in "FAKE" Books, usually by category (e.g., rock, country, blues, big band, etc.). This is only of limited help. Furthermore, the use of paper sheet music is cumbersome and inconvenient; pages often get damaged or lost, and indexed access is poor and slow.

This method of composing and distributing music is inadequate when the music is used by a band or orchestra that requires hundreds of copies. If the conductor desires the piece to be played in a different key or certain sections of the music edited to suit the conductor's tastes, the composition must be rewritten and the new transposed copy distributed to the band or orchestra. This is a very costly, time-consuming, and laborious task if the orchestra has a large number of members.

Additionally, if the composition does not have a part for a certain instrument, the conductor must generate the required part from the original composition. After the score for the required instruments has been generated, the parts must be copied and distributed to the individual musicians. This, again, is a very costly and laborious task if the band has a large number of musicians requiring different parts. There is a need, therefore, for a more efficient way of transposing, editing, and distributing music scores.

Over the past many years, great advances have been made in the electronic input, storage, and display of music. Electronic bands and orchestras are constructed using computers and MIDI equipment. Programs exist for personal computers (e.g., Apple Macintosh, DOS, and Windows machines) for an individual to use the computer for transposing music, composing music. Programs also exists for automatically inputting music from direct performance (such as directly from a keyboard, electronically through MIDI converters (such as for string instruments), via pickups and microphones, and sequencers, tone generators, etc.) To generate digital data and/or music notation.

Musicians often perform both pre-planned and ad hoc compositions during the course of a performance. It would therefore be desirable to have the ability to access a large database of musical compositions on demand. It would also be desirable to permit communication and synchronization of a music presentation to multiple performing musicians who are playing together. It would also be desirable for a performing musician to have his or her performance of the music input onto an individual music workstation, and stored, and analyzed by an automated system, and/or communicated to one or more other networked (remote) individual music workstations.

SUMMARY OF THE INVENTION

In accordance with the present invention, electronic music stand apparatus system and methodologies relating thereto are presented. The electronic music stand system is comprised of a performer subsystem comprising a processing subsystem, librarian logic, performance logic, and communications management logic. The communications management logic provides management of communication via the communications interface with external apparatus responsive to the performance logic and the librarian logic. The user input apparatus and the display apparatus can be integrated into a touch-screen input display. The user input apparatus can alternatively be at least one of a touch-tablet, a stylus-based writing tablet, a mouse, a keyboard, a joystick, a game controller, and a switch. In a preferred embodiment, the librarian logic, the performance logic and the communications management logic are defined by program data stored in the data storage apparatus, and the processor is responsive to the program data for managing data formatting, displaying music, and management of communications of data with the external apparatus. In one embodiment, two Performer subsystems are operable alternatively as one of a single appliance as a linked set a linked mode and as two independent appliances a stand-alone mode, wherein in the linked mode each of the two Performer subsystems operate cooperatively with each other as a linked set to provide a two page display on the video presentation, and wherein in the stand alone mode each of the two Performer subsystems operates independently and mutually exclusive of the other to provide two independent and mutually exclusive single page displays on the video presentation. The present invention also relates to a method for providing for video display of music responsive to the music data stored in a music database. The method is comprised of defining a page of music image data from the music database; defining ordered logical sections; storing the mapping in a memory for selective retrieval; and providing for the video display of the music responsive to the mapping and the storing. Bookmarking and navigation logic provide for quick, user-friendly navigation through the stored pages of music data, including providing for user marking of locations, entry of bookmark data, etc. A draw mode provides the user with the ability to annotate an image overlay layer presented atop the music page display associated with a specific page and location in the stored music data. These and other aspects and attributes of the present invention will be discussed with reference to the following drawings and accompanying specification.

DETAILED DESCRIPTION OF THE PREFERRED EMBODIMENT

Figure 1:
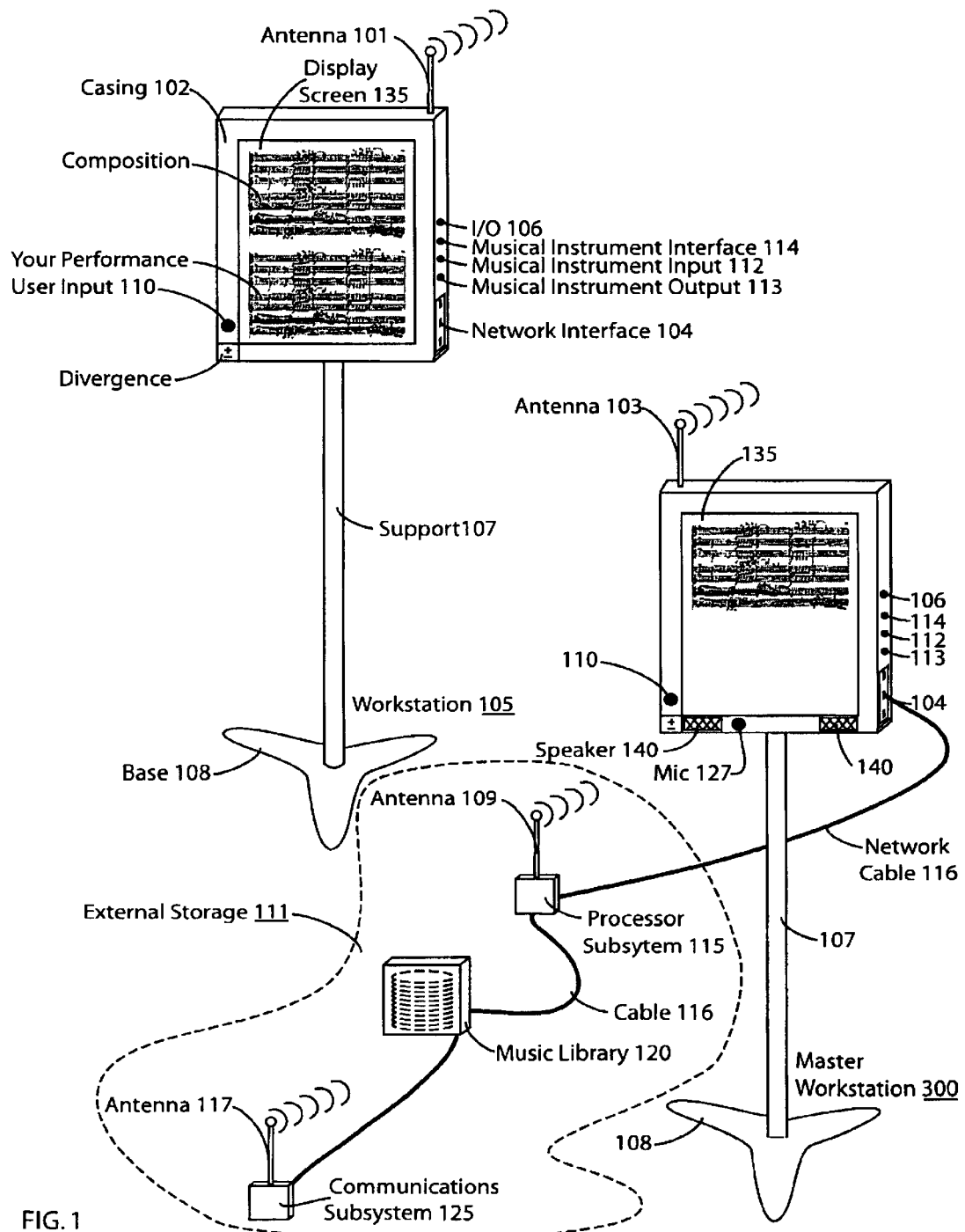
FIG. 1 illustrates two types of music workstations stands, in the form of a music stand (105 or 300) with a liquid crystal display, is used by an operator (e.g., performer, conductor, etc.) to select one or more musical compositions.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

As illustrated in FIG. 1, a system controller, in the form of a music stand (105) with a liquid crystal display, is used by an operator (e.g., performer, conductor, etc.) to select one or more musical compositions. FIG. 1 illustrates two types of music workstations stands. The workstation stand (105) provides certain optional features for a more full-featured stand, including as illustrated, speakers (140) both wireless and wired communications capability, and as illustrated, shows the processor with memory (115) as an external separate component. The master music stand (300) shows the integration of the processor and memory into the music stand itself, and also shows both wireless (antenna (101)) and wired connection (port (107)) to permit network communication. Alternatively, the non-master conductor stand (105) can have all or part of the features integrated into the master music stand (300). Depending on the function for which the music workstation stand will be used, some or all of the features can be provided for that stand to minimize costs or optimize versatility. For example, in one situation, only the teacher or conductor needs the full-featured, full-powered music workstation. In that case, the performers or students do not have a full-feature workstation, but rather a scaled-down version of the workstation stand. In the preferred embodiment, a user input device (110) (such as a touch screen, microphone, keyboard, switches, voice recognition system, visual recognition system, etc.) is coupled to the processor in a wired (such as over a cable or fiber optic link) or wireless (such as over an RF link or infrared link) manner for workstation stand (105), or directly to the processor, where it is built into the system controller as a workstation. The user can select an original musical composition from the touch screen of the liquid crystal display (135). The processor responds by storing that composition in the memory (113) of the local workstation of the user as requested.

Using the touch sensitive LCD (135), the user can now create a derivative musical composition. The touch sensitive LCD allows the user to selectively enter the musical key in which the original composition will be played, edit any notes desired, and select the instruments and parts that will be playing the composition. The composition as originally composed, and the derivative or modified composition can be played back to the user over speakers (140) so that he or she may listen (e.g., such as to observe how the changes will sound) while optionally permitting simultaneous viewing of the score on the presentation visual display. Once the score has been designated (e.g., selected, edited, etc.) to the users (e.g., conductor's) taste, the appropriate portions (e.g., by musical instrument) of the scores can then be transmitted for (optional storage and) display to the respective associated individual music workstation stands of the band members.

In a preferred embodiment, each stand has an input device (110) that permits the user of the stand to select which instrument will be using the stand. (As discussed above, this input device can take the form of a touch sensitive screen or a number of buttons or switches or voice or audio recognition, etc.)

In the preferred embodiment, each individual music workstation stand (105) can be directly and/or remotely programmed to addressably receive (and optionally to locally convert) and display the music score that is intended for the respective instrument type (user type) that will be using (is associated with) the stand. As an example, the user of the stand (or a remote conductor) can input their selection of saxophone into the user input device (110) of the workstation stand (105), to program that workstation stand (105) only to display and/or receive the musical score for the saxophone (see FIG. 9). Then, the musical scores for all selected parts can be independently broadcast to all connected workstation stands, with each individual workstation stand individually distinguishing and displaying/accepting only its part. Alternatively, each workstation stand can be individually addressed for separate broadcast reception of its own respective selected part. Additionally, the user of the stand can program the user input to select a musical part of a selected musical composition (e.g., saxophone first chair) and receive only the musical score intended for that chair. This same procedure can be followed for other instruments within the band or orchestra. Alternatively, a single music composition can be broadcast to all workstations, where each workstation has local intelligence (processing and storage) to permit local conversion for display at each workstation for the selected instrument for each workstation. Alternatively, all workstations can be loaded with all the parts, and then individually enabled to display only selected parts.

For wireless communications, the individual music workstation stands (105) are comprised of receivers (or transceivers where bi-directional communication is desired) and antennas (101, 103) for receiving (or transceiving) the radio frequency information from (and to) the master workstation (such as for the conductor). The music stand also has a display (such as an LCD (135)) for displaying the musical score intended for that stand.

The form of the musical score communication can be easily shaped to fit needs. One example is MIDI (Musical Instrument Digital Interface standard) which has advantages such as of bandwidth of storage used, is widely available commercially, is standardized, etc. However, signal processing, text, icon-based, object based, and various other forms of storage, user interface, and processing can also be applied to more specific applications of product.

A workstation for an oboe may have a built in slide boom with a featherweight microphone to be able to receive sound input from the oboe. Electric instruments, such as guitars, keyboards, and other electrical analog signal sources can be fed directly to a line input that is appropriately buffered and filtered. Signal input can also be accommodated through a MIDI-interface sub-system that permits both utilization of data in workstation to workstation communications and utilization of MIDI-output at the station where the data was input.

The workstation further includes an optional musical instrument input (112) and a musical instrument output (113) that permit the coupling of a musical instrument via a musical instrument interface (114) directly to the workstation. Thus, a keyboard, electric guitar through appropriate input, or a microphone input through the interface (114) permits instruments or voices to be directly input to the workstation for direct input independent of the microphone (127). See also FIG. 2.

It is well known in the art to convert user analog audio input into a digital format, ranging from straight Analog to Digital (e.g., A/D) conversion to processed data conversion to encoded digital music data, such as MIDI. Examples of MIDI include guitar input or other stringed instrument input through microphones or directly to MIDI-converters, or voice/non-pickup instruments through microphone converted to MIDI-input, or keyboard MIDI-input. Such input systems are commercially available from numerous companies for numerous types of interfaces at numerous interface levels. Similarly, numerous A/D converter subsystems are commercially available at chip and board solution levels (such as from Analog Devices Corporation and from Mattrox Systems).

In accordance with another aspect of the present invention, means are provided to permit a user of the music workstation to accomplish a transposition of a musical composition in pitch, tempo, and otherwise. In a preferred embodiment, the lead voice or instrument can audibly indicate the key via the microphone input or via another type of input stimulus. The workstation can analyze the user input, determine the key, pitch and tempo for a musical composition being partially performed by the user, and adjust and transform the composition to be displayed in the new user desired key, pitch, tempo, etc., either solely for use on that workstation, or communication for use on one or more other workstations. In a networked version, this user input can also be communicated to other workstations for use by one or more of the workstations in transposing, or communicated to a master workstation, which transposes and rebroadcasts the transposed composition.

Alternatively, the user can input the pitch, tempo, and key via the user input (e.g. keypad, joystick, push buttons, voice recognition, playing of an instrument, etc.) and the system performs the transformation and displays (and/or prints out and/or audibly performs) the modified transformed composition for the user. Additionally, where a musical composition is written for one instrument and a different or additional instrument version is desired for simultaneous performance, the user can indicate the other instruments via the user input, and the system will generate the appropriate displays. The workstation can also provide an audio output of the transformed musical composition, either for the individual additional instrument or voice transform and present it, or for the composite of additional versions and the original version, to hear the blended piece.

As illustrated in FIG. 1, the music data can be stored locally on the music workstation (105) or master workstation (300), or can be stored externally (111), such as on a large hard drive or CD ROM jukebox, in a digital format as a music library (120). The music library (120) can be coupled to a processor subsystem (115) for local management, or can be wirelessly coupled via transmitter (125) via antenna (103). Coupling from the processor subsystem (115) can be wireless or cabled (via coupling 116) such as through a shielded cable, fiber optic conductor, switched connection (such as via phone lines), local, or remote. The processor (115) has the local storage capacity (e.g., semiconductor memory, disk storage, etc.) to hold the digitized version of the music composition transmitted to it on request from the library (120), and can provide local user input/output interface and display. The music library can be local or proximately remote from the rest of the system.

The music library can be contained ("stored") on non-volatile storage either locally or at a remote central site containing the entire (or a subset) database of all possible music (that is then downloaded to local storage on request, either real-time at performance time or in advance.)

Alternatively, the music library can be provided on storage medium that can be easily transported and used on site locally with the presentation system. Thus, for example, disk drives, cartridges, FLASH RAM cards, plug-in memory modules, or a CD-ROM or multiple CD-ROMs in a CD-ROM changer can be used to store and contain massive data libraries on musical compositions. While this would be a more expensive route than shared use of a central library, requiring each musical group to obtain libraries on all possible compositions they may want, it has the advantage of speed, flexibility, no need for communication with a separate remote source, and creates a whole new mass marketing area (such as for CDs or Digital Audio Tape (DATs)). Another way of utilizing this technology is to maintain a history of music used, either with the remote music library or local music library. This could be done for many reasons, including copyright royalty assessment, determining a history of musical performances and requests for future use in determining performance itineraries, etc. Alternatively, a hybrid of locally stored and centrally shared libraries can be utilized to optimize cost, speed and flexibility benefits.

A multi CD ROM changer accommodates indexed storage of hundreds of thousands to millions of musical compositions to permit complete stand-alone operation of the user music workstation. Alternatively, an optional built-in or external modem can be provided to permit intercommunication with a remote central music database management system that permits both communication and down loading (and disconnect) for stand alone operation. Thus the workstation can stay on-line, pulling up music as needed, or can request a single or multiple pieces of musical works be provided to it, that are then downloaded from the central database manager. The user workstation then disconnects from the music database management system, and thereafter operates stand-alone where all desired music is stored locally in storage (preferably non-volatile). Storage can be semiconductor, magnetic, optical or any other medium.

Figure 6:
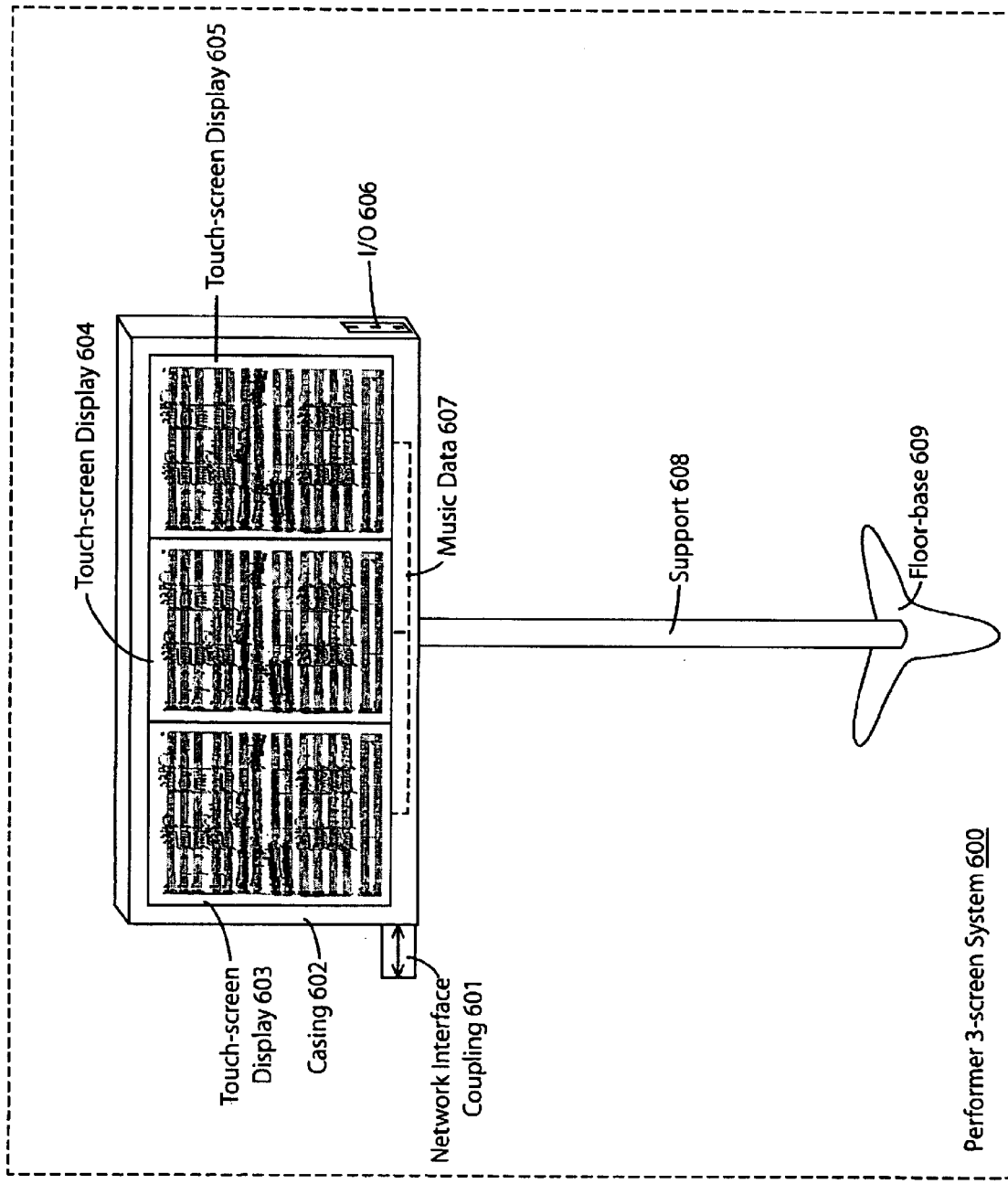
FIG. 6 illustrates an alternate embodiment of an electronic performer music stand system of FIG. 5 but including three display screens.

As described above, the processor subsystem (115) and non-volatile storage (120) music library can be built directly into one of the music workstations (105) to be a master (300), with the other workstations being slaves, that can either include the processor subsystem and non-volatile storage or can be lower cost dummy slave terminals. As illustrated in FIG. 6, a first master workstation (300) provides a basic workstation subsystem (200) plus contains the processor subsystem (280) and non-volatile storage system (285) as a part thereof so as to provide a complete stand alone music communication system, and be capable of acting as a master or master/slave. This master workstation(s) (300) can function as a stand alone, or can couple to one or more other workstations, including one or more masters (300) and/or one or more non-master workstations (105).

The stand alone workstation(s) (105), are coupled to the shared database interface (405), and can either couple remotely (e.g., via phone lines) to the remote shared music database or to a local shared or dedicated music database (410). The shared music database (410) can either be primarily a storage means (e.g., hard disk, DVD or CD-ROM), or can include a processing sub-system (420) for local intelligence. In one embodiment, the stand-alone music workstation includes the shared music database (410) and interface (405), non-volatile local storage medium for the shared databases (410), and a local processing Subsystem (420), and can operate completely stand-alone. In an alternate embodiment of this stand-alone device, the shared database interface is contained in the stand-alone workstation (but not the shared music database or processing subsystem), and provides capability for communication with a stored database (410) remote from the stand-alone device.

Figure 2:
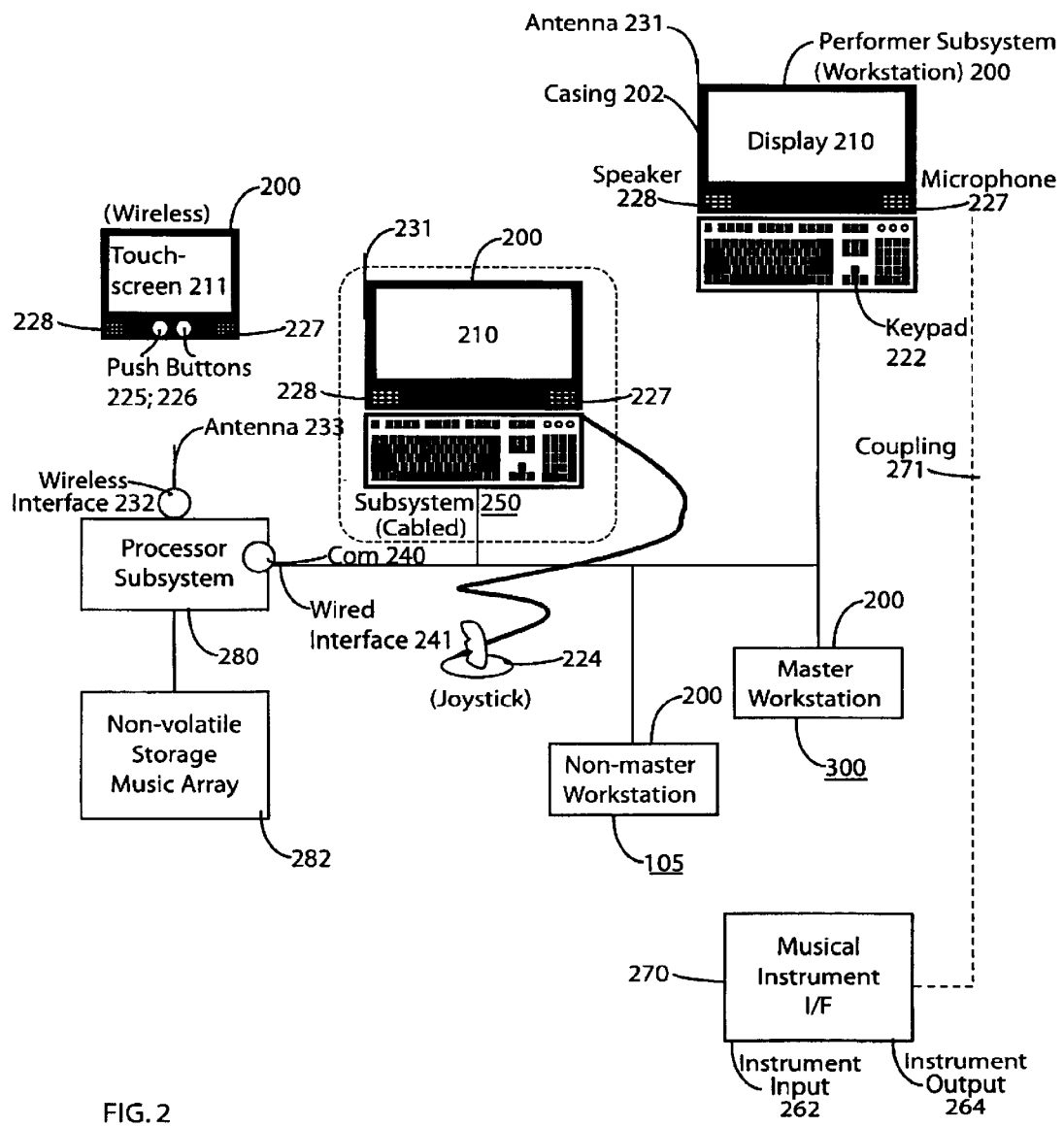
FIG. 2 illustrates a music communication system comprising multiple workstations (200) each comprising a display (210), some with a touch-screen input display (211), others with user input such as a keypad (222), a joystick (224), push buttons (225; 226), a microphone (227), and a speaker (228), communication interface means (240) such as a wireless interface including an antenna (231), or alternatively or additionally a wired or cabled communication interface (240), and a local microcomputer subsystem (250) that provides local intelligence and management of functions in the workstation.

Referring to FIG. 2, a music communication system is illustrated comprising multiple workstations (200) each comprising a display (210), some with a touch-screen input display (211), others with user input such as a keypad (222), a joystick (224), push buttons (225; 226), a microphone (227), and a speaker (228). The workstation also includes communication interface means (240) such as a wireless interface including an antenna (231), or alternatively or additionally a wired or cabled communication interface (240). Each workstation further includes a local microcomputer subsystem (250) that provides local intelligence and management of functions in the workstation. Each workstation can be a master (e.g. (300)) or non-master (e.g. (105)) workstation.

An expert system can be built from commercially available technology, including component hardware systems with supporting software, as well as commercially available software packages which operate on commodity-type personal and business computers such as the Macintosh by Apple Computer, Windows and DOS machines based on the X86 and Pentium processor technology of Intel, technology based on the Power PC and 68XXX processor by Motorola, DEC PDP-11 technology, Sun workstations, Fujitsu, Hitachi, Texas Instruments, etc. Custom microcomputer or DSP based system architecture on a chip can also be constructed, as well as ASICs, custom or semi-custom logic.

Figure 3:
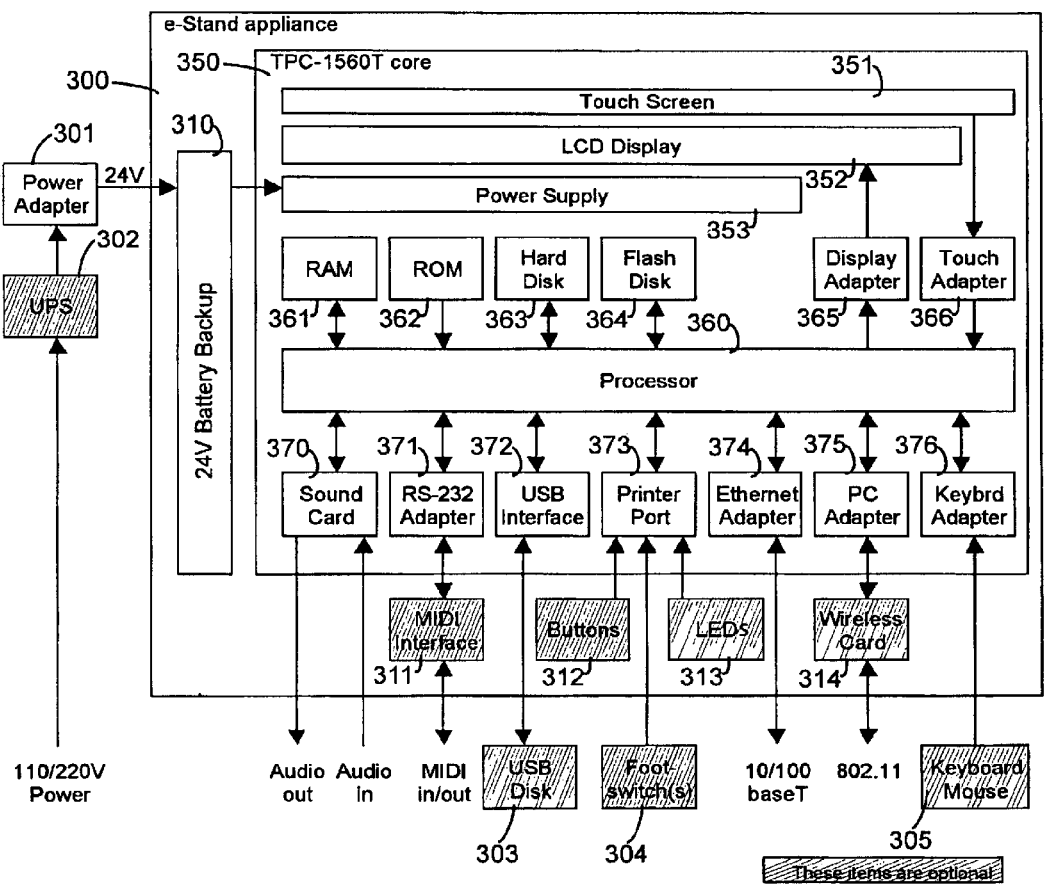
FIG. 3 illustrates a hardware architecture for an electronic Music Performer System (300) and various peripherals using standard components of computer systems.

FIG. 3 illustrates a hardware architecture for an electronic Music Performer System (300) and various peripherals using standard components of computer systems, such as an AC to DC power adapter (301). Optionally, the user may attach an Uninterruptible Power Supply, UPS (302) for backup power and/or high batteries can be provided within the packaging for untethered operation as well as for emergency backups. A USB storage device (e.g. Flash RAM, CD, hard disk (303) is illustrated as one of the optional USB devices that may be attached to the USB interface (372). The USB devices include wireless (e.g. IEEE 802.11 (a) or (b) access point, MIDI to USB Input/Output Bi-directional Interface, keyboards, mouse, touch-pads, video cameras, microphones, speakers, etc. Footswitches (304) can be coupled (wired or wirelessly) to the printer port (373), serial (RS-232) Adapter (371), USB interface (372), etc. A standard keyboard and mouse (305) can be coupled to a separate keyboard adapter (371).

Referring again to FIG. 1, there is illustrated a single (touch-screen input) display embodiment of the electronic music stand performer system (100). The electronics and computing technology is housed within a casing (102), and a single touch-screen input display (135) is provided, along with network connection (103; 104), digital and analog input/output connections (106) (such as for coupling to footswitches, USB connectors, etc.). The vertical support (107). couples to a mounting bracket on the casing (102). The bottom of the vertical support attaches to a floor-base (108). The vertical support (107) and floor-base (108) can be constructed from any commercially available product (such as available from Wenger, Inc., Minneapolis, Mich. or customized construction) as in the description of FIG. 1, providing balanced support for the weight of the equipment atop it, including tripod, teardrop shaped cast iron galumenimenn, etc. The vertical support (107) and floor-base (108) may be the same or different from those provided for the two-screen performer system of FIG. 1. Alternatively, the casing (102) can be handheld with various weight/handprint combinations of color touch screen systems ranging from palm (e.g. PDA) size 3" and under one pound to mobile [e.g. eBook] size 8" and one pound to 10" and 1.6 pounds to 12" or 15" five plus pounds or mounted to another object (from handheld size to stand/piano size e.g. a piano, wall, table, etc., to projection and Arena Size systems (such as are commercially available from Barco Ltd., and other vendors)).

Figure 4:
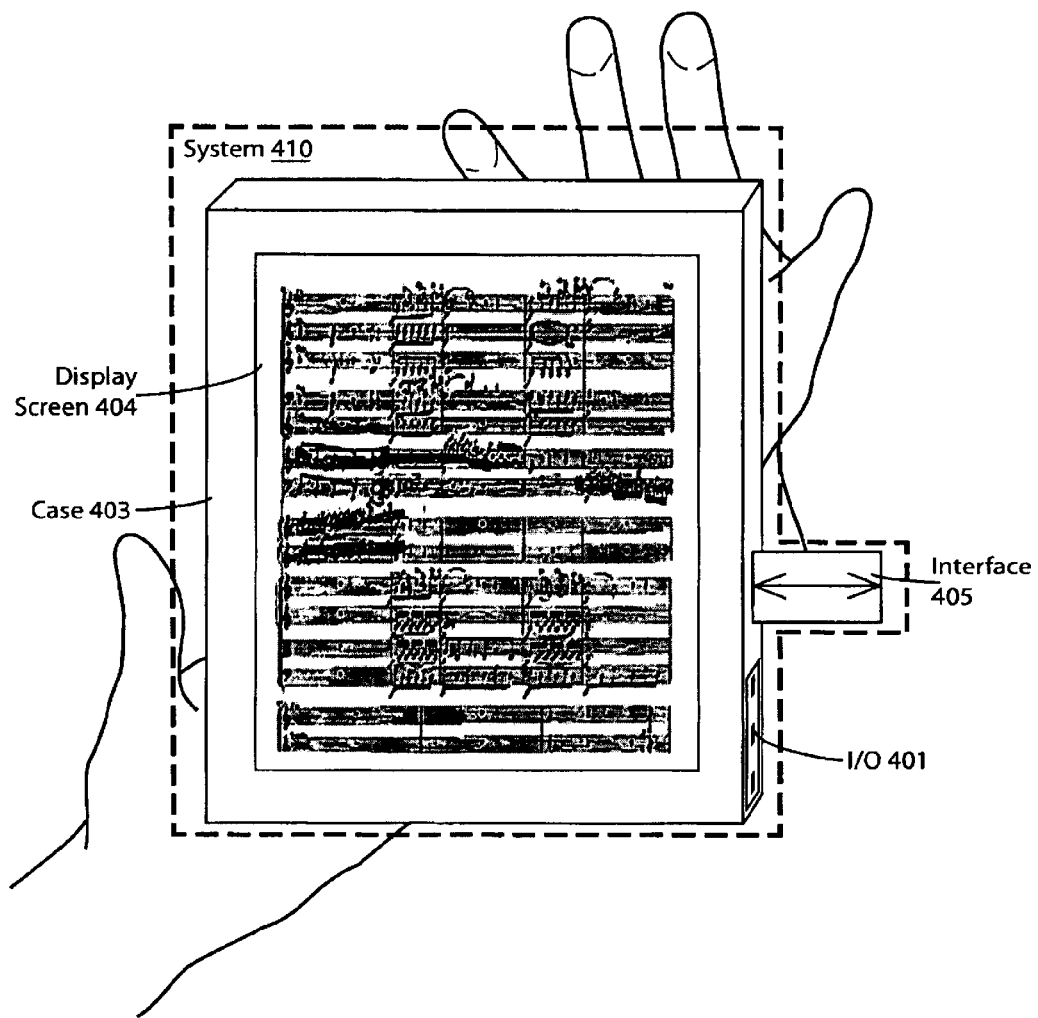
FIG. 4 illustrates a hand-held embodiment (410) of a one-screen electronic music stand performer system (100) of FIG. 1.

FIG. 4 illustrates a hand-held embodiment (410) of a one-screen electronic music stand performer system (100) of FIG. 1. In this embodiment, the system (410) is made to be portable for being held in the hands of a performer, a student, a music librarian, stage hands, a producer, a director, a teacher, etc. The device (410) is preferably battery operated and communicates via wireless means, such as IEEE 802.11 (b) and/or 802.11(a) systems commercially available from numerous venders including Lucent/Orinico, Cisco Systems Inc., Intel, Belden, Apple Computer, and others. Although usually less desirable, AC power and wired communication are also available as options. As illustrated in FIG. 4, the hand-held electronic music stand performer system (410) contains electronics and computing technology housed within a casing (403) and provides for a single touch-screen input display (404). Alternatively, a non-touch-screen input (e.g. touch-pad, mouse, keyboard, switch) and non-touch screen display can form subsystem (404). FIG. 4 also illustrates network communication via coupling (405) (as similarly illustrated in FIG. 1). Input/output coupling are provided via connectors (such as USB, serial) (401) (such as for footswitches), USB, etc. In general, the portable system illustrated in FIG. 4 is lighter in weight, and smaller in size than the systems illustrated in FIG. 1. In an alternate embodiment, the electronic music stand performer system of FIG. 3 can be implemented utilizing a PDA (programmable personal digital assistant) (currently commercial available as Palm Pilot O/S and WinCE apparatus) with appropriate input/output connections, switches, a network interface and custom application software providing presentation logic, librarian logic, communications logic and hardware control.

Figure 5:
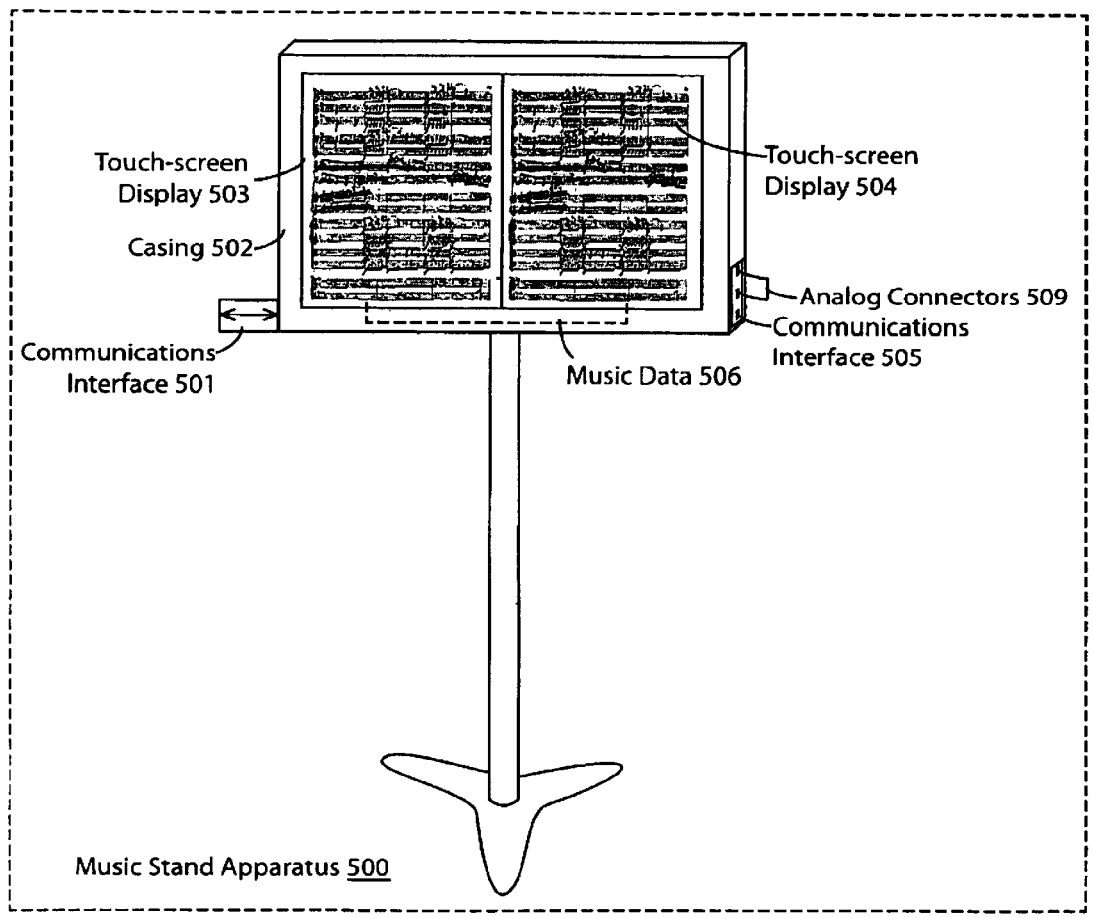
FIG. 5 illustrates two touch-screen displays (503; 504) with a communications interface (501) providing a two-screen display electronic music stand performer system apparatus is illustrated.

Referring to FIG. 5, a two-screen display electronic music stand performer system apparatus is illustrated. The electronic music stand apparatus (500) is comprised of a casing (502) that houses electronics and computing technology comprising: a processor, a non-volatile data storage apparatus, a communications interface, a user interface for user input and a display apparatus which can be combined as a touch-screen input display. FIG. 5 illustrates two touch-screen displays (503; 504). The communications interface (501) provides for coupling to the communications interface of the electronic music stand performer system. Wired and wireless communications interfaces (501; 505, as shown in FIG. 5), are readily commercially available from multiple vendors and via various alternative means, (e.g.: Ethernet, serial, USB, Firewire (IEEE 1364) and IEEE 802.11(a), IEEE 802.11(b), etc.) Digital connectors external to the casing (502) provide for coupling components via the interface (501); examples of components include: footswitches, non-volatile storage devices (e.g., USB Flash/RAM, CD-ROMs, hard-drives, other switches control signal sources etc.) Analog connectors (505) provide for coupling of analog signals such as MIDI, SMPTE, click-track (audio signal), Audio In/Audio Out, variable analog control signal (such as for dimming brightness with house lights in a theater, orchestra pit, or on stage etc., to the interface (501). FIG. 1 shows two pages of display (503; 504) providing for display of image information—illustrated as music data (506). The present invention also includes display of any image data utilized for facilitating or otherwise enhancing performance, including graphics, text animations, video-in-video, instant messaging, collaborative networking of editing and selective or transfer of music composition, announcements, etc. The electronic performer system can also be provided in a modified form for integrated use on the back of seats in the performing venue or part of a Kiosk system in the lobbies of the theater. A centralized server system provides for management of the integrated use systems and for providing the music database.

FIG. 6 illustrates an alternate embodiment of an electronic performer music stand system including three display screens. The three-screen system embodiment (600), is comprised of a base architecture similar to that of FIGS. 1 and 2: a floor-base (609) supports a vertical support (608). The base architecture is coupled to a mounting bracket on a casing (602) that houses electronics and computing technology for the electronic music stand performer three-screen system (600), and the illustrated embodiment comprises three separate touch-screen input displays (603; 604; 605). A network interface coupling (601) and input/output connections (606) are provided analogous to those illustrated in FIGS. 1, 4 and 5. The embodiment of FIG. 6 may be comprised of any number of screens greater than two. The screens may be arranged in any combination of landscape and portrait display orientations. The option of a multiple-page display adds functionality and flexibility with regard to intended use. In this embodiment, a person using the electronic music stand system may view multiple pages at a time. Therefore, several pages may be advanced or reversed in viewing order respective to the number of displays inherent to the system. For example, in the three-screen embodiment of FIG. 4, pages 1, 2 and 3 may be displayed at one time, and upon advancement, pages 4, 5 and 6 may be displayed. In comparison, for example, FIG. 5 illustrates the embodiment with two screens displaying pages 1 and 2 simultaneously, and upon advancement, pages 3 and 4 may be displayed. The screens in all multi-screen embodiments can be positioned side-by-side horizontally, vertically, diagonally, and other ways.

As illustrated in FIG. 2, the processor subsystem (280) includes an appropriate communications interface (240) such as for wired interface (241) or for wireless interface (232) including antenna (233). The processor subsystem couples to a non-volatile storage medium (282) containing, among other things, application programs, transformation programs, and either a shared music library interface application program and/or the actual shared music library and access program.

The processor subsystem can be implemented utilizing a microprocessor, non-volatile storage memory, read/write memory, and whatever additional peripheral circuitry is needed (such as are available in ASICs, or single chip micro-computer chip sets including CPUs, DSPs, A/D, and other input/output and peripheral support circuitry). These single or multiple chip solutions, or single board computing systems, or general purpose computing systems (e.g. running windows, MAC, Lunix, LINUX, Palm O/S, or eBook operating systems), can be utilized to create a dedicated system to perform complete music workstations performance criteria to support an extremely low cost, high volume music workstation solution.

Figure 7A:
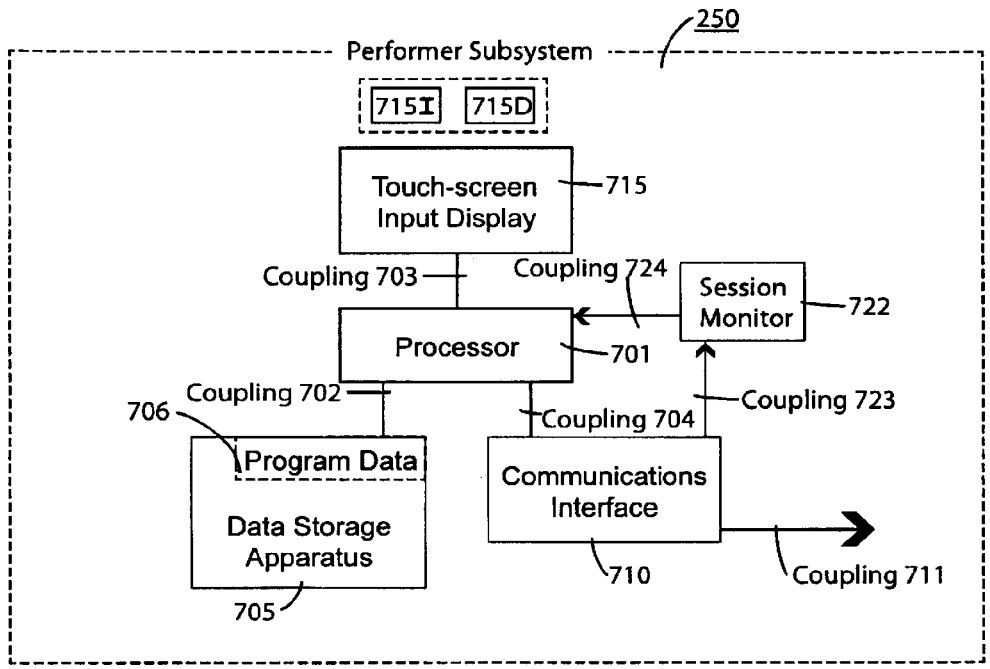
FIG. 7A illustrates an alternate embodiment of the Performer Subsystem (200) implemented utilizing a separate component subsystem (e.g., a single board computer (701; 705; 706; 710) coupled to a component touch-screen display or other input and display subsystems (715).

Referring to FIG. 7A, an alternate embodiment is illustrated. The Performer Subsystem (200) is implemented utilizing a separate component subsystem (e.g., a single board computer (701; 705; 706; 710) coupled to a component touch-screen display or other input and display subsystems (715) (such as from Advantech (U.S.A., Taiwan)). The aforementioned components are commercially available from multiple vendors (see for example EEM, vol. 1–4, 2002; also see IEEE Computer Society; also see product offerings of Intel, AMD, Texas Instruments, Hitachi, Toshiba, and others for all hardware machinery components. Alternatively, they may be custom-designed and engineered to include a specific feature set to provide for optimal enabling of the claimed invention.

The electronics and computing technology are contained within a case (e.g. any of the cases (102; 202; 303; 402)) respectively illustrated and provides housing for one or more Performer Subsystems (100; 200; 300; 310) therein. In a preferred embodiment, each system has a touch-screen input display associated with it as a separate stand-alone performer subsystem. In an alternate embodiment, a single performer subsystem can provide additional display output capability to provide for management of a second or multiple other touch-screen input display utilizing the remainder of the electronics and computing technology of the performer subsystem (200).

In another embodiment, the processing subsystem (processor, data storage apparatus, communications interface, display output and input/output connectors) is coupled to a plurality of display apparatuses with associated input apparatuses that do not utilize touch-screen input technology. Thus, an inexpensive single-board computer can be utilized with an add-on display apparatus, an input apparatus and a storage apparatus.

Figure 7B:
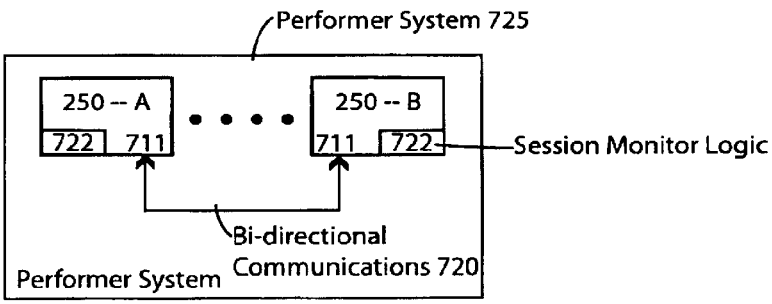
FIG. 7B illustrates two Performer Subsystems (200) (as illustrated in FIG. 7A) coupled together as a linked set via communications interface coupling (711) on each of the Performer Subsystems (200-A; 200-B) via coupling (720), also illustrating the bi-directional communications (220) between the two Performer Subsystems.
Figure 7C:
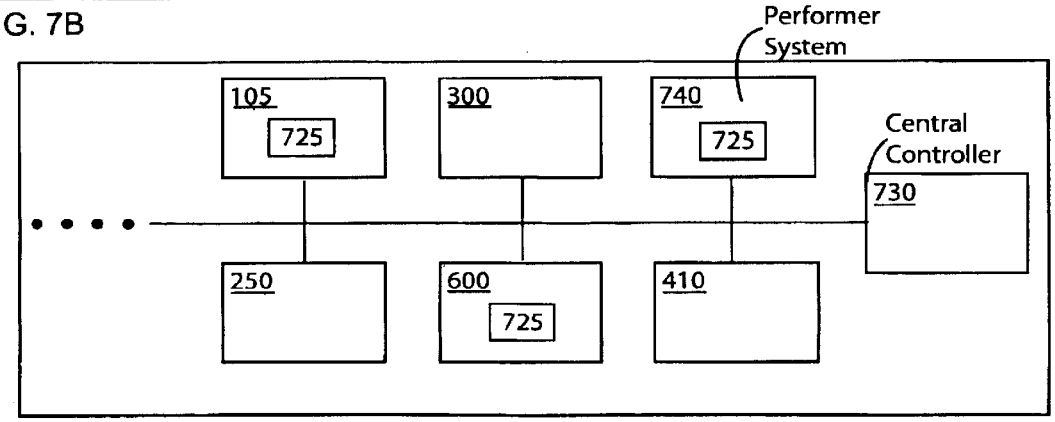
FIG. 7C illustrates the management functions of the communications between the multiple Performer Systems (e.g., (100; 200; 300; 400) illustrated as managed either by centralized controller (730) or alternatively distributed among a plurality of the Performer Systems.

As illustrated in FIGS. 7B and 7C, in addition to the communications between Performer Subsystems (e.g., (200-A; 200-B)) comprising one performer system (e.g., 725), communication interfaces and protocols are provided for data exchange to external subsystems and for other Performer Systems (e.g. (100; 200; 300; 600; 200; 725)). In one embodiment, communications between the Performer Subsystems within the Performer System linked set (intra-communication) and, for communications among the Performer Systems (inter-communication) all utilize a shared communications channel. In an alternate embodiment, separate communications interface channels are provided for intra-communications between Performer Subsystems in a linked set Performer System and for inter-communication among the Performer Systems, wherein communications are via one or multiple communications channels and may utilize any of a variety of technologies including USB, Ethernet, serial, parallel, Firewire, etc. For example, the communication between the Performer Subsystems (200-A; 200-B) may be implemented utilizing one type of communication channel such as Ethernet, USB or serial, and communication among Performer Systems may be implemented utilizing the same communications channel as in the subsystems or a separate communications channel. Thus for example, two separate Ethernet physical connections may be provided to the performer system—one for communication among internal subsystems (intra-communication) (e.g. wired Ethernet) and one for communication with external Performer Systems stand alone or linked (inter-communication) (e.g. wireless). The types of physical connectors for communications from subsystem to subsystem and performer system to performer system can be varied as a matter of design choice.

As illustrated in FIG. 7B, two Performer Subsystems (200) as illustrated in FIG. 7A) are coupled together as a linked set via communications interface coupling (711) on each of the Performer Subsystems (200-A; 200-B) via coupling (720). More than two subsystems (200) can be coupled together in an alternate linked set embodiment. The coupling (720) between the Performer Subsystems (200-A; 200-B) can be provided via a wired or wireless communications interface, e.g., Ethernet, serial, USB, Firewire (IEEE 1364) and IEEE 802.11(a), IEEE 802.11(b), etc. In one embodiment, using Ethernet, each communication interface (710) in a first Performer Subsystem (e.g., 200-A) establishes a listener on a specific port. Another communication interface (710) in another Performer Subsystem (e.g., 200-B) initiates a communication with the listener port in the Performer Subsystem (200-A). A communication session is then established between Performer Subsystems (200-A; 200-B) using mutually negotiated ports on the respective Performer Subsystems. In the linked set embodiment, the two Performer Subsystems (200-A; 200-B) communicate and operate cooperatively to serve as a single two-screen performer system (725) operating as a linked set in an interlinked mode, wherein the two Performer Subsystems (200-A; 200-B) operate as a single electronic music stand performer system appliance providing for synchronous page-turning. The interlinked mode provides for regular communication between the two Performer Subsystems (200-A; 200-B). In an alternate operational mode—the stand-alone mode—the system (725) provides for independent and mutually exclusive operation of each of the two or more Performer Subsystems (200-A; 200-B) as stand-alone electronic music stand Performer Systems. Each stand-alone electronic music stand Performer subsystem (200-A; 200-B) independently provides for page-turning and display within the system (725).

In a preferred embodiment, operation of the linked set in the interlinked mode has an automatic fail-safe operational fallback mode utilized in the interlinked mode operation with two or more Performer Subsystems (200) within the multi-screen linked set performer system (725). In the automatic fail-safe mode, each of the Performer Subsystems (200-A; 200-B) is further comprised of session monitor logic (722) for monitoring the other one or more of the performer subsystems (200-A; 200-B) in the interlinked pair via the communications interface coupling (711). If either performer subsystem (200-A; 200-B) fails to maintain the communications protocol, the remaining performer subsystem converts operation to the stand-alone mode, and continues operation from the time of operation when it detected the communication failure; thereafter continuing in a single page turn mode. System (725) operation is disrupted during the transition between page/screen utilization states: two-page display (one page displayed on each of two display screens) to one-page display (one page displayed on one display screen). However, because the remaining performer subsystem (200-A; 200-B) continues to display data; thereby, maintaining the user's place within the data displayed, operational disruption during the transition is minimized sufficiently so that the user's own performance is not compromised. If the system detects that the communications between the Performer Subsystems (200-A; 200-B) via communications channel (720) have been auto-detected as not performing properly, as indicated by signal (713), and the interlinked system operation is converted to stand alone system operation by the subsystem detecting that the other subsystem in the linked set has failed. In a preferred embodiment, an option is provided for a user manual override of the auto-detect to provide for other operational options.

The system (725) provides for asynchronous or synchronous automatic detection of communications failure via communications channel (720) connecting Performer Subsystems (200-A; 200-B), whereby the interlinked system operation is converted to stand-alone system when communication failure occurs (Insert From 146). Where there are three or more performer subsystems a further option provides automated multi-screen (3+) linked mode (or a user manual override) of the aforementioned automatic detection of communications failure and conversion to stand alone mode. When the performer system (725) is comprised of more than two performer subsystems (200-A, 200-B, 200-N) and two or more subsystems detect failure of one of the other Performer Subsystems (in the automated fail-safe multi-screen (3+) linked mode), and the remaining subsystems operate in the pre-failure configuration mode in the linked mode with the remaining linked subsystem. For example, if the performer system (725) is comprised of four screens of performers subsystem, and one screen subsystem fails, then the system (725) assumes a linked three-screen synchronous page turning mode. Similarly, if the performer system (225) is comprised of three screens, and one screen fails, then the system (725) assumes a two-screen synchronous page turning mode. Finally, if the performer system is comprised of two screens, and one screen fails, then the remaining system assumes a stand-alone mode operation of a single performer subsystem.

Referring to FIGS. 7A and 7B, if the system detects that the communications between the Performer Subsystems (200-A; 200-B) via communications channel (720) have been auto-detected as not performing properly, as indicated by signal (724), and the interlinked system operation is converted to stand alone system operation by the subsystem detecting that the other subsystem has failed. In a preferred embodiment, an option is provided for a user manual override of the auto-detect to provide for other operational options.

As illustrated in FIG. 3, the Electronic Music Performer System (300) is comprised of a Computing Core (350), an optional battery backup (310) and other interfaces such as a MIDI interface (311), Buttons (312), indicator LED's (313) and a Wireless network card (314).

The Computing Core Subsystem (350) is shown as comprised of four main components: Touch-screen (351), LCD Display (352), Power Supply (353) and Processor (360). The Display Adapter (365) couples the Processor (360) to the LCD Display (352). A Touch Adapter (366) couples the touch screen (351) to the Processor (360). Providing support for the Processor (360) are the RAM (361), ROM (362), Hard Disk (363) and Flash Disk (364). Interfacing outside the Computing Core (350) is accomplished by coupling to selected ones of a number of commercially available components including Sound Card (370), RS-232 Adapter (371), USB Interface (372), Printer Port (373), Ethernet Adapter (374), PC Card Adapter (375) and Keyboard Adapter (376).

The Computing Core (360) as illustrated, is commercially available (loaded with Windows 98, XP, 2000 or NT, UNIX, LINUX, WinCE) operating system software (utilizing a Transmeta microprocessor) from Advantech eAutomation, a Taiwanese company having a principal place of business in Cincinnati, Ohio, as Product No. TPC-1560T. Numerous other touch screen computers are available from Advantech, Fujitsu, Acer, and others.

Figure 8:
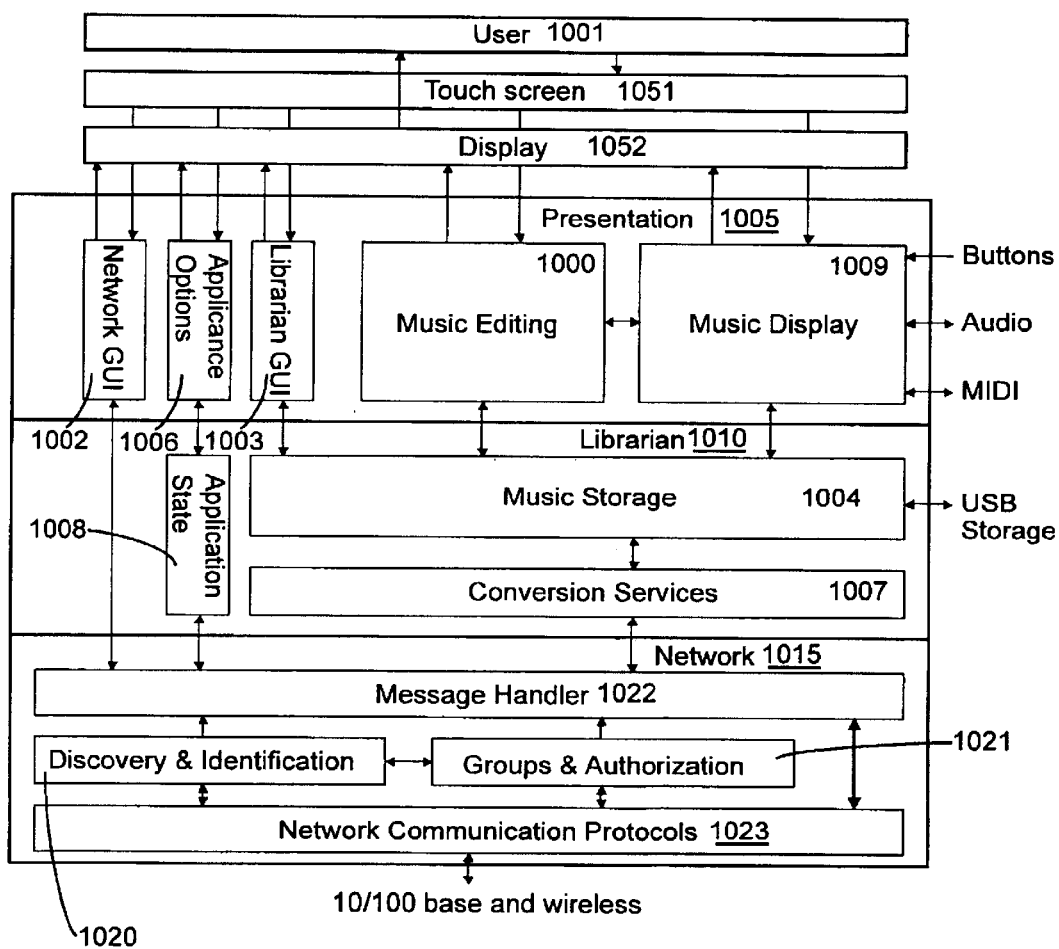
FIG. 8 illustrates the functional and logical interaction of the layers of the software logic architecture of the systems and relative to the physical hardware architecture of the systems of FIGS. 1–7.

FIG. 8 illustrates the functional and logical interaction of the layers of the software logic architecture of the systems and relative to the physical hardware architecture of the systems of FIGS. 1–7.

Where there are a plurality of the performer subsystems, and wherein at least two of the Performer subsystems are coupled to selectively provide a linked set operable via a linked mode as a single cooperative appliance unit, and they are each alternately capable of being operated in the stand-alone mode as two separate appliances. Communications management provides for internal communications between each of the Performer subsystems in the interlinked set that is distinguishable and mutually exclusive from external communications with the other ones (not members of the linked set) of the Performer subsystems.

A Performer Linked System appliance consists of two or more operationally independent Performer appliance Subsystems combined to be one integrated appliance system, to provide multiple screens of displays of the music. Thus, a Performer Subsystem may operate in a stand-alone mode; yet, the same appliance becomes a Performer linked system when operating in the linked mode. The Performer Subsystems must communicate with each other to operate as one integrated system. The communications channel may be comprised of, but is not limited to one of the following: universal serial bus (USB), Ethernet, IEEE 802.11 wireless, RS-232, RS-242, serial communications, parallel communications, and Firewire. The communications link between systems is established and thereafter provides data to each Performer Subsystem to provide an integrated system to the musician. Each Performer Subsystem monitors its associated communications channel and detects whether or not the other linked Performer Subsystems are actively communicating with it. If a Performer Subsystem in a linked set detects that any of the linked subsystems are not active, the remaining Performer Subsystems initiate the creation of a new Performer System with fewer Performer Subsystems. The Performer System automatically configures itself to optimally display the music based upon the total number of linked Performer Subsystems. The Performer Subsystem changes from the linked mode to the stand-alone mode responsive to the aforementioned monitoring and evaluation of associated communications channels (or upon user selection of Stand alone mode). For example, if a Performer System linked set includes three or more linked Performer Subsystems, and one Performer Subsystem loses communication and is no longer active, then the remaining two Performer Subsystems thereafter during operation in the linked set remain in the linked mode.

In accordance with the present invention, user interface is designed to be musician intuitive. For example, upon power-up, the system goes to either a homepage or a defined start page. From the homepage, the user can select, among their features, musical selection management, and an options screen displays. The example that follows illustrates an individual stand alone Performer Subsystem being activated as part of a linked set Performer System. Initially, a soft (display) button (an area on the touch screen display) on the options screen display is pushed by the user to select to combine this appliance (performer subsystem) with its designated other partner appliance. If successfully found this appliance becomes the left screen of the combined linked set display and the other partner appliance becomes the right screen. The soft button display description then changes to match the display. If the user presses the stand-alone mode or stand-alone button when the linked set is combined it causes the appliances to become stand-alone independent appliances again.

As illustrated in FIG. 8, the Appliance State (1008) layer logic is coupled to the Appliance Options logic (1006) of the Presentation Layer logic (1005) and to the Message Handler logic (1022) of the Network Layer logic (1015). The Appliance State logic (1008) stores the current state of the appliance for reference and startup. The current page, orientation, all application options, network options and librarian options are saved. Depending on the Application options settings (1006), this state is fully or partially restored at the startup of the appliance.

In a preferred embodiment, communications among the Performer Systems provide for peer-to-peer communication. All Performer Systems (single screen or multiple screen linked set embodiments) provide for inter-performer system communication. Thus, the conductor's multiple screen performer system can communicate with librarian's performer system, as well as with individual musician's Performer Systems. Preferably, communications between the electronic music stand Performer Systems appliances is hierarchical—levels of priority and clearance are designated for communications. For example, the conductor and librarian may be assigned the highest priority level. The principal chairs for each of the sections in an orchestra may be assigned a lower level of priority than that of the conductor and librarian. In turn, individual performers within the sections may be assigned the lowest level of priority. Control over communications with other systems is directly proportional to priority—higher levels of priority provide greater control over communications; lower levels of priority provide less control over communications. Thus, the librarian or conductor can force communications of information to lower levels, but not vice-versa. Thus, all changes made by the principal violin or viola player can be respectively communicated to all violins or violas, without communicating also to cellos, basses, etc. Sub-groupings and virtual private networks are set-up within the larger communications network architecture of any particular system. For example, a recording studio environment includes a recording engineer, a conductor and players, and/or a conductor, principal chairs and librarians. Hierarchies and groupings of players are respectively determined within the larger network. The hierarchical communications can be directly addressable between the electronic music stands; broadcast to all music stands; communicated to groupings of music stands identified within groupings such as private networks; and/or organized with various priorities assigned to master levels and sublevels as necessary.

Figure 9:
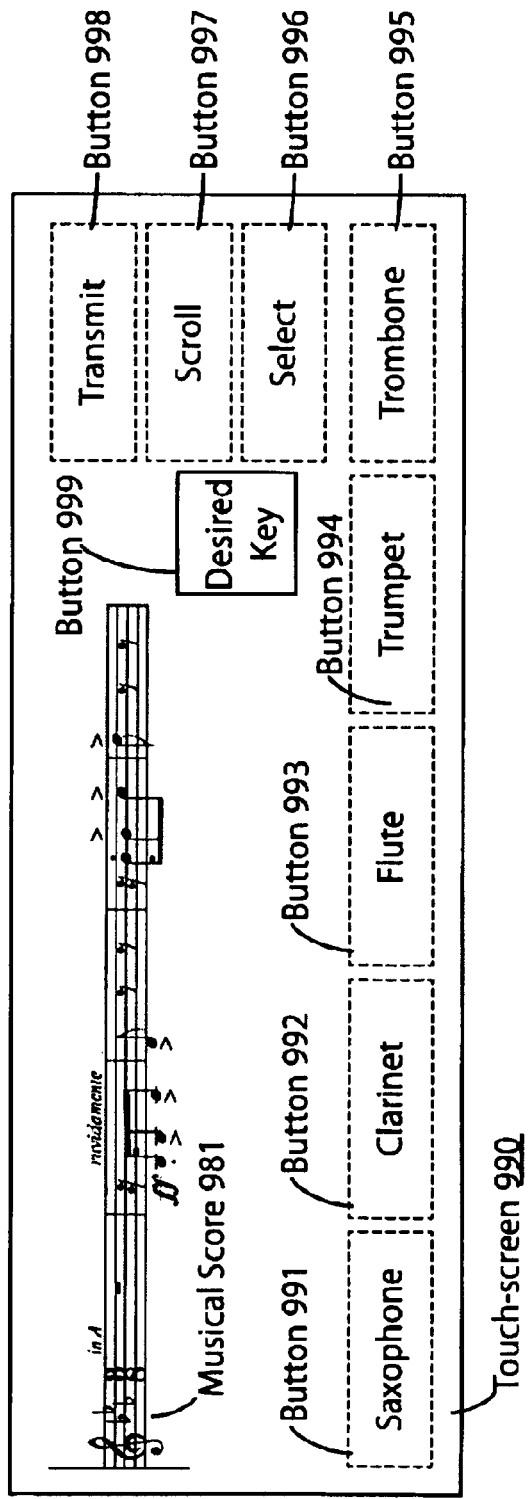
FIG. 9 illustrates one embodiment of an touch sensitive LCD display used for input control and for displaying the information from the processor and memory.

FIG. 9 illustrates one embodiment of an LCD display used for input control and for displaying the information from the processor and memory. In the preferred embodiment, a touch sensitive LCD screen (990) provides the input apparatus for the user interface, and the performer subsystem enables the functions associated with each displayed button (e.g. 991; 992; 993; 994; 995; 996; 997; 998; 999) to various locations as appropriate and permits the functions to be changed, and also for the displayed buttons to be moved around the screen, depending on the function to be activated. The musical score may be edited by the conductor, either by directly drawing via the touch screen, or such as by touching the individual note after which he is presented with a number of notes to replace the touched note. For example, the lower portion of the screen displays instruments from which the conductor can select which instrument will be playing the composition. After a button on this screen has been touched, a number of sub-screens may come up, each with their own individual touch sensitive areas and functions to be activated by those areas. Alternatively, in addition to or instead of the touch screen, the system can provide input via separate key switches, voice recognition, etc.

In one embodiment, an output is provided that permits coupling of an external display, such as a color monitor, projection unit, or other display presentation system including one or more of audio, visual, and audiovisual.

In an alternate additional embodiment, each stand-alone workstation provides the capability to function as a master stand-alone, or a master or slave workstation within a workstation set including multiple stand-alone workstations, wherein one is designated master and the rest are designated slaves. The slave workstations in this configuration receive communication of music compositions to be displayed from the master workstation, thereby permitting one shared music database to be communicated among all workstations which are a part of the group. It is to be appreciated that the shared music database function can be distributed in many different ways among the workstations, or separable from and independent from the workstations. The choice is simply one of design, and the illustration herein should not be taken in a limiting manner.

The display workstation can be implemented as a totally self-contained workstation, where each workstation contains its own processing sub-system, communications interface (such as wireless or cable) for network use, input/output interface including one or more of a user input keypad, a speaker, a microphone, joysticks, push buttons, etc. Each of the stand-alone workstations can then operate with a local database, or couple to a shared music database as illustrated in FIG. 1.

In one wireless embodiment, an RF antenna can be built into the stand (101; 103). Alternatively, instead of using RF, the performer's stands can be linked to one another using infrared, fiber optic cable, shielded cable, or other data transmission technologies. As discussed above, the communications link can be bi-directional, such as to facilitate requests and responses to facilitate the feedback of performance parameters or such that any workstation can be a master or slave, or used in combinations.

Communications interfaces of various types are well known and commercially available, and at the present time, they are available for purchase at the chip, board, or system level from many U.S. and international suppliers. In fact, many presently available single chip microcomputers include built-in communications interface capabilities, wired and wireless, such as from Intel, AMD, Texas Instruments, Hitachi, etc.

The instrument output signal permits coupling of the instrument input signal, either directly fed through or as modified by the workstation, for output to the appropriate public address or amplification and presentation system or separate analysis system. The workstations are coupled either via wired or wireless communication to a processor subsystem (280) that includes a processor, non-volatile memory, read/write memory and an interface to a non-volatile storage medium (582).

Figure 10:
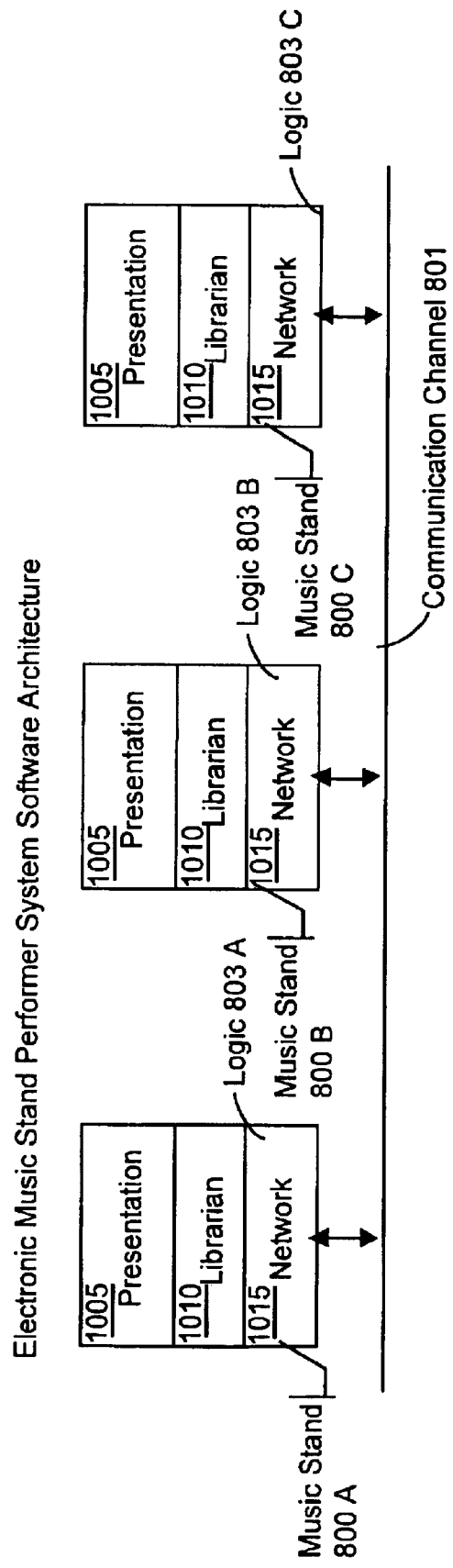
FIG. 10 illustrates an architecture of plurality of the electronic music stand Performer Systems of FIGS. 1–9 (made up of various electronic music stand products (800 A–C )) connected by a communication channel (801), with network logic (803 A–C ) in each product that self-configures to the environment it finds itself in (such as using the available communication channel (801) and finding other products to interact with).

FIG. 10 illustrates an architecture of plurality of the electronic music stand Performer Systems of FIGS. 1–9 (made up of various electronic music stand products (800 A–C )) connected by a communication channel (801). The network logic (803 A–C ) in each product self-configures to the environment it finds itself in (such as using the available communication channel (801) and finding other products to interact with). The communication channel (801) can be implemented by any number of means, including, but not limited to Wired Ethernet, serial, Wireless Ethernet, Infrared, MIDI and USB.

As illustrated in FIG. 1, a music library (120) is coupled to a communications subsystem (125) that transmits the contents of requested compositions from the remote music library (120) via a radio frequency transmitter to the processor (115) (in a wireless embodiment the communications subsystem uses the antenna (104)). A receiver couples the transmitted signals to the processor (115). This embodiment enables the music library (120) to be remote and located at a great distance from the requesting site. The antenna (102) at the receiver picks up the transmitted signal. The communications subsystem (125) can be a transceiver for bi-directional communication, or a transmitter for one-way communication (such as where the requests are otherwise communicated to the music library subsystem (120), via wired or wireless connections).

Figure 11:
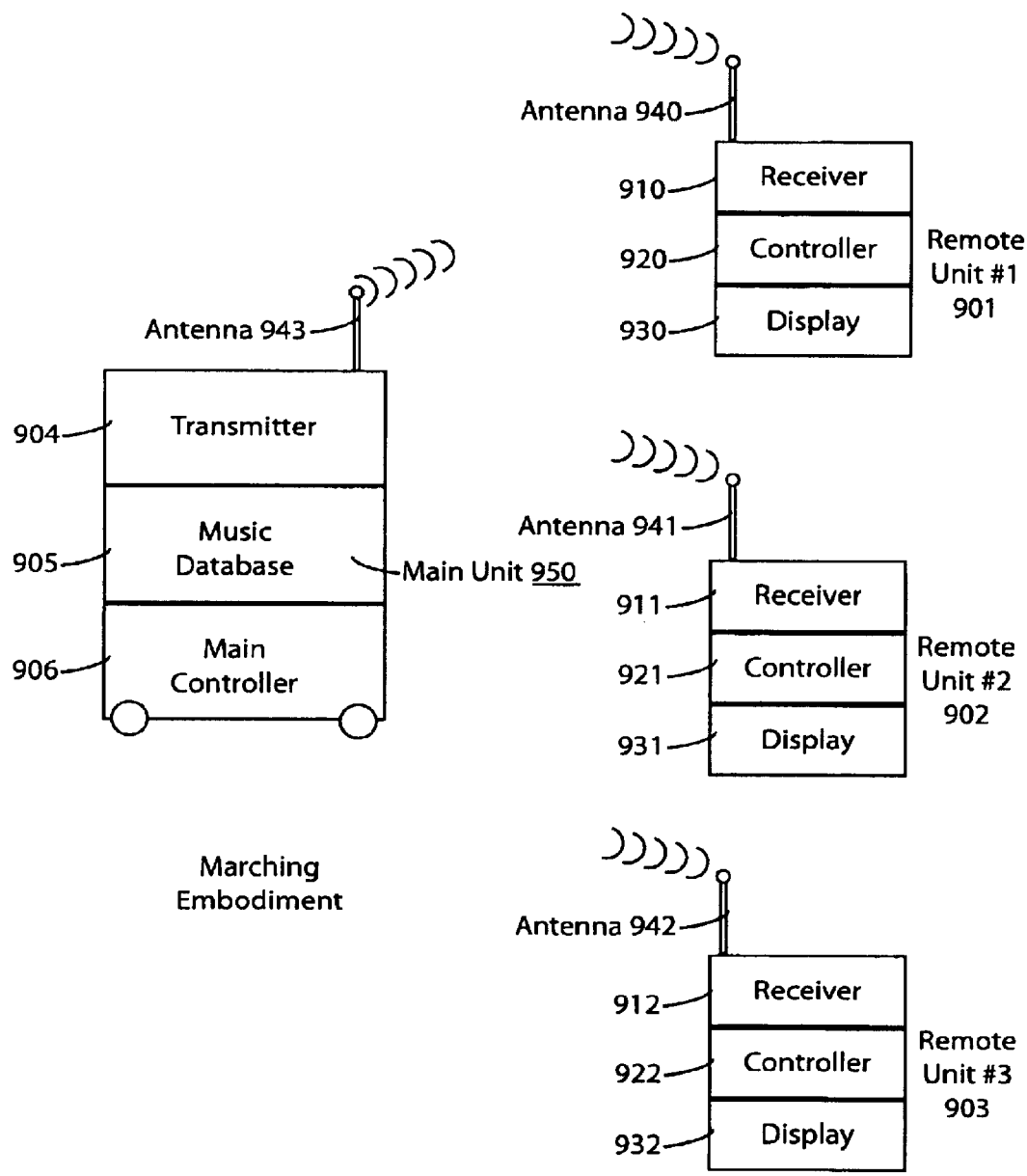
FIG. 11 illustrates an alternate embodiment of the present invention. In this embodiment, the workstations are remote units (901; 902; 903) equipped with a respective receiver (910; 911; 912) that provide for receipt of communications including receive music data representations of musical selections or compositions transmitted to them, and used by members of a marching band.

FIG. 11 illustrates an alternate embodiment of the present invention. In this embodiment, the workstations are remote units (901; 902; 903) used by members of a marching band. Each of the remote units (901–903) is equipped with a respective receiver (910; 911; 912) that provide for receipt of communications including receive music data representations of musical selections or compositions transmitted to them. Remote units controllers (920; 921; 922) control the operation of the respective remote units (901; 902; 903). The musical composition is displayed on the remote unit's respective displays (930; 931; 932). The displays can be low cost such as an LCD multiple line display providing low cost, low power usage, and high visibility/readability. Auto Advance Mode, wherein to compensate for limited display image. The Performer subsystem automatically redefines the music data for adaptive display in slices (as discussed in detail elsewhere herein) to adjust for format, layout and size; and the electronic music stand system provides an the display automatically scrolls as the music is performed.

Each remote unit (901; 902; 903) can be mounted on the instrument on or in place of the lyre. The remote unit's antenna (940; 941; 942) can be separate from or built into the remote unit or the lyre. A transportable main unit (950) is used to transmit musical compositions to remote units (901; 902; 903). The transportable main unit (950) is comprised of a controller (906) for controlling the transportable main unit (950), a music database storage medium (905) containing the data for the musical compositions to be played by the band, and a transmitter (904) for transmitting (950) via antenna (943) the musical compositions to the remote units (901; 902; 903). This main unit can be in the form of a suitcase or briefcase size item. The main unit can also be provided built into a van that is driven around with the band or as a small self-contained portable unit. In accordance with this embodiment, the band can play a virtually unlimited number of musical compositions without the problem of carrying the music with them in paper form. It also relieves the band members of the problems of changing music and changing pages while marching. As discussed in the above embodiments, in the performance mode, the musical score is automatically scrolled across the screen display (931; 932; 933). Alternatively or additionally, individual switches can be provided to permit each performer to self-activate, each page turn, or one master (e.g. band leader) can activate page turns for everyone. Additionally, a keyboard and/or microphone can be attached to the transportable main unit allowing the conductor to send messages to the camera remote units via displays (930; 931; 932) or via a speaker associated with units (901; 902; 903). This allows the conductor to send instructions to the band (such as to take a certain route, or play at different volumes or speeds). With bi-directional communications and user performance feedback, the conductor can also monitor for errors.

In accordance with the teachings of the present invention, a system and methodology are provided for music display presentation and communication. Musical compositions can be input to the present invention from any one or more of multiple sources, such as from pre-stored score images, live microphone, direct input from musical instruments or vocal direct performances, imported from a music composition program (such as Finale, Sibelius, Cakewalk, or Mosaic), other computer data files, MIDI files, a MIDI sequencer, scanning in of existing printed score images (as image data or as optically character recognized), cameras, visuals, etc. These inputs by the system are used in the selective storage, composition, communication, and presentation of the musical system of the present invention. The system can generate additional material automatically, or permit a user to modify, communicate, display and/or reproduce the musical compositions.

Existing forms of music notation can be converted manually, or can be converted automatically by scanning in sheet music, using the image data directly for display, or recognizing (such as by using optical character recognition or object oriented coding) the various elements of the music, and facets and specifics of the syntax in the form of notation including its constants and variables and protocols, and integrating via an artificial intelligence type expert system that notates, highlights, and accentuates via synchronized metronoming of time signature to music. Any of a variety of other means of inputting and/or converting music can also be used, such as direct input of musical performance signals processed via software that converts it into musical notation. Such software is commercially available, such as from ARS NOVA, Wildcat Canyon Software, Mark of the Unicorn, Inc., Make Music, Inc., GVOX, Sibelius, Inc. and Passport Designs, Inc.

In accordance with one aspect of the present invention, each electronic music stand system display workstation can also provide the ability to convert performed musical compositions into notated musical compositions, generating the appropriate musical notation (e.g., staff, tablature, MIDI), notes, time signature, key, instrument, or user type, etc, and further provides export capability to save and export the electronic music stand music data file into multiple formats, including but not limited to at least one of TIFF, BitMap, JPEG, Postscript, PDF, MIDI, proprietary composition formats for commercial software, and an optimized custom electronic music stand format.

Some music is only available in notated forms, where there is not an existing signal showing proper synchronization of the signals. Thus, a controller subsystem (such as (280)) provides for real time conversion and analysis of syntax of the music notation, in conjunction with a precision clock metronome, and provides an indicator (such as color or other highlighting or bolding or accentuating) of the relative timing of the performance relative to a place in the sheet music (or other form of musical notation). Alternatively, the user can set a tempo rate, and the electronic music stand system automatically advances pages based on the tempo rate and a related page turn rate variable that utilizes the tempo rate. An emergency stop/override button permits overriding the automatic advance mode.

Since the music notation is now in computer usable form, it is now an easy task to communicate, display, compose, alter, and transpose music (such as in key, for types of instruments or voice parts, and harmonies) via well-known techniques.

Native data files from Finale, Sibelius, and other music editing or composition programs can be saved and output in one of the above formats to be converted to one of the formats compatible with the electronic music stand, or used in native file format if compatible with the electronic music stand appliance formats.

As illustrated in FIG. 8, conversion Services logic (1007) provides conversion of music data from external sources and vice versa to and from the format required for the recipient. These services convert the music data from the best available source, optimally for the current need. This conversion can be optimized for speed or quality. Available conversions include: resize images, rotate images, sharpen images, format changes (e.g., such as between or to TIFF, JPG, BMP, EPS, PS (Postscript), Adobe PDF, etc.) and color/BW (black and white). Referring to FIG. 7A, in conjunction with FIG. 8, a performer subsystem (700) is illustrated comprising a processing subsystem comprising a processor (701), coupled via coupling (702) to data storage apparatus (705), and to a communications interface (710) coupled via coupling (704) providing for an external communications interface coupling (711). Session monitor logic (722), coupled via coupling (723), determines whether the communication interface (710) has an active communication session with another Performer Subsystem (200). The state of the communication session active or inactive is coupled to processor (701) via coupling (724). The processor is also coupled via coupling (703) to a touch-screen input display (715). Logic within the performer subsystem provides for "librarian logic" (see (1003; 1010) of FIG. 8) of managing storage, retrieval and indexing of the music data in the data storage apparatus (705); "performance logic" ((1005) of FIG. 8) defining data formatting and display responsive to the touch-screen input display and the librarian logic; and "network management logic" ((1015) of FIG. 8) providing management of communication via the communications interface (710) with an external apparatus responsive to the "performance logic" and the "librarian logic." In a preferred embodiment, program data (706) is stored in the data storage apparatus (705). The librarian logic (1010), the presentation and performance logic (1005), and the network management logic (1015) are provided by the processor responsive to the program data (706) stored in the data storage apparatus for managing data formatting, displaying music, and managing communications of data with the external apparatus. The Performer Subsystem (200) can be implemented utilizing commercially available all-in-one touch-screen tablet computing systems (e.g., such as those available from Advantec, Ltd. (U.S., Taiwan), Acer (U.S., Taiwan), Sony (U.S., Japan), Fujitsu Computers (U.S., Japan) and Gateway Computers (U.S.)).

Figure 12:
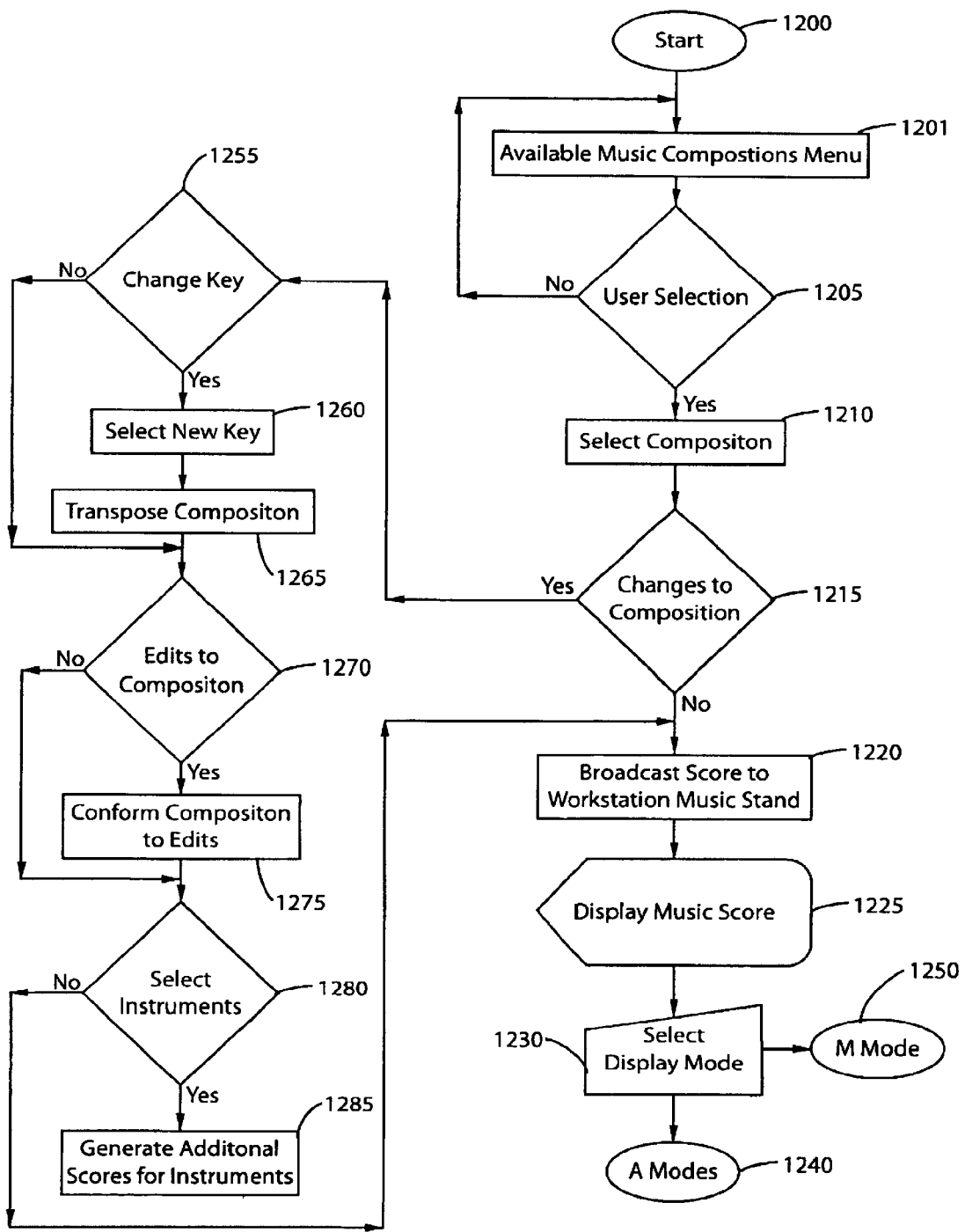
FIG. 12 illustrates the overall operation by one embodiment of the music composition communication workstation.

FIG. 12 illustrates the overall operation by one embodiment of the music composition communication workstation. It begins by starting up the system (1200). The system then provides a menu (1201) that allows the user to select a listing of available music compositions. The user then selects one or more compositions (1210). If the user selects one from the menu that is locally stored, it directly retrieves the information. Alternatively, if it's not something locally stored, the system couples (e.g. will dial up or go through a database or network) to a remote storage site and requests and receives the selected compositions. Any changes that are desired to the composition can be selected at the next logic block (1215). If there are changes (such as to the key, or note editing, or selection of form of display or instruments), then those can be accomplished as illustrated at blocks (1255) change key; (1260) select new key; (1265) transpose; (1270) edit; (1275) conform to edit; (1280) select instrument(s); (1285) generate additional scores for selected instruments.

Figure 13:
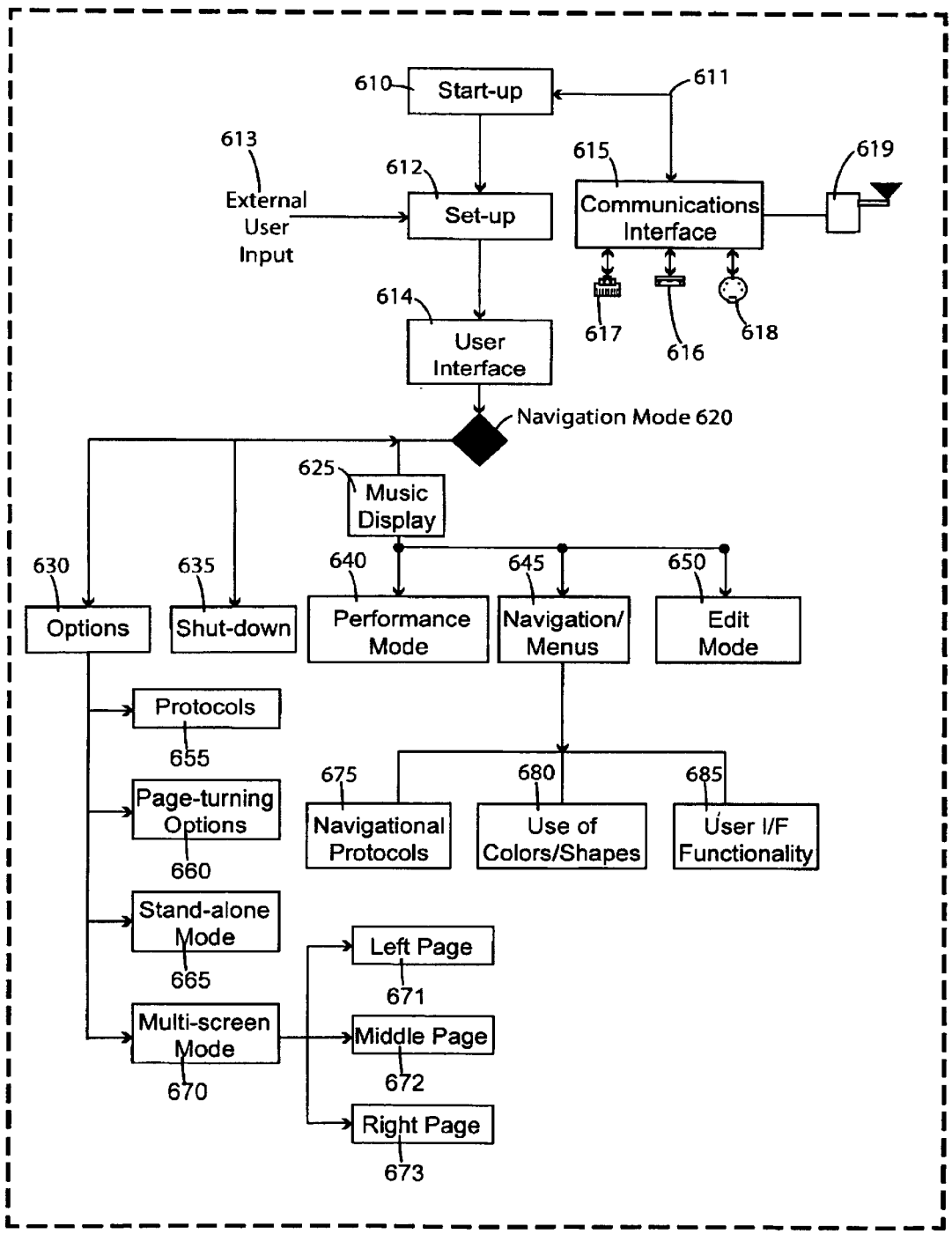
FIG. 13 illustrates a functional/logical block diagram for one embodiment of the present invention, illustrating both structure and state flow for start up and operation of the electronic music stand performer system in one embodiment.

FIG. 13 illustrates a functional/logical block diagram for one embodiment of the present invention, illustrating both structure and state flow for start up and operation of the electronic music stand performer system in one embodiment. At initialization of the system (step 601), the program data in the data storage apparatus is executed by the processor to go through system start up, loading of the electronic music stand system's operating system, set up of parameters, and loading of the electronic music stand appliance application program and data. Upon completion of the set-up (step 605), receipt of communications (step 606) is provided via the communications interface (step 616) such as via external USB coupling (step 616), external Ethernet coupling (step 617), external serial coupling (step 618) wireless communications coupling (step 619), or other coupling via the communications interface.

Referring again to FIG. 7B, two Performer Subsystems (200-A; 200-B) are shown illustrating the bi-directional communications (220) between the two Performer Subsystems. Responsive to the set up parameters, communications input from the communications interface (step 615), and external user input (step 609) from the user interface, and from the set up (step 605), the Performer system proceeds through set up modes and from there to selection of processing modes (steps 655; 660; 665; 670) as discussed hereinafter. Alternatively, the set up screen mode can select to go to the home screen mode (step 610) which then operates as described hereinafter.

Upon completion of system set up, the user interface process is implemented (step 610), which provides a home page display, and which looks for an external user input (step 609) such as an input provided through the touch input screen display (or such as via a writing tablet or mouse or footswitch). The system defaults to initial start state if no external user input is provided, such as displaying the first page of a defined music selection, or providing a home page display with options. Decision logic responds to the external user input selection to further determine an operation mode (step 660). Responsive to the selection (step 660), this system either enters the Options Mode (step 670), the Music Mode (step 680), the Librarian (Music Selection) mode, or the Shut Down Mode (step 650). From the Music Display Mode (step 680), the system operation proceeds to one of edit mode (step 620), Navigation Mode (step 630) or Performance Mode (step 640). The edit mode (step 620) (or Draw Mode) permits for the user to provide edits to the image data being displayed, and to save various levels of revisions.

As illustrated in FIG. 13, a shut down (step 635) can be selected by the user via the external user input (step 609), which causes the performer system processing subsystem to implement a shut down procedure to shut down the electronics and computing technology and shut off the Performer system.

Further options can be selected such as determining how the appliance shuts down, prompting for saving changes (e.g. on time cycles, on events, per user selection, or automatically saved), page-turn transition options, contrast/brightness selection and/or remote control, appliance Identification, etc.

Referring again to FIG. 8, the Network (1015) Discovery and Identification logic (1020) allows the appliance to identify itself on the network and discover other users and appliances on the network. The appliance, at a regular interval attempts to make itself known on any of its available networks. This is done so as not to interfere either with the network itself or significantly affect the operation of the appliance.

Once the appliance has successfully identified itself on the network, it proceeds to discover the other Electronic Music Performer System and subsystem appliances on the network.

In a pure peer-to-peer scenario, the appliance has stored information regarding the passwords, groups and other information relating to the user and what other users and appliances will have access to resources on this appliance. This option is more suited for smaller and/or less permanent situations.

Alternatively, the authentication is done in conjunction with a central server that contains information about multiple users and their passwords, groups and other related information. This information can then be managed by a common administrator and the user is not restricted to use a particular appliance. This option is optimal for use by larger groups such as orchestras. The central server can also provide a central repository of music data, and a database for revisions.

The Performer Systems and subsystems can operate in two networked modes: peer-to-peer and central server. In the peer-to-peer mode, each Performer System or subsystem defines the authorizations that it will allow and must define which groups of Performer Systems with which it will communicate. In the server-managed mode, the central server defines the Performer System's and subsystems authorizations. The central server configuration allows a user to move from one physical system to another and retain set-up preferences, while the peer-to-peer configuration restricts the user to the set-up preferences selected on each individual system. The central server configuration requires that all users of Performer Systems and subsystems be registered and managed by a common network administrator. The peer-to-peer configuration allows each user define his own set-up preferences without a centralized server or administrator privileges. However, the user may copy, save, import and export user preferences, regardless of network configuration.

Figure 14:
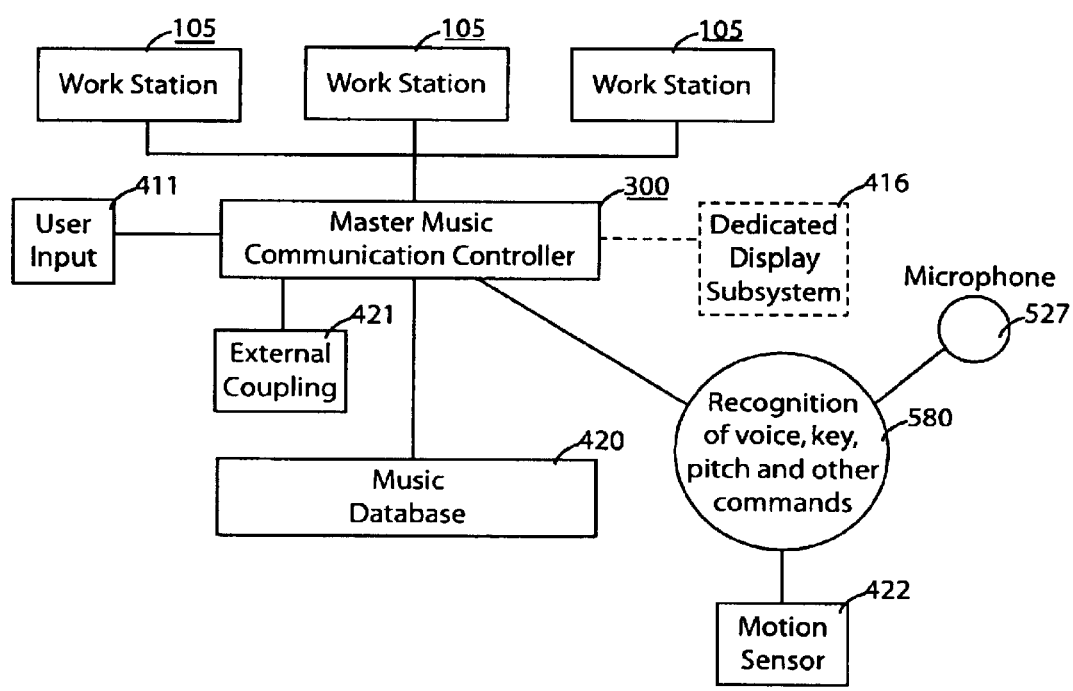
FIG. 14 illustrates an alternate embodiment of the present invention provided where one or more workstations (105) include, at a minimum, a display of the music notation and is coupled to a master music communications controller (415) that provides for a separate user input (411) which provides input interface that designate requested musical compositions, transformations, and display requests for various ones of the coupled workstations.

Referring to FIG. 14, an alternate embodiment of the present invention is provided where one or more workstations (105) include, at a minimum, a display of the music notation. These workstations are coupled to a master music communications controller (415) that provides for a separate user input (411) which provides input interface, such as to a MIDI stream, computer data links (such as RS232, modem data link) etc., that designate requested musical compositions, transformations, and display requests for various ones of the coupled workstations.

The multiple connected workstations can operate as stand alone workstations using their local intelligence for displaying downloaded or resident music compositions. They can also interact in a master/slave linked environment, where one of the master workstations ((300) of FIG. 3) asserts a master status, and all other inter-connected workstations, whether workstations (105) or master/slave workstations (300) operate in a slave mode coupled to the designated master. Additionally, masters can communicate between each other for a master/master network configuration.

The advantages of electronic music composition, orchestration, communication and display are many. In addition to those discussed elsewhere herein, a capability exists for expert system based artificial intelligence type assistance, where the expert system assists in many of the functions performed in musical composition and performance. For example, in the Auto-Compose Mode, if the words need to be changed to match the meter, equivalent terms can be chosen from the many sources such as a thesaurus, dictionaries, rhyming dictionaries, encyclopedias, etc., to assist as well. Phrases from poetry, selected and indexed by content or topic can be re-expressed to create new works. Drum and rhythm section accompaniment can be expertly suggested, as well as harmonies, melody lines to accompany chords, chord progressions to accompany melodies, harmonies to accompany a melody, and suggested musical instrument groupings to support a particular sound, rhythm, style, tonal quality, etc.

The system can be designed to take advantage of expert system design knowledge. A database of rules and facts are provided, and additions and modifications are accumulated over time by the system in a self-learn mode. The expert system itself has the necessary logic to probe the user, monitor the performance, and apply the rules to provide feedback and reports to the user of skill level, errors, automated performance display, etc., starting with a base defined set of rules, instructions, and a knowledge database specific to music.

Referring again to FIGS. 1 and 14, the workstations (105) access the music database storage means (420) that provides the data for the requested music composition via the master controller (415). The master controller (415) displays both the requested music composition as well as user interface communication for the music communication system to be displayed on either a dedicated display (416) or on one of the workstations (105) as designated by the master controller (415). The music database (420) can either be local, or can be via a data link (e.g., phone line, RF, cable, satellite, otherwise).

Referring again to FIG. 8, the Network Communication Protocols layer logic (1002) manages the various network and communication protocols and physical and logical interfaces used to communicate between appliances. The selection of network, both physical and protocol, is made as transparent to the user, and as self-configuring, as possible.

Referring still to FIG. 8, a user (1001) provides a user input via the touch screen (1051) which provides a signal to the Display Interface Logic (1009) presentation layer of logic (1005), which processes the signal appropriately. Graphical User Interface (GUI) logic and respective processing logic are provided for user interface (touch-screen (1051) and Display (1052) with the Network (1015) and Librarian (1010) layer logic.

As illustrated in FIG. 10, the illustrated fundamental Electronic Music Performer System logic software architecture consists of three layers, Presentation (1005), Librarian (1010) and Network (1015). The Presentation Layer (1005) provides control logic and user interface for all the direct interaction with the user. This layer is the most affected by operating system changes and hardware characteristics such as screen size. The Librarian Layer logic (1010) provides the management of information within the Performer system including, but not limited to the selection of the music, notations on the music, user information and product state. This layer can also manage any necessary copyright or rights management. The Network Layer logic (1015) provides the communication between various system products. In a preferred embodiment, the communication is mostly self-configuring and provides for a hierarchical and direct communication scheme.

Referring again to FIG. 8, the Groups and Authorization layer logic (1021) manages the group assignments of individual appliances to a group and necessary authorizations. Once the appliance has progressed through the discovery and identification (1020) steps, it needs to determine its groups and authorizations (1021). The first step authorizes the user. The user identifies himself through the Network GUI (1002) with a name and password. The password is preferably authenticated.

Many methods and protocols are utilized in accordance with the present invention for implementing user interface to make the electronic music stand user-friendly and comport to protocols and conventions of sheet music to ease the transition in use by musicians. For example, there are the protocols for implementing page turns, e.g., by touching the right screen (or right side of a single screen system) to go forward and touching the left screen (or left side of a single screen system) to go backwards, implementing footswitches to eliminate the need for use of hands, to turn pages of the music, and positioning of selection soft buttons on the space screen.

When in the navigation mode, the display of the music data operates in a similar manner to the Music Display mode, except that the actual music display is physically smaller to accommodate leaving space for display of the buttons, and permits drawing, other editing, and networking.

The Network GUI (1002) layer logic provides user interaction with the Network layer logic (1015) for the network operations.

Referring again to FIG. 1, the music workstation stands can either be identical or broken down into conductor stands and performer stands. A conductor stand (105CON) usually has more functions and control than a performer stand (105PER). A performer stand (105PER) can range in capability, from only having the ability to receive and display musical scores, to full featured such as the conductor stand (105CON) that has the ability to select the musical score, change the key of the musical composition, and perform other tasks that usually a conductor or librarian would be permitted or required to do.

In one embodiment, the master workstation (300) has complete control over the slave workstation (105). Anything displayed on the master workstation is also displayed (at the master's selection) on the slave workstation. It is also possible for the user to select or mask certain portions of the display of the master workstation before it is displayed on the slave workstation. In this manner, the conductor, using the master workstation, can select and transmit to the slave workstations only that information that is required by the orchestra members.

The conductor and performance mode operations can also be combined. The workstation can also be enhanced to provide training and comparison of a user's performance to the displayed actual music. Any communications channel used between (e.g. intra-communication in a linked set) Performer Subsystems can be used to communicate between Performer Systems (inter-communication). The communication can be used to transfer music notation, go to a bookmark, transfer drawing, send data files, or send general messages between Performer Systems. A network graphical user interface (GUI) (see (1002) of FIG. 8) conveys user input to allow for the set-up and management of the communications with other Performer Subsystems. The network GUI provides for defining the network, specifying user names, specifying appliance names, and sending messages to other Performer Systems on the network. Each Performer System broadcasts its identity to all Performer Systems on the network. A Performer System on the network listens for new Performer Systems and adds the new systems to its known list of systems available on the network. A Performer System on the network can send messages to and receive messages from other Performer Systems. These messages can contain music data, control data, permissions, text messages, images, etc.

As an example, if the conductor touches the transmit key on the main screen, he will be presented with a screen showing all of the instruments that he has selected for that piece and a button labeled "ALL". He may now transit to any one (or group of) individual music stand or by touching the "ALL" button area, transmit to the entire orchestra.

In the performance monitor mode, for a single user or multiple users, the user (or a remote teacher or conductor) can indicate the rate at which he feels the performer should be performing or the system can operate at a default rate, or the music data can set the rate, or the system can set the rate based upon the user's initial performance. A microphone input or live input on the music workstation samples the user's actual performance and permits providing a graphical display (e.g. mapping) (for the user or teacher/conductor) showing the relative synchronization of the performer's actual performance versus the conductor's desired performance.

With use of appropriate sound baffling, a plurality of instruments can simultaneously be monitored and controlled by the conductor (or teacher), so long as each instrument's output sound pattern is communicated directly to a respective workstation. The output of each of the workstations can then be coupled to the conductor's (or teacher's) master workstation for further analysis and processing.

The user's performance can be compared to the score, and feedback can be provided to the performer and/or teacher or conductor as to the quality of their performance.

In an alternate embodiment, the slave workstation communicates performance parameters or deviation signals to the master workstation, for error analysis feedback.

Referring again to FIG. 8, the Message Handler layer logic (1022) manages the messages sent to and from other appliances. For various reasons, an appliance may want to send information to other appliances. The message handler will set up a session between the appliances and send one or more messages. When communications of messages is done, the session is closed. Both appliances are able to close the session and the other is able to detect the closing of the session. The session can also be closed by the failure of the network, which in a preferred embodiment is detectable by both appliances.

Preferably, the communications of changes made by the conductor are provided to facilitate process flow in the same manner as when paper sheet music is utilized. Thus, when a conductor makes a change, the performer system used by the conductor communicates the image data for the screen image representing the conductor's change, which is communicated to the appropriate principal such as the concert master, or principal cello, etc. In one embodiment, the concert master sees the screen image for the conductor's change as a picture in picture on the concert master's local performer system display, and is able to synchronize the local display to the same appropriate page corresponding to the change made by the conductor, and make the actual change on the musical part for the violin corresponding to the change the conductor made in the score. Then, the principal or concert master (as appropriate) makes the changes manually and edits locally on his respective performer system. Changes by the concert master are communicated as image data to the performer system music stands in the private network associated with the principal or concert master. The changes can be either automatically implemented as an overlay onto the individual performer system's music stands within the private network, or they can be displayed and flashed on the appropriate area of the individual musician's music stand to permit the local user of that performer music stand to accept the changes and implement them onto the user's music stand. Alternatively, software logic can be provided in the conductor's or the librarian's system to permit changes made by the conductor or librarian to automatically be converted from score to individual parts and thereafter be communicated to the individual stands. As a third alternative, the conductor's changes can be forwarded to the librarian, who can then implement communicating changes to the individual parts.

Revisions made on one performer system can be communicated as direct overlays to be displayed on selected ones of the other Performer Systems—shown as an overlay atop the image data otherwise displayed on performer system to which the revisions are communicated. Alternatively, a picture-in-picture image of the revised section may be communicated, permitting the receiving Performer Systems user to determine whether or not to make the change. The original, and all revision layers are preferably saved and accessible via the Music Selection Librarian logic. As previously discussed, communications can be via wired or wireless medium, and can include other Electronic Music Performer Systems as well as other general computing systems utilizing appropriate interface software.

The sessions can be set up in a one to many (broadcast) and/or one to one (direct) relationship, and/or multicast. Due to the nature of the sessions, some may exist only to send a single message and others to send multiple messages. The session is one-way, e.g., data is transferred in one direction except for a simple acknowledgement that the transfer was accepted, failed or was rejected. Bi-directional information flow requires at least two sessions.

An appliance has the right to reject a message for any reason and the sender appliance properly handles a rejected message. A message is rejected because (1) the appliance does not respond to a particular message, (2) the external user or appliance does not have the access rights to send this message to this appliance with this user, or (3) the appliance is simply unable process messages or its too busy.

Messages contain some or all of the following information: sum check, message size, message version (to allow for future enhancements), sending appliance, sending user, receiving appliance, receiving user, message type, message payload size in bytes, message payload, etc.

Figure 15A:
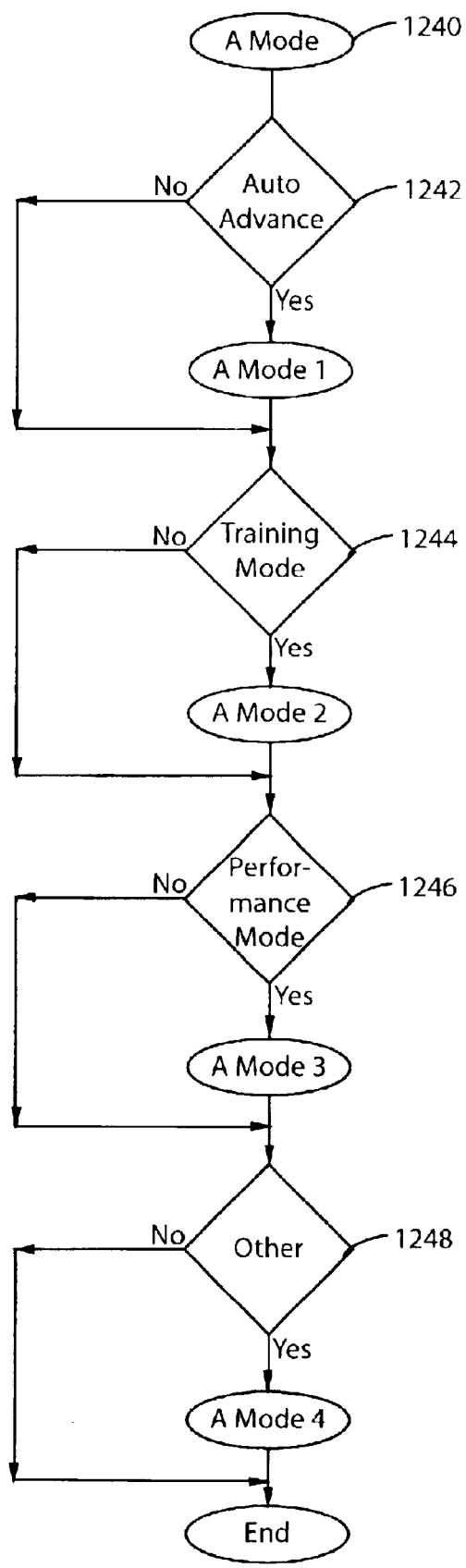
FIG. 15A illustrates the operation of the automated mode "A Mode" (1240) is illustrated, where the user selection of the desired automatic mode is detected and responded to, illustrated as the auto-advance mode (1242), the training mode (1244), the performance mode (1246), or any one of a number of other modes (1248) as is described in further detail hereinafter.

Referring to FIG. 15A, the operation of the automated mode "A Mode" (1240) is illustrated. First, the user selection of the desired automatic mode is detected and responded to, illustrated as the auto-advance mode (1242), the training mode (1244), the performance mode (1246), or any one of a number of other modes (1248) as is described in further detail hereinafter. For example, auto repeat mode can be selected by designating the start and stop points, and the number of times to repeat a "looped" portion (or portions) of the displayed musical composition. Marching band mode (auto-advance based on metronome function, conductor control, etc), auto-compose mode, and many others can also be implemented. The order of selection of auto-advance, triggered mode, or performance mode is arbitrary, and the user can alternatively decide from a menu where all are simultaneously presented as choices.

Figure 15B:
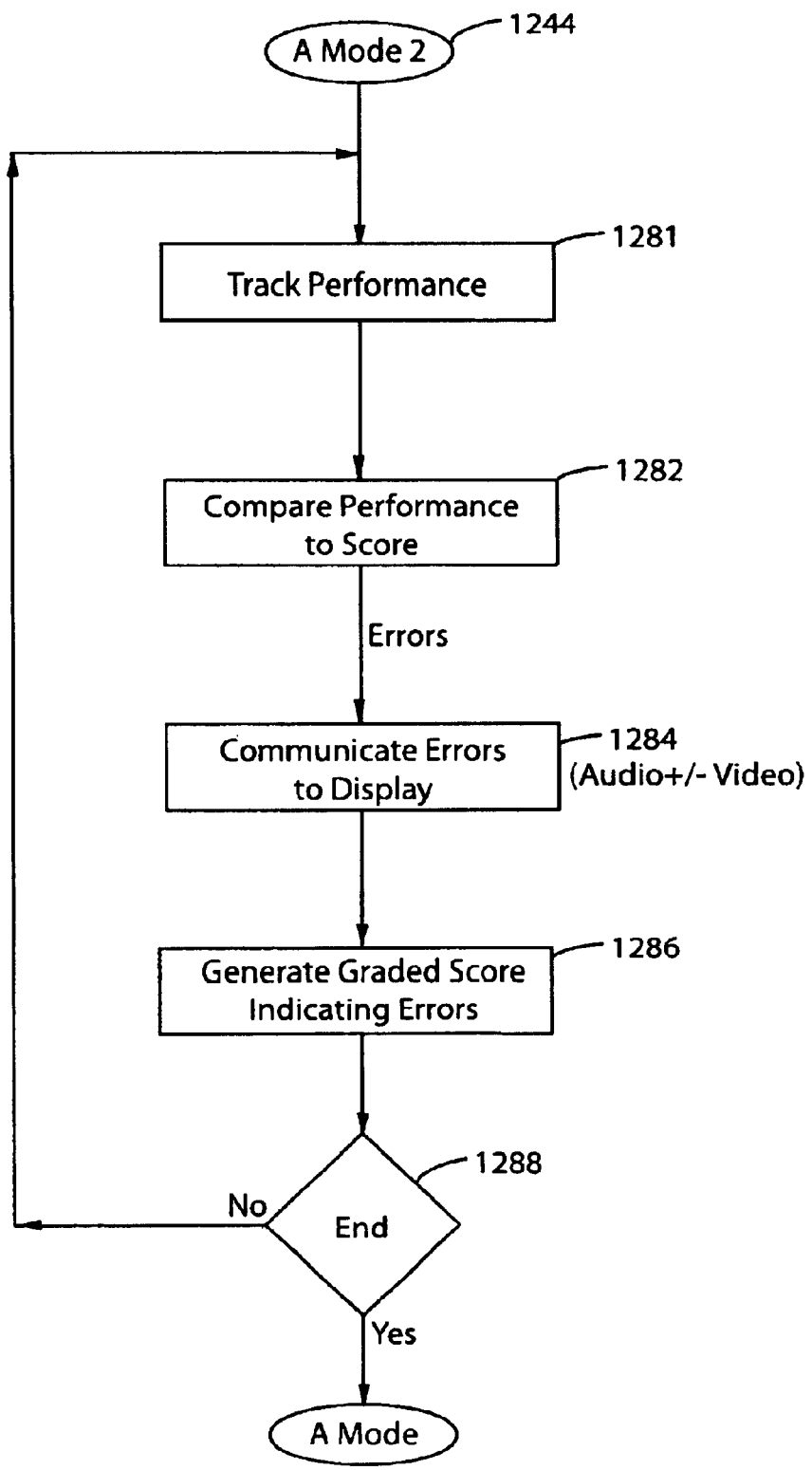
FIG. 15B illustrates the automated mode "A Mode 2" (1244) operation of FIG. 15A illustrated corresponding to the training mode wherein the system tracks the performance (1280) of the individual user to the composition score, primarily for the purpose of permitting a critical analysis and comparison of the performance to the score (1282).

Referring to FIG. 15B, the automated mode "A Mode 2" (1244) operation of FIG. 15A is illustrated corresponding to the training mode. In this mode, the system tracks the performance (1280) of the individual user to the composition score, primarily for the purpose of permitting a critical analysis and comparison of the performance to the score (1282). This analysis determines divergence from the selected musical score, and reveals errors or deviations from desired performance goals (e.g. match of timing of notes, duration of notes, pitch of notes, etc.), and to display those errors (1284) (such as by audio or video means). Predefined performance goals provide the knowledge basis for expert system based analysis.

The system can then generate a graded score (1286) indicating errors, and can present it in numerous formats such as histograms, frequency of errors, spacing of errors, etc. Identification of when the errors occur (e.g., only when going from slow to fast, or fast to slow), absolute position within the score and so forth, are also tracked and reported. Other expert system rules can be provided by music teachers which give the necessary parameters for modeling expert system reasoning, as well as guidance and suggestions on how to correct problems such as via display text, graphics, audio, etc.

The comparison of the performance to the score in the training mode is for the purpose of detecting the performer's compliance to parameters (such as the tempo, rhythm, filter, parameter, pitch, tonality, and other features that are adaptable or can be modified by performers). This parameter information is available and published in numerous forms. Thus, having provided this core set of parameters, the system can thereafter perform the training automated mode.

For all automated modes (e.g., A Modes 1, 2, 3, 4), training feedback can be provided real time or subsequent to performance at either or both of the performer's workstation and a second (e.g., teacher's) workstation.

Each Performer System has a Librarian GUI that manages the music notation data on its local storage and on remotely accessed systems. The Librarian GUI provides an interface for the user to import music and other data to the Performer System. The music data or other data on an external storage device may be provided from a removable storage device, e.g., a USB RAM disk, removable media (i.e., a CD-ROM), or via a network communications channel from another Performer System or file server. Music data contained within an external storage device may be imported to the Performer System which thereafter performs the necessary processing or manipulations of the data optimizing the music data for display in the Performer System.

The Librarian logic portion of the Performer System maintains an appliance state to retain user selections and preferences after the appliance is turned-off.

The librarian function provides for coupling of data communications (through the communications interface) of music data and other data for storage in the data storage apparatus of the performer subsystem, and may be accomplished via physically different communications channels, or via a single common channel. As illustrated in FIG. 7C, the management functions of the communications between the multiple Performer Systems (e.g., (100; 200; 300; 400) can be managed by centralized controller (730) or distributed among a plurality of the Performer Systems. Any number of Performer Subsystems can be combined to form one Performer System (740). The centralized controller (730) can be implemented with a performer system or by a separate computing system.

In a preferred embodiment, the Librarian function of the Performer System receives music notation data in objects (as well as in image data files). The objects can be as small as a single note or staff line. The objects can be standardized (such as MIDI, Finale files, Sibelius files, Mosaic files). The objects can also be custom, such as from a Synthesizer, a computer, or proprietary objects created and output from the Performer System. The Librarian function can provide the exact amount of information to fit on the display as needed. However, depending upon the file format, the provided music data object may not entirely fit on the display, so only a portion of the page is displayed. The Librarian GUI provides a method to divide pages into smaller sections— allowing horizontal and vertical slices. The sections are logically and sequentially ordered from top to bottom and then left to right. Thus, the leftmost section of the top slice is the first logical section proceeding to the rightmost section of the top slice and then ultimately to the rightmost section of the bottom slice.

Referring again to FIG. 8, the Librarian GUI (1003) layer logic provides control of user interaction with the Librarian layer logic (1010) for the librarian operations. This GUI (1003) provides the user with controlled interaction with the Music Storage logic (1004) in the Librarian Layer (1010).

Any data format conversions can be automatically handled by the Music Storage logic module (1004), which automatically calls the Conversion Services logic (1007) as needed.

The Librarian Layer logic (1010) is comprised of Appliance State logic (1008), the Music Storage logic (1004) and Conversion Services logic (1007).

The music data describing the music notations can be stored on the Performer System displaying the data, or it can be obtained from an external source, such as an external server, external storage, or another Performer System that may or may not be shared with other ones of the Performer Systems. Each Performer System provides the control to retrieve, process and display the music data. Each Performer System can control none, one or more displays. When no display is connected, then that Performer System is used to share information and/or provide a controller for use with other Performer Systems.

The Music Storage layer logic (1004) controls the storage of the music data operations on the current resident appliance and coordinates through the network layer (1015) with other Performer System appliances and any coupled servers on the storage of music data.

A list of available music scores stored in the music storage can be selectively activated for display as bookmarks. The electronic music stand appliance can store more scores than are actively used and displayed. The Librarian logic (music selection logic) provides for ordering, importing, exporting, and setting active/inactive status for each musical composition. This reduces the clutter of displaying bookmarks and in locating a particular page of stored music, such as when the appliance is being used in rehearsal or performance. When a score is activated, there may be a need for a conversion process in the conversion services module (1007) if a different orientation or size for display of the music is selected or required. This conversion varies in length of time required, and takes longer times for long scores. Once a conversion is completed it is stored in the appliance and it doesn't need to be converted again. However, the storage of these conversions consumes storage space in the Music Storage of the appliance. Therefore, depending on storage capacity and user needs, unneeded configurations can be deleted (1004) to save space, or exported for archival, and then deleted.

The music storage layer logic (1004) provides the user the ability to delete the selected portions of music from the appliance's main music storage. It can also export and import music into music storage spaces. These spaces can be found on the Electronic Music Performer System appliance or network, or by physically attaching a removable storage media (e.g. Flash RAM, floppy disk, hard disk, CD ROM) to the appliance. In certain embodiments, the current appliance additionally needs to have the permission to read or write information into that space.

Referring again to FIG. 7A, in accordance with one aspect of the present invention, image data from the Data Storage Apparatus (705) is provided to the Performer Subsystem for utilization by the processor (701) to generate a display on the touch-screen display (715), formatted and presented as a human recognizable display of the music data. The image data is not limited to music data, and can be applied to other sorts of visual data being utilized for other applications by the Performer System, including scripts, video imagery (such as how to play (ala the Suzuki method, or a teacher illustrating a role model)), or for use by a stage hand or lighting technician, or sound engineers, or recording studio related information, text announcements, etc.). Depending on the source of the music image data, the performer subsystem selectively provides signal processing of the music image data responsive to the Data Storage Apparatus (705), to improve the readability of the displayed images, as well as providing for formatting of the image data to the appropriate screen resolution and size of the display of the performer system. Any of a plurality of image processing algorithms can be utilized as set forth in *Digital Signal Processing* (Stanley, William D. *Digital Signal Processing*. Reston: Reston Publishing, 1975.) and *Programs for Digital Signal Processing* (—*Programs for Digital Signal Processing*. Ed. W. R. Crone. New York: IEEE, 1979.)

Additionally, the Performer Subsystem (200) provides for caching and buffering of the music data, and where appropriate, the signal processing of the image data, and provides for memory mapping control and management, to utilize the music data stored in the data storage apparatus (705) of the Performer Subsystem (200) to provide to the user effective real time display, advancement and page change of the music. The caching and buffering eliminates the delays that would be incurred in going to and from slower large storage such as hard disk or Flash RAM or CD-ROM, to higher speed RAM, by pre-loading a portion (the cache) of the higher speed memory (e.g., RAM) in accordance with defined cache management for use by the processor in the performer subsystem (200). In a preferred embodiment, each performer system would save an image of the music page in the short-term cache (e.g., high speed RAM) of the Data Storage Apparatus (705) shown in FIG. 7A. The processor (701) calculates the next most likely pages that the user may request to display. The processor then reads the music page information in the long-term area, typically a hard drive or flash ROM, of the Data Storage Apparatus (705) and transfers it to the short-term cache performing any transformations of the data to prepare it for subsequent display. When the user requests a new page to be displayed, the page advance/turn process is increased in speed since the information has already been preloaded.

The Presentation GUI ((1005) of FIG. 8) displaying the music data evaluates the music data to find the largest logical section, after the user has defined the slices and logical ordering as previously described. The largest logical section defines the scale for the remaining logical sections to be displayed. Therefore, page-size and pagination of the musical score is pre-defined by the user's selection of section slices and logical ordering. So, while the system appears to be advancing or returning pages, it is actually advancing the musical score by the user-defined number of image slices and logical ordering.

In a preferred embodiment, the providing for the display of the music is further comprised of: providing for the selective variation of size and orientation; defining a display width and display height for the display to be used for display of the music; selecting from the logical sections to determine a best fit to the display width and the display height responsive to the mapping and storing; and displaying the selected ones of the logical sections on a video display to provide a best fit responsive to the selecting. As illustrated herein, the display width equals a maximum width for the display and the display height equals a maximum height for the display, where both the display width and display height maximum width and maximum height are positive integers.

The default ordering of the sections of music is defined by the source of the music. For scanned music, this is the pages of music. For music from an editing program, this could be the sequence of measures in the score or even the individual notes. As defined above, the user could subdivide these into sections which are then displayed on the screen. However, music can have various types of repeats, codas and other jumps in the music so it is not always performed in a strictly linear sequence. Thus the sections can be logically ordered and displayed in that order rather than default physical order. This allows the musician to always "page forward" during a performance. This is especially useful when the jump would require more than one or two page jumps.

The order of slicing and creating sections is optimized for traditional music notation. However, if displayed data, i.e., lyrics only, is in a language that is traditionally ordered and read in a different direction, then the order of slicing and logical ordering will be changed to be accommodate that layout for data display.

Figure 16:
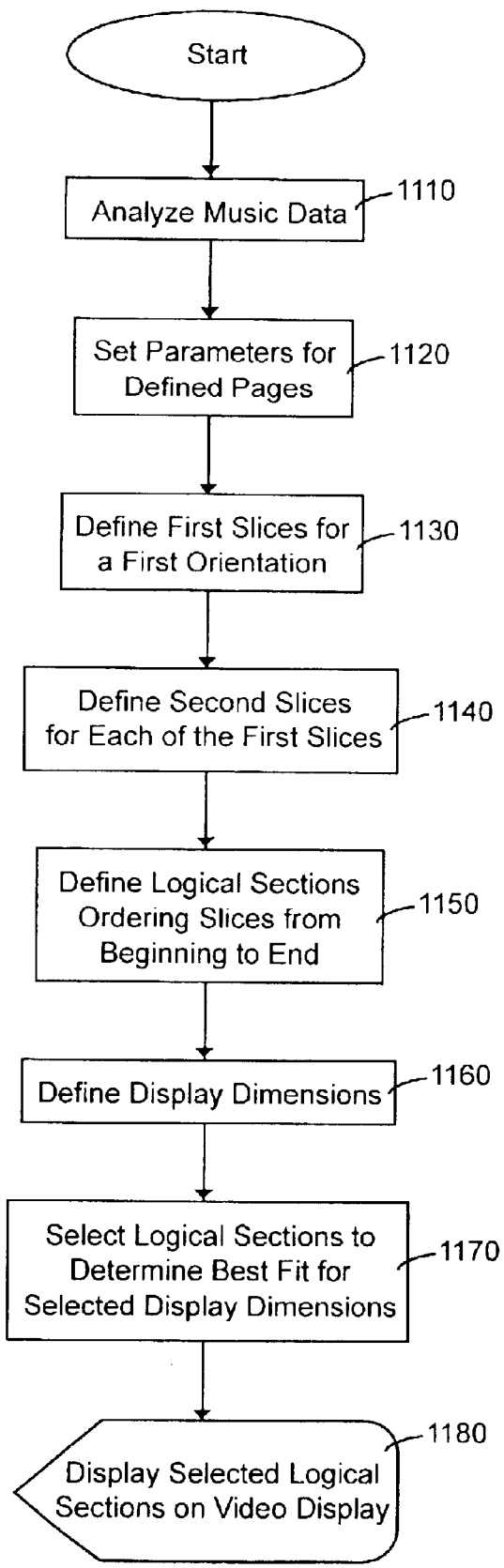
FIG. 16 illustrates, in accordance with one aspect of the invention, a methodology and system is provided for processing structuring music image data and bookmarks and text related to respective bookmark.

As illustrated in FIG. 16, in accordance with one aspect of the invention, a methodology and system is provided for processing structuring music image data and bookmarks and text related to respective bookmark, as described hereafter. First, the music image data is analyzed (step 1110) and parameters are set defining the music image data into defined pages (step 1120). Preferably, each page relates to a given display resolution and size. Next, the system defines first slices of the music image data for the first orientation (step 1130), such as vertical. Next, the system defines second slices of each of the first slices (step 1140) to define logical sections ordering the slices from beginning to end (step 1150). In a preferred embodiment, the second orientation is horizontal. Thus, the system orders the first slices from beginning (top or vertical) to end (bottom or vertical). And finally, the system orders the second slices from beginning (left side for horizontal) to end (right side for horizontal). In an alternate embodiment, the first and second orientations are flipped, and the methodology and system still apply.

Having now defined the slices, the system next defines the display width and height (step 1160). Based upon this, the system provides for selecting from the logical sections to determine a best fit to the display width and the display height (step 1170). Finally, based on the processing to determine the best fit responsive to the selecting, the selected ones of the logical sections are displayed on a video display (step 1180).

In a first embodiment, the first orientation equals vertical, and the second orientation equals horizontal, where the beginning equals top for vertical, where the end equals bottom for vertical, where the beginning equals left side for horizontal, and where the end equals the right side for horizontal. In an alternative embodiment, the top versus bottom, horizontal versus vertical, and right versus left orientations are reversed.

The method continues with ordering the first slices from beginning to end; ordering the second slices from beginning to end; mapping and storing the first slices, the second slices, the logical sections, and the ordering of the first slices and of the second slices; and providing for the display of the music responsive to the mapping and the storing.

In accordance with one aspect of the present invention, the video/visual display of the music data is automatically sized by the system to fit the size and resolution of the display apparatus, or in a linked set of the plurality of display apparatus cooperatively working in the linked mode.

The system can automatically paginate the music data for a selected composition, such as based upon embedded pagination or bar/measure count data, or in accordance with a defined criteria logic for pagination. Alternatively, a user of the system can manually or semi-automatically select pagination (or define the selection criteria therefor). The best fit, auto-sizing is provided (by the system of the present invention) in accordance with defined music auto-sizing logic and methodology.

In one embodiment, a method for providing an auto-sizing display of music from a music database is comprised of first defining a page of music image data from the music database; then defining first slices of the music image data for a first orientation; and then defining in a second orientation second slices of the first slices to define logical sections.

Figure 23:
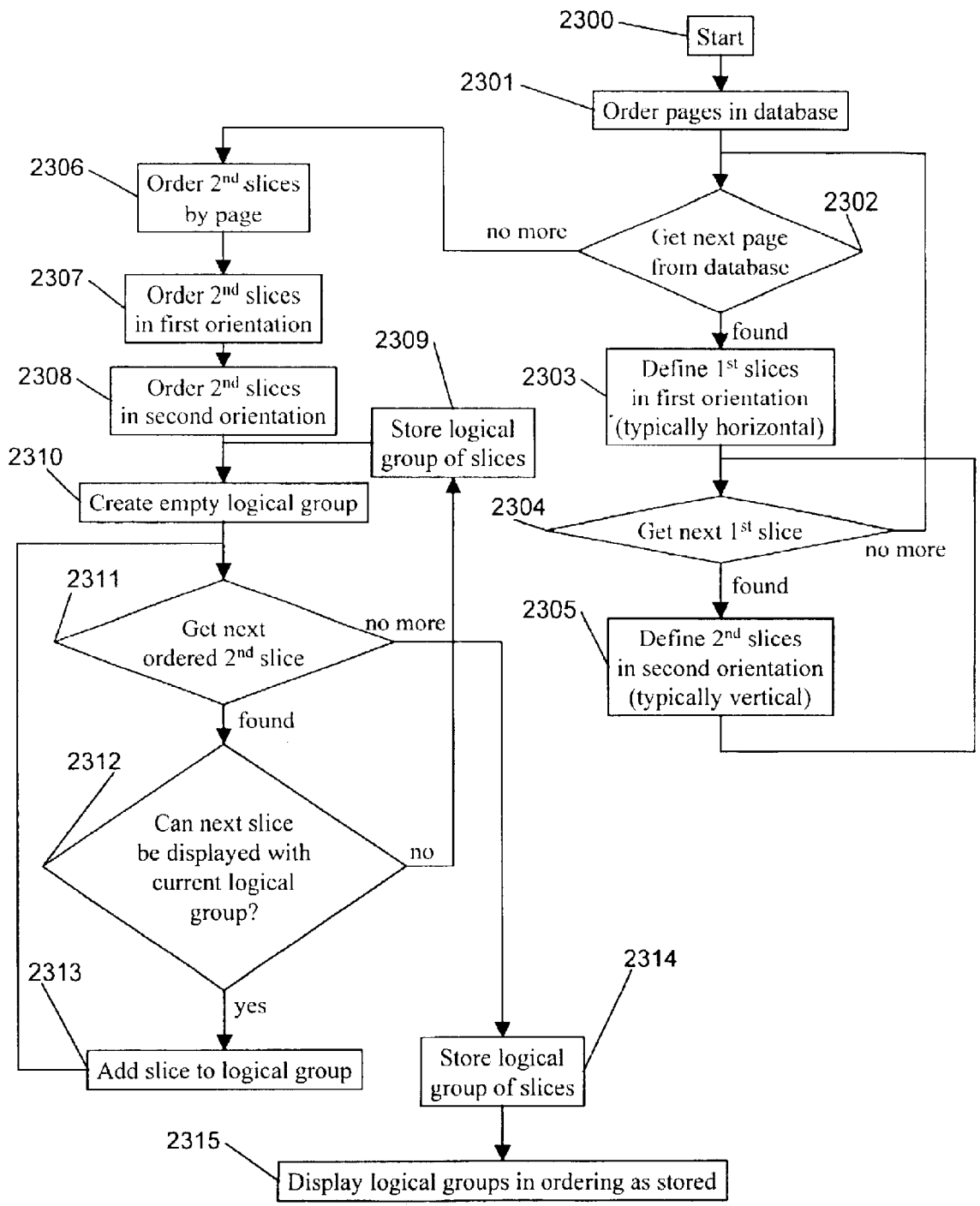
FIG. 23 illustrates an alternative method for providing for video display of music stored a music database, wherein after pages have been loaded in the database they are prepared for display (2300), and the pages are ordered in processing block (2301) (which defines $1^{st}$ slices) so as to be in logical page order in correspondence to their page numbers or some other ordering as desired.
Figure 24:
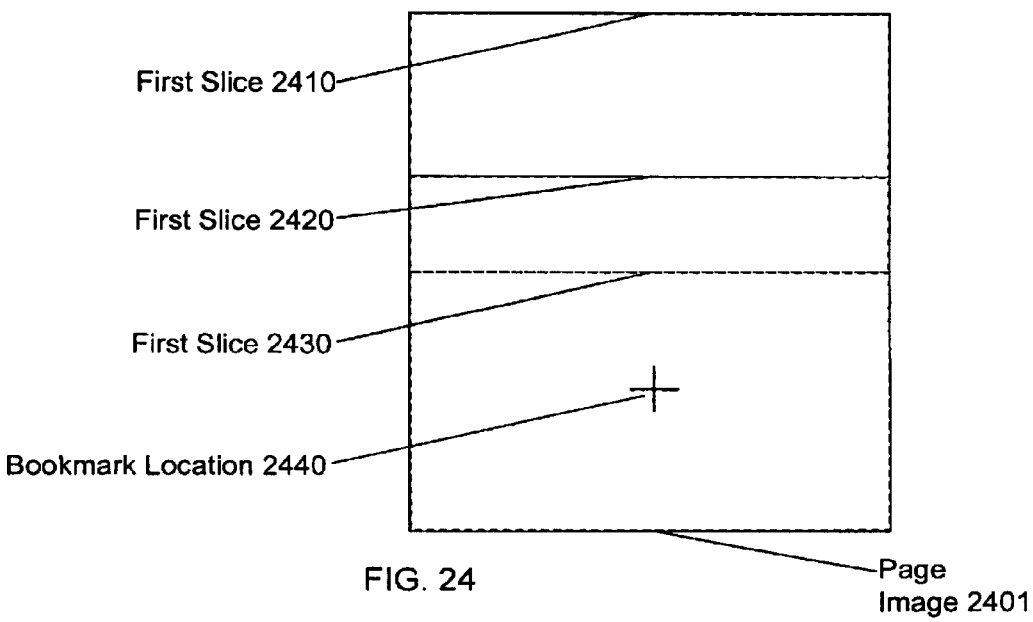
FIG. 24 illustrates the preparation and processing of the display data for video display, comprising dividing a page (2401) into three (or any number of) $1^{st}$ slices (2410; 2420; 2430), and wherein if a next $1^{st}$ slice is found, processing block (2305) defines $2^{nd}$ slices, whereafter Processing block (2304) obtains the next $1^{st}$ slice and processing block (2305) defines $2^{nd}$ slices for each $1^{st}$ slice.
Figure 25:
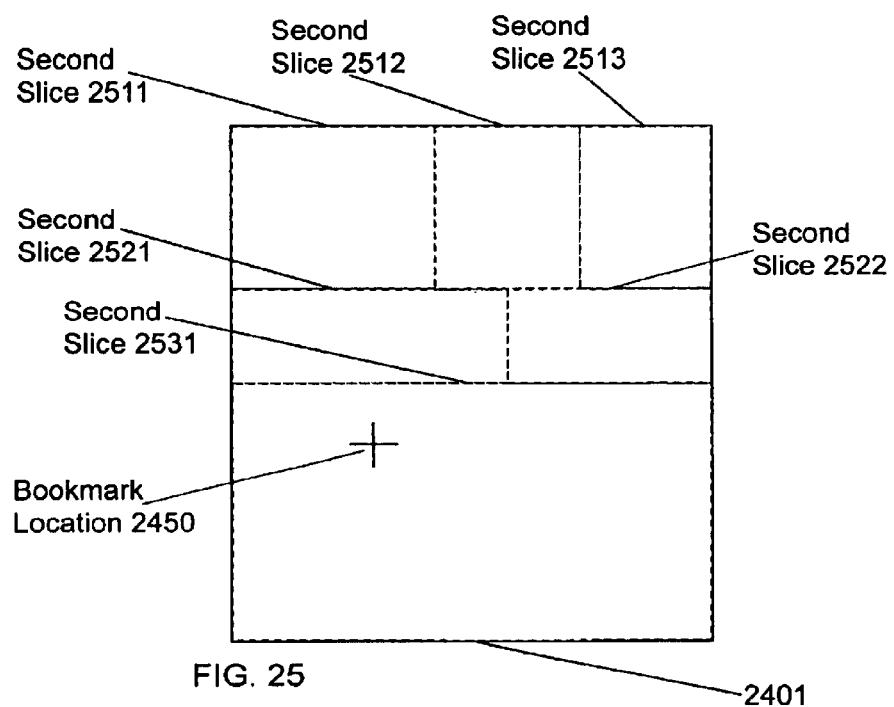
FIG. 25 shows typical completely sliced page.

An alternative method for providing for video display of music stored a music database in described in FIG. 23. After pages have been loaded in the database they are prepared for display (2300). The pages are ordered in processing block (2301) so as to be in logical page order in correspondence to their page numbers or some other ordering as desired. Processing block (2302) gets the first page. If found, the processing block (2303) defines the $1^{st}$ slices. Typically this is done by creating horizontal slices as shown in FIG. 24. The page (2401) is divided into three $1^{st}$ slices (2410; 2420; 2430). Any number of $1^{st}$ slices can be defined. The processing block (2303) may perform this function by obtaining user input to describe the break points between the $1^{st}$ slices, obtain previously stored information associated with the current page or automatically find horizontal lines which cross blank portions of the page. Processing block (2304) obtains a $1^{st}$ slice. If a next $1^{st}$ slice is found, processing block (2305) defines $2^{nd}$ slices. The processing block (2305) may perform this function by obtaining user input to describe the break points between the 2nd slices, obtain previously stored information associated with the current page or automatically by finding measures in the music. Processing block (2304) obtains the next $1^{st}$ slice and processing block (2305) defines $2^{nd}$ slices for each $1^{st}$ slice. A typical completely sliced page is shown in FIG. 25. $1^{st}$ slice (2410) is shown to be divided into three $2^{nd}$ slices (2511; 2512; 2513). $1^{st}$ slice (2420) is shown to be divided into two $2^{nd}$ slices (2521) and (2522). $1^{st}$ slice (2430) is shown not divided further and only one $2^{nd}$ slice (2531) is created. When no more $1^{st}$ slices are found in processing block (2304) the next page is obtained in (2302) and is similarly processed by blocks (2303; 2304; 2305). Processing block (2302) transfers to processing block (2306) when no further pages are available.

Processing block (2306) orders the $2^{nd}$ slices by their corresponding page ordering as defined in processing block (2301). Processing block (2307) orders all the $2^{nd}$ slices within a page by the first orientation. In the example shown in FIG. 25, the preferred ordering is from top to bottom. $2^{nd}$ slices (2511; 2512; 2513) would be first, but in no particular order. $2^{nd}$ slices (2521; 2522) are next but in no particular order. Finally $2^{nd}$ slice (2531) follows. Processing block (2308) then orders the $2^{nd}$ slices within a page and $1^{st}$ slice grouping. In the example shown in FIG. 25, the preferred ordering is from left to right. The order of the slices are now complete. In FIG. 25, the ordering of the $2^{nd}$ slices in an example page is (2511; 2512; 2513; 2521; 2522; 2531).

Logical groups of $2^{nd}$ slices are created in the next set of processing blocks. Processing block (2310) creates an empty logical group. Processing block (2311) gets the next ordered $2^{nd}$ slice, from beginning to end, as defined by the output from processing block (2308). If a $2^{nd}$ slice is available, processing block (2312) determines whether this $2^{nd}$ slice will fit on the display along with the other $2^{nd}$ slices in the logical group. If it will fit, the $2^{nd}$ slice is added to the logical group in processing block (2313). Processing continues to (2311) where the next $2^{nd}$ slice is retrieved. Processing continues in a similar manner until one of two conditions occur: First, the processing block (2312) may determine that the $2^{nd}$ slice cannot be added to the logical group. Then processing continues to processing block (2309) which stores the logical group in a sequentially local storage. Then an empty new logical group is created in processing block (2310) and the process repeats as above. When processing block (2311) can find no more $2^{nd}$ slices to process, the current logical group of is stored sequentially in block (2314) in a similar manner and in the same local storage as processing block (2309). The processing block (2315) is now available to display the logical blocks of $2^{nd}$ slices in the order stored in memory.

Figure 26:
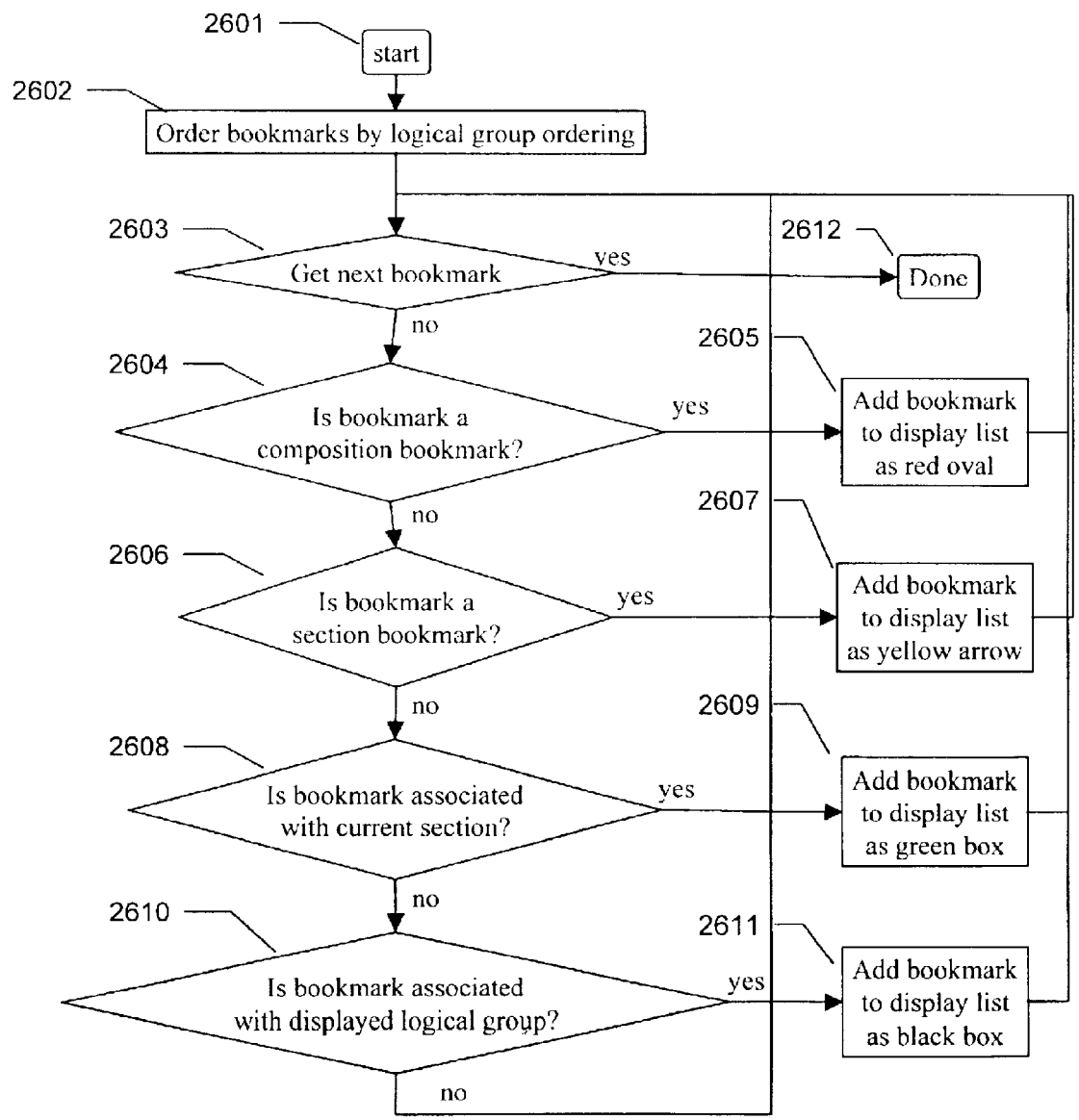
FIG. 26 illustrates one preferred embodiment for selecting the bookmarks for display.

There may be bookmarks associated with various locations on the pages. It is impractical to show every bookmark located in the system so only the selected bookmarks are displayed. FIG. 26 illustrates one preferred embodiment for selecting the bookmarks for display. The process starts at step (2601). The next step is (2602) where the bookmarks are ordered in the same order that the logical groups are stored in processing block (2315). Every bookmark has an associated location on a page so a bookmark can be associated with a logical block because the bookmark falls within the area covered by the logical block. Starting with the first bookmark, step (2603) determines whether the bookmark exists. Assuming it does exist, the bookmark is checked to determine whether it is a composition bookmark in step (2604). Bookmarks can be of many types, such as a composition bookmark, a section bookmark or a simple bookmark. A composition bookmark indicates the beginning of a composition. All following logical blocks are assumed to be part of that composition until another composition bookmark is found. A section bookmark is the beginning of a section within a composition and all following logical blocks are assumed to be part of that composition until another section bookmark or a composition bookmark is found. A simple bookmark is only associated with the logical block it is associated with. If the current bookmark is a composition bookmark the bookmark is added to the display list in a red oval-shaped button in step (2605). Otherwise, the bookmark is checked in step (2606) to determine whether it is a section bookmark. If the current bookmark is a section bookmark the bookmark is added to the display list in a yellow arrow-shaped button in step (2607). Otherwise, the bookmark is checked in step (2608) to determine whether it is a bookmark associated with a logical block within the current displayed section. If it is, it added to the display list in a green rectangular-shaped button in step (2609). Otherwise, the bookmark is checked in step (2610) to determine whether it is a bookmark associated with the currently displayed logical block. If it is, it added to the display list in a black rectangular-shaped button in step (2611). Otherwise, the next bookmark is obtained in step (2603). In addition, once completing steps (2605), (2607), (2609) or (2611) the next bookmark is obtained in step (2603). This series of steps repeats itself until no more bookmarks are left to process and the process completes at step (2612) where the selected bookmarks are ready to display. Other choices of colors and user interface structures can be selected consistent with the present invention. The decision is one of design choices for assisting in the communication of relative importance, spatial orientation and proximity, etc.

Figure 27:
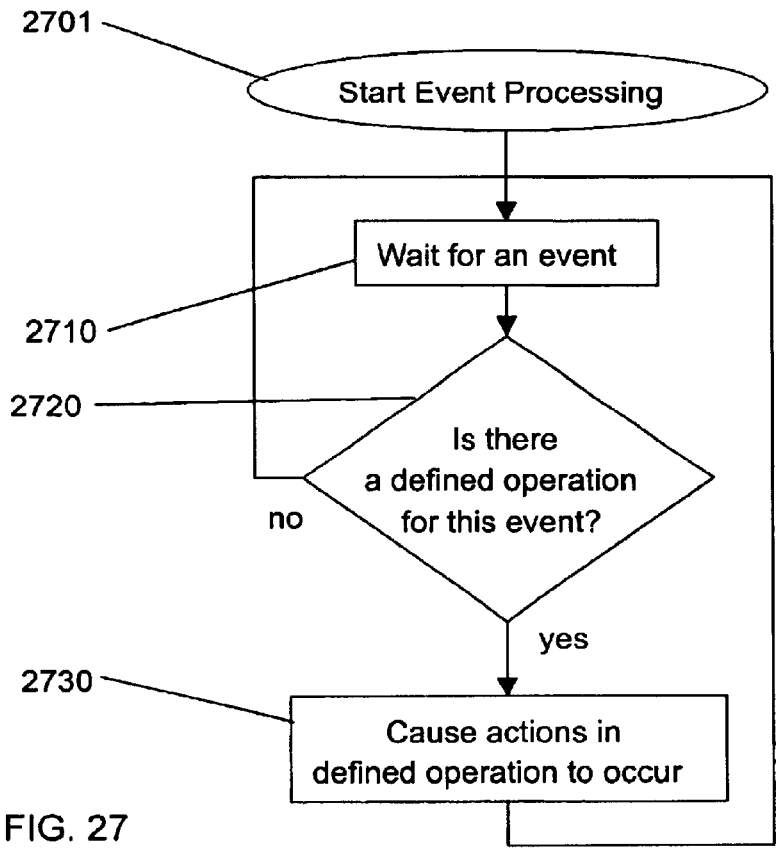
FIG. 27 illustrates the logic and flow for event processing in accordance with one aspect of the present invention.

FIG. 27 illustrates the logic and flow for event processing. Event processing is started in block 2701. Block 2710 waits for an event to occur. An event is created in response to an action affecting some part of the system. Examples of events include a presentation event of a logical block, selection event of a bookmark, and the creation event of a logical block. There are many events possible and only some of the events in the system should start a defined operation. This is done by creating an association between an event and a defined operation for only a subset of all events. Some events may not be associated with a defined operation. Block 2720 determines whether a defined operation is associated with the event. If there is no association, control returns to 2710 to wait for another event. If an association is found, block 2730 causes the actions in the defined operation to occur. After the defined operation is complete the system returns to block 2710 to wait for another action. Examples of actions include: a logical group is presented, the user selects a specific area of the display, a logical group is created, or the presentation an object. A logical group is created when it is stored in local storage (2309, 2314). A defined operation will cause a specific set of actions to occur in some part of the same system or another autonomous system. An example of a defined operation has a first action to create a new logical group and a second action to present the newly created logical group. The previous example's defined operation could have an association with a selection event of a bookmark. Another example of a defined operation includes only one action to present a logical group. The previous example's defined operation could have an association with a creation event of a logical block. A third example of a defined operation has a first action to present the first object in the bookmark information contained by a bookmark, a second action to present the second object and further actions as needed to individually present the remaining objects until all the objects are presented. The previous example's defined operation could have an association with the presentation event of a related logical block. These actions could create other events which in turn cause other actions to take place. The design of events must be carefully double-checked so that any particular event does not create a never-ending cycle of events where the event causes an action to take place which causes the same event to occur again and again.

A bookmark is related to a specific location (2440) of an image (2401) and contains bookmark information that provides special details important to the system or the user that can be used to make decisions or provide information to the system or user. Images are represented by data that provides information regarding the visual representation typically using a rectangular grid of coordinates to represent the location within the image. An image can be represented in many ways. For example, every point on a rectangular grid may be specified or lines and other symbols, such as letters, can be placed in the image using the rectangular grid. A specific location uses the same grid of coordinates to relate a bookmark to the image. Logical groups are created from a collection of sections from a set of images. A related logical group is associated with a bookmark because the specific location of the bookmark is contained within one of the collection of sections in the related logical group. For instance, slices 2511, 2512, 2513, 2521 and 2522 could be combined into a logical group and 2531 combined into another logical group. The latter logical group would be the related logical group with respect to bookmark 2440. When a user selects a specific area of the display 2550, all items that are presented to the user in the specific area are selected. This would include a bookmark whose location is within the specific area of the display associated with a displayed and related logical group.

Figure 28:
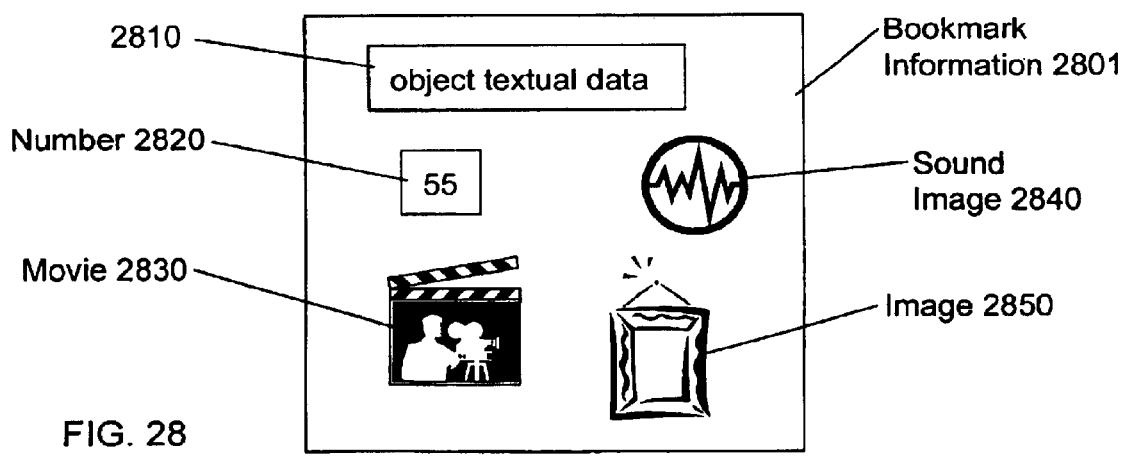
FIG. 28 illustrates various objects in accordance with the present invention.

FIG. 28 illustrates various objects in accordance with the present invention. The bookmark information (2801) contained by a bookmark is a collection of objects. An object is an information source which can be very simple to very complex. Examples of objects are: a number (2820), text (2810), an image (2850), a graphic, a drawing component, a sound image (2840), movie (2830) and an audiovisual image. Objects are always available to the system and may be presented to the user. The initial presentation is the first time that an object is presented to the user. The system may try to present an object more than once but the user will not see a difference because the object is already presented. Different objects are presented in different ways. For instance, a number may be converted to text and presented on the display as text. It also could cause a light to flash in correspondence to the number. Text is typically displayed as text but could also be converted to speech and audibly presented to the user. Movies would be presented in either one or both its audio and visual components.

Multiple screens of various configurations can operate in a synchronized manner during the page-turning process. For example, three appliances can be configured side-by-side in a linked mode. Whereas, the left display is configured to display the first page and every other odd numbered page thereafter; the middle display is configured to display every even numbered page; the right display is configured to display the second odd numbered page and every other odd page thereafter; and all displays are synchronized to display the pages of the piece in the proper order. If the left appliance receives a signal to change the page order, then it will revisit the last page that it displayed, and the middle and right displays will follow. If the right appliance receives a signal to change the page order, then it will advance and send signals to the left and middle appliances to advance accordingly. The aforementioned page-change methodology utilized for system with multiple screens may be logically adapted for use by systems with any number of displays.

Page turning can also by synchronized among networked ones of independent ones of the appliances (linked sets and stand alone) so that all networked appliances synchronously turn pages responsive to a single signal, such as from a conductor, stage hand, etc.

Referring again to FIG. 13, the navigation mode logic (step 630), responsive to the external input (step 609), and the program data for the navigation/menus functionality, provides for user interface functionality definition (step 631), and utilization of colors and shapes and locations to assist the user in navigating, based on feedback of where the user is in the music selection relative to the bookmark locations and colors and shapes as shown (step 632). Where the user has provided an external user input (step 609) such as actually selecting a specific bookmark to navigate to, (step 630) leads to (step 633) providing navigational protocols. Responsive to this input, the navigational protocol process (step 633) implements logic to cause the processor to find the data in memory corresponding to the bookmark and provides for the appropriate image (e.g. the selected music data) display on the respective electronic music stand system's display apparatus.

Bookmarking provides for marking of a location in the music composition with a label, and provides a displayable table for user selection for navigation through the music composition. In this regard, the method further comprises selecting portions of the music data of the selected logical sections for bookmarking; selecting a specific location within an associated identification (ID) within the selected portions; providing bookmark information; associating the bookmark information with the associated ID and the specific locations; and providing for selective display of the specific locations responsive to user input based on the respective bookmark information. The selection of portions for bookmarking can be embedded in the music data done by a user of the system of the present invention. Any type of user input is acceptable. User input of selections for bookmarking, specific locations and bookmark information can be via a user touch-screen input display, a switch input, a button input, external computer download of control data, voice recognition, etc. The method further provides for maintaining bookmark data for bookmark locations and storing the bookmark data; providing a bookmark selection mode for displaying the bookmark information and respective associated ID; providing for selection of the specific locations responsive to a bookmark selection input; and displaying a music visual display for the selected specific locations. Thus, a user can quickly navigate through the entire musical composition using the bookmarks.

The bookmarking method further comprises providing a display for a table of bookmarks representative of the bookmark data for at least some of the bookmarked locations. To facilitate quicker, easier and more intuitive user interface, the present invention further comprises structuring layout of bookmarks in the display of the table of bookmarks in a physical juxtaposition and relationship to convey information content by relative placement of the bookmarks. The structured layout provides information content relating to major movements, minor movements, relatively close sections, and relatively far sections via color and position of display of the bookmarks in the table. Color can also be used to structure the layout.

Bookmark data is associated with a location on and within the music notation. The user can provide input to select locations, enter text, and color choices, etc. Alternatively or additionally, the system can respond to control data—either embedded in the music data or as additional data associated therewith, such as next logically associated transitions (e.g., a repeat) and loaded into the cache and prepared for display. A second bookmark is defined by the association between the bookmark data and the next logically associated transition to provide a second bookmark whose location is associated with the next logical section. There are two sources for the next logically associated transitions from a particular current location and video presentation display of a single or multiple sections. The first source is the physical layout of the music data and the rules of ordering and time for music are used. For example, music is read from left to right, top to bottom and ascending page numbers. The second source for transitions is control data, such as a second bookmark associated with the displayed section. Both of these sources are used by cache logic to predict the possible next section that the user may choose. This intelligent pre-loading of the cache memory by the cache logic predicts which music data (or other type of data, as appropriate) is needed in what order and assures its fast availability. This is very useful such as following branches outward where a user can select a bookmark on a displayed section and if that bookmark has an associated second bookmark then the location associated with the second bookmark will be pre-loaded into the cache memory.

The Presentation GUI controls a cache of stored music (or other type) data. Caching data is a commonly used method for optimizing system speed and enhancing performance, and various data-caching methodologies are well-known and widely published (e.g.:—*Archimedia, Archive Management System, System Overview.* Bristol: K-PAR Systems, http://www.k-par.com; Johnsson, Bjorn Thor. *Application-oriented Buffering and Caching Techniques.* University of Maryland, PhD. Dissertation: 1998;—*How Caching Works.* http://www.howstuffworks.com; Mazzucco, Paul. *The Fundamentals of Cache.* http://www.slcentral.com: 2000; McCarthy, Tim. *Building Your Own In-memory Data Cache.* http://www.interknowlogy.com.) The music data can be stored locally or at a remote location. However, remotely stored data will produce slower display transitions, than locally stored data. The music data may be stored at a different resolution or may need to be otherwise altered for display—further delaying presentation. The cache contains display-ready data for immediate display and is typically stored in the Performer System's RAM. The cache selectively maintains previously displayed sections and anticipates the user's next request for data based upon historical usage and proximity to other sections within the context of logical order. Cache-size is limited and configured for optimal system performance, so it is periodically refreshed as users introduce new data. The cache may not be able to predict successive sections when the musician is not following the logical flow of the music with 100% accuracy (such as a random jump to an unrelated composition during rehearsal). However, successively selected sections can be predicted with 100% accuracy when the user follows the logical flow of the music (or other) content. The cache can load and prepare the next logical section for display transitions by obtaining music data from storage (local or remote) as a background function while the user views the presently displayed music prior to requesting a transition. Optimally, the next logical section is ready for display upon request.

Similarly, bookmark data is associated with a location on the music notation along with the next logically associated transitions (i.e., a repeat) and loaded into the cache and prepared for display.

As illustrated in FIG. 7A, in a preferred embodiment, each performer system saves an image of the respective music page in the short-term cache (e.g., high speed RAM) of the Data Storage Apparatus (205) as shown in FIG. 7A. The processor (201) calculates the next most likely pages that the user may request to display. The processor then reads the music page information from the long-term memory, typically a hard drive or flash ROM, of the Data Storage Apparatus (205) and transfers it to the short-term cache performing any transformations of the data to prepare it for subsequent display. When the user requests a new page to be displayed (as described in the previous paragraph), this process is increased in speed since the information has already been preloaded.

The casing (102) that houses the electronics of the electronic music stand performer system, as illustrated by FIG. 1, is mounted to a stand: a vertically oriented support (107) that is coupled to a floor-base (108). In a preferred embodiment, the support (107) and base (108) are adjustable and provide pivoting and telescoping connections for attaching to the mounting on the casing (102). Stands are commercially available from vendors including: Wenger of Minnesota, U.S.A., and Manhassett Music Stands also of the U.S. Using VESA (Video Electronics Standards Association) standard for computing device mounting holes for mounting the casing (102) to the vertical support (107) provides for compatibility with any of a variety of industrial and consumer stands and computer devices in compliance with the VESA standard. A quick connect/disconnect mechanism can be mounted to the stand and the appliance casing to facilitate quicker setup and breakdown. Examples of industrial and consumer stands in compliance with the VESA standard (and quick connect/disconnect mechanisms) include commercially available products from Ergotron, Inc. of St. Paul, Minn. and Compucaddy, both of the U.S.A. Alternatively, the casing (102) can be handheld or mounted to or set upon another object (e.g., a piano, wall, table, etc).

The music notation data can be organized into compositions. A Composition Bookmark is defined at the beginning of each composition. Each composition can have a defined set of major pages—a movement. The beginning of each set of major pages can be identified by a Major Bookmark within a composition along with other significant rehearsal numbers or letters identified as Minor Bookmarks. When bookmarks are displayed for the musician, all Composition Bookmarks are displayed. In one embodiment, all Major Bookmarks are displayed that are associated with the current composition, and all Minor Bookmarks are displayed that are associated corresponding to the current Major Bookmark. In a preferred embodiment, the musician needs to perform no more than three selections to jump to any bookmark within the set of loaded compositions.

Bookmarks are used to jump to specific sections in the music. Therefore, a bookmark must be associated with a specific location in the music, rather than a formatted page. Bookmarks can be accessed in various ways. For example, a series of bookmarks can be displayed, whereby the user selects the desired bookmark and the associated section is displayed.

Continuing in the book-marking process and function, the system provides for selection logic for selecting a portion of the music data of the selected logical sections for bookmarking by the user. Logic provides for response to a user's selecting a specific location with an associated I.D. within the selected portion. Association logic associates the bookmark information with the associated I.D. and the specific location. Bookmark logic provides for the selective display of the specific location responsive to user input based upon the user's response to the respective displayed bookmark information. User input can be via user touch-screen input, external switches, a keyboard (physical or virtual via the touch screen) a button, voice recognition, or otherwise. A memory is provided for maintaining bookmark data for all bookmark locations, and selection logic provides for a bookmark selection mode which displays a table of the bookmark information with respect to the associated I.D. for the user to use. In a preferred embodiment, the librarian logic provides for selection of a specific location, while the performance logic provides for displaying the music visually for the selected specific location. The bookmark selection mode can provide for display of the table or a list of bookmarks, or any other format for displaying the bookmarks, and providing for user selection of bookmarks providing for navigating through the logical sections of the musical display in any order as defined by the user. As discussed above, the layout of the bookmarks in the display of the table is structured to facilitate ease of user utilization.

In accordance with one aspect of the present invention, in the book-marking process and function, the system used on the illustrated appliance provides for selecting a previously defined bookmark and associating a second bookmark with the first bookmark. Logic provides for response to a user selecting the first bookmark by selecting the second bookmark and causing the second to be associated with the first. Association logic associates the first bookmark information with the associated I.D. of the second bookmark in addition to previously defined information in the first bookmark. The second bookmark's associated location can be on the same appliance as the first bookmark, or on a separate appliance, or both. User input can be via user touch-screen input, external switches, a button, voice recognition or otherwise. In the preferred embodiment, the first bookmark is displayed on the screen as text, an icon or user drawn images. The visible display of the first bookmark is responsive to the user via touch-screen input, external switches, a button, voice recognition or otherwise. Search logic provides for associating the visible display of the first bookmark, obtaining the associated I.D. of the second bookmark, searching for the second bookmark and obtaining the location associated with the second bookmark. Display logic is then provided to begin the transition of the display to cause the second bookmark's location to be displayed.

Multiple screens of various configurations can operate in a synchronized manner for movement from one section to another. For example, each device will move to a new section as directed by of one or more of the networked appliances. When one of the appliances in the group is instructed to move to another section, via touch-screen or button, it sends a signal to all of the appliances in its group to move to the same section.

By use of the association logic and the first and second bookmarks, all coordinated appliances are able to display the same section. A signal may be sent from one user to all of the users and appliances in the same group. For instance, the conductor may wish to have the entire orchestra start at letter "B" and sends a signal to the entire orchestra to cause every appliance to display that section. Alternatively, the conductor can make a change to an individual part of the conductor's score, and the first and second bookmarks and the association logic provide for display of the conductor's marking on the appliance(s) for that respective individual part piece (e.g., all first violins). Alternatively, or additionally, the conductor can view the individual part piece on the conductor's appliance. The displayed music score need not be identically formatted among appliances, but alternatively can be formatted to display different parts for the conductor, violins, cello, trumpet, drums, etc. Appliances can also be programmed to prompt the user to accept or deny signals from other user or appliances.

Another embodiment of accessing bookmarks allows a user to specify a user-drawn notation associated with a bookmark. Thus, if the user touches the screen on a bookmark notation, then the display would change to the associated bookmark.

Alternatively, the bookmark list can be dynamically displayed and determined by the current section of displayed music. The bookmark list displays the bookmarks that are closest to the current section being displayed. At the highest level, the first page of each score or music composition is displayed. Then the major bookmarks (i.e., movements) in each piece are displayed for the current score being displayed. Then the minor bookmarks (i.e., measure numbers, pages, letter/numbers, etc.) in the current score (or music composition or script, etc.) are displayed. First the letters in the current major bookmark section are displayed. If room on the display is available, then all the minor bookmarks can be displayed for the current score.

The musician must be able to select the position of the music to be displayed by moving sequentially forward or backward as previously described. However, there are many times when the musician needs to jump to a particular page out of sequence, and bookmarks can be assigned to user selected specific locations in the music notation. The bookmarks are initially displayed for selection by the musician touching the touch screen (or pointing to, pressing a button, or typing commands), in order to display a list of bookmarks. Each bookmark can be named by the user, and thereafter selected from a list of user-defined bookmarks. The Performer System will then display the selected music notation data and present it in an appropriate format. The Performer System may use information about which pages are currently being display, which pages have been displayed and which pages will likely be displayed next.

As shown in FIGS. 3, 8, and 16, the electronic music stand provides book-marking capability so that the user can navigate around the music composition to find specific locations within the music and quickly jump to that location. The user interface is set up to optimize intuitive use of the book-marking system. In a preferred embodiment, color-coding of the bookmarks is based on frequency of use, relative location of the selected bookmark in the overall ordering, and timeliness of use. For example, the color black bookmark is the current position (prior to jumping to the bookmark table), while relatively close pages will be shown in green for their bookmarks with most or all of the closer pages displayed (such as every page or every other page), while relatively further pages are shown in a different color (such as blue) and less pages displayed only displaying one bookmark for every five, ten or larger numbers of pages. The choices of color and placement are design criteria the system designer can tweak and select. Thus, utilizing bookmarking conventions and protocols, the performer subsystem helps the user intuitively navigate quickly through the bookmarks and improved functionality is provided.

Musical notation is used, in the generic sense, to refer to any way of conveying musical performance instructions including but not limited to common musical notation with staffs, notes, sharps, fiats, and clefs, extending to written instructions in text form to supplement this or supplant or partially replace, as well as alternate forms of expression such as chord charts, words and chords (letters), tablature, any video, graphic, audio, audiovisual or other display presentation or combination of the aforementioned types of presentations. In addition to music notation, any other type of data can be displayed, such as scripts, text, images, video, etc.

Referring again to FIG. 13, when the Edit Mode (step 650) is selected, the processing provides for the user to make notation via the input apparatus for display along with the display of the stored image data (e.g. music data) for display as an overlay to the otherwise displayed music image data. Each additional edit session can be saved as a separate image. Overlay layer, thus providing for storage of multiple sets of revisions.

In one embodiment, when user edits and notes are displayed on top of the music display, an Undo soft-touch button appears. This button will undo and make invisible, but not delete, the last drawn line. When edits and notes are invisible on the music a Redo soft-touch button display appears. This button makes visible the last line made invisible. A Delete button also appears. The Delete button will delete permanently all invisible lines. Alternatively, the user can select particular revisions to be deleted.

Music editing mode provides for user modification, deletion, copying and other operations on the music information displayed. In this mode the music display is slightly smaller to accommodate on-screen soft-touch buttons along the peripheral edges of the display (e.g. right and bottom margins) to perform operations.

In a preferred embodiment, the draw mode allows the user to draw notes or notations on the music or other displayed image. A set of soft-touch buttons are used to select a color. Another soft-touch button is used to select the width of the line drawn (e.g. thin, medium and wide (highlight)). When the user touches the screen in the displayed music area, the line is started. A line is drawn on the screen as the user slides a finger or stylus across the screen and is completed whenever the user stops touching the screen. Multiple lines can thus be drawn. Pop-up palettes can be provided to provide standard notations for the user to select and position on the display (e.g. staff line, clef, notes, accidentals, etc.)

The musician may need to add his own notation via an image overlay to the original music notation obtained by the Performer System. The musician can change the width, color and other characteristics of the lines drawn by touching, pointing to, pressing or typing the changes on specific touch-sensitive areas, specific buttons or entering specific text commands. The image overlay is then added to the display of the image whenever the particular image information is displayed. The lines are drawn by the musician touching, pointing to, pressing or typing commands that describe where a line or lines should be drawn. As the musician moves the location of the touch-sensitive input, the line is extended to include that position. The end of the line can be defined when the user stops providing touch-sensitive input by removing his or stylus or finger from the screen, or does not provide any additional input during a pre-defined period of time. Additionally, exiting the draw-mode effectively terminates any line that has not been previously terminated.

Lines are stored relative to the dimensions of the music notation data and can be easily positioned relative to the music notation data regardless of scale. Each line can be stored with a time-stamp that indicates when the line was drawn. The time-stamp may be used as line-selection criteria, for storing and identifying levels of revision, etc.

The lines drawn can be selected to be opaque, completely covering the underlying music notation. The lines can also be selected to be semi-transparent and drawn in a manner called "Color Printing," allowing the underlying music notation to be visible through the overlay.

Selected lines can be made invisible in the reverse order that they are drawn—the last line drawn is the first to be made invisible. Alternatively, a user may select a particular line or lines or region of display by defining the corners of a rectangle. The selected lines can then be made invisible responsive to the user. Invisible lines can be completely removed from the Performer System as specified by the users, or be made re-visible as specified by the user.

The color of the line (CL) is determined by the user's selection, such as via "soft" touch screen buttons as discussed above, and has three components, red (RL), green (GL) and blue (BL). Each of these components can take on values from 0 to 255 where 0 is none and 255 is full intensity. For example, when all three components are 0 the color appears as black. When all are 255 the color appears as white. The line is drawn using the color CL and combined with the color of the music data at each pixel where CP is the color at pixel at a particular pixel of music data to generate a new color (CN). The pixel color is not merely replaced by CL because music data would be eliminated and then would become unreadable in that area. Instead CN is affected by both CL and CP. This method of combining the colors is called, Color Printing or Color Printed.

In one implementation, CN is Color Printed by combining CL and CP by multiplying each component of CL times the corresponding component of CP and dividing by 255 and rounding to a integer. The rounding could be to the nearest integer, e.g., 11/4=3, or can use truncation, e.g., 11/4=2, or other method. For example, if CP was [10,150,255] and CL was [128, 200, 100] then CN would be [5, 118, 100]. A second implementation of Color Printing is defined by combining CL and CP bit-wise by AND-ing of the component values of CL in their standard binary representation with the corresponding component values of CP. Using the above exemplary values for CL and CP, the resulting CN for this implementation would be [0, 128, 100]. In both implementations, it is preferred to select CL with all non-zero components so all the components of CN are dependent on CP also.

In a preferred embodiment, Redo and Delete buttons appear in the Draw mode. A Select feature allows the user to select specific lines (added by the user in edit/draw mode) on the screen by touching the screen by touching the screen across the specific lines. All the lines within the box defined by the starting and ending points on the touch are selected. The selected lines can be enhanced by a "halo" display. When lines are thus selected, the Undo button appears. This button will undo and make invisible, but not delete, the selected lines. Additionally, when any area is selected, a "SEND" button appears. If this button is touched (selected), a list of other appliances appears on the communications network available to send the selected area to. The user can then select any available desired appliances, and the selected area of drawings are transmitted to the selected appliance or appliances.

The draw mode allows the user to draw notations on the music. A set of buttons is used to select a color. Another button is used to select the line-width, (e.g., thin, medium and wide (highlight)). In draw-mode, the line begins where the user touches the screen and continues until the user stops touching the screen. Multiple lines can thus be drawn.

Preferably, the system utilizes a touch-screen overlaying the display. The touch-screen may require the use of a special stylus, be opaque to block light beams, require direct contact by a hand, or it may just require pressure from any object. In some embodiments a visible cursor is provided to assist the user to follow user input.

Alternatively, or additionally, a physically remote input device is used (instead of a touch-sensitive area overlay on the display), e.g., a traditional computer mouse, a keyboard, or set of physical buttons may be used to provide user input to the appliance. With a non-touch screen display, the display provides a visible cursor or other visual cues so the musician can position the cursor in the correct location.

Buttons, typically implemented using switches, or via touch sensitive areas of screen display buttons can provide specific user control over the device. A button can be integrated into the physical case of the Performer System or can be provided external to the case by plugging into the Performer System and located in the vicinity of the Performer System to be more convenient for the musician to actuate the button. Also, external signals from other dissimilar devices may provide an input to the Performer System. These inputs do not necessarily require that a visual cue be provided on the screen. For instance, one input may cause the system to advance to the next logical page, while another may cause the system to return to the previous page, while yet another input causes a jump to a defined bookmark, while yet another input provides for controlled dimming or brightening of the display. The touch-sensitive inputs can be used by statically or dynamically defining areas of the touch-sensitive area that implement page-turning and other functions such as mode changes, bookmarks, displaying information, and shutdown.

In accordance with one aspect of the present invention, the multi-dimensional music display, communication and transformation system of the present invention also enables a user to select one or more musical compositions from a larger database from a plurality of musical compositions. The database can be stored locally within the workstation, on site, or remotely stored and transmitted to the user (such as over cable, wire, telephone lines, wireless (such as radio frequencies)). The user can also optionally edit the selected score of the composition (such as changing the key and/or any note and/or timing, etc.) to suit his or her taste. The score (altered (the derivative composition) or not (the original composition)) can then be transmitted to one or more displays (such as liquid crystal or CRTs) in the music stands of the band or orchestra. The present invention, therefore, provides an efficient, paperless solution to communicating, presenting (displaying), and optionally one or more of transposing, editing, inputting, comparative testing-teaching, conducting, and disseminating music to one display or a large number of displays. Each display can have the same, or a different, unique, customized presentation of music notation as appropriate per selection, responsive to a set-up by a system, automatically per predefined parameters, and/or to user input. The score can also be printed out if a hard copy is desired.

Modification can be performed on rhythm, primary key, individual notes, chords, etc. The vast store of musical information stored in digital notation format and/or any video format, can be broadcast (analog or digital) to a local music workstation or a master controller, which can also be a local workstation. The master controller can be a stand alone unit, or act as a server as well as its own stand alone unit, or simply as a server to a plurality of other stand alone units. However, in the minimal configuration, only a single musical user station is needed.

Referring again to FIG. 12, if no changes are desired, the musical score for the composition that is selected is broadcast, transmitted, or otherwise transferred to the workstation music stand appliance (220). It is internally stored in the local workstation music stand. Next, the score is displayed (225) on the workstation display (e.g., LCD or CRT) or a video projection system. The display can also be part of an integral stand-alone workstation or an interconnected group of components including a personal computer (such as Macintosh, or DOS or Windows PC).

Referring again to FIG. 12, the display mode selection is then made (1230). This permits selection of an operational display mode, not simply choosing the resolution or color. The two main choices in the preferred embodiment are a manual mode (1250) and an automated mode (1240). In the automated mode selection (1240), there are many sub-modes or options, such as the operational mode that permits the performer or user to do their performing without having to tend to the selection of the portion of the music to be displayed or the turning of pages. In the auto performance mode as shown on LCD (135), there is provided the simultaneous displaying of the selected musical composition, and a display representative of the audio performance of the user, and a divergence signal or divergence data representative of analyzing the performance, preferably in approximately real-time.

Figure 17:
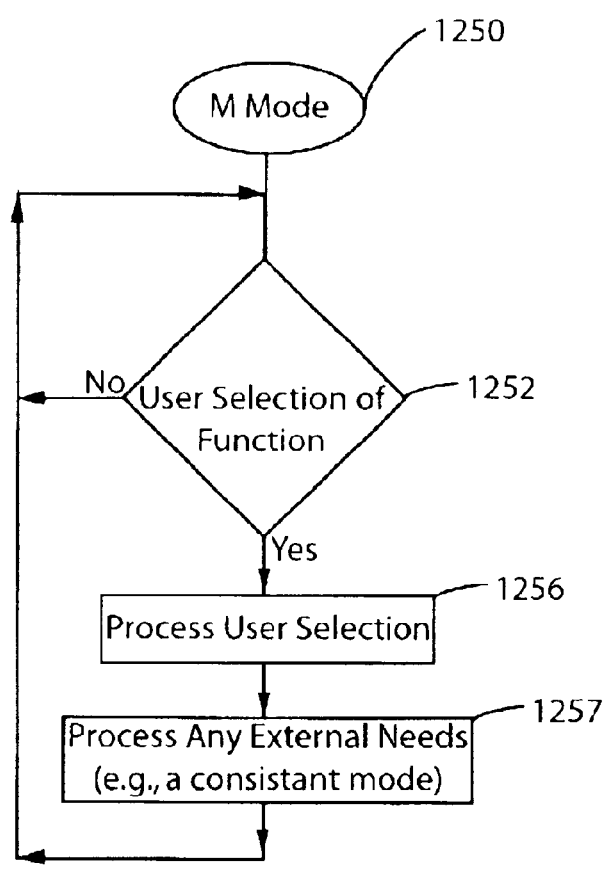
FIG. 17 illustrates the manual mode (1250), which provides for user manual selection of functions (1252), such as hitting a button or a touch screen to cause the turning of the page of the display, or to go back a page or to scroll forwards or backwards, or to increase the font size or magnification of the music presentation.

FIG. 17 illustrates the manual mode (1250), which provides for user manual selection of functions (1252). There are many functions that the user can select, even in the manual mode, such as hitting a button or a touch screen to cause the turning of the page of the display. Another function is to go back a page or to scroll forwards or backwards. For those who are vision impaired, another function can increase the font size or magnification of the music presentation.

Thus, there are many manually selected functions that can be provided. While the manual mode can have automated functions selected, it is distinguished from the automated mode where control is partially pre-defined without user assistance. In the manual mode (1250), the user selects any and all advanced features that are going to be provided (some of which can be automated). The selected function is then processed (1256).

Next, any ongoing needs are processed (1257). These needs can include any overlapping automated function (not otherwise inconsistent with any other selected function).

In one preferred embodiment, the workstation is provided as a music stand where the display presentation is a liquid crystal display (LCD). The LCD that can provide monochrome, gray scale or high quality color displays, depending on design and cost constraints and desires. Other display types can also be used. A touch-screen input can provide for simplified and adaptive user input selections. An optional built-in metronome function can also be provided for display presentation (audio and/or video). In one embodiment a music sound subsystem provides for the music to be audibly reproduced at the workstation through a speaker or headphone jack or other output. A SMPTE and/or MIDI interface can also be provided, to permit external timing control for page turns, the display and/or audio from MIDI music data, etc.

As illustrated in FIG. 13, when the system is in the Option Mode (630) (i.e. where Option Mode has been selected), the system proceeds to (steps 655; 660; 665; 670). In the Protocols Mode (step 655), the system sets up defining protocols for user interface, communications, orientation of the display, etc. Other protocol set-ups include user log-in, start-up state, color schemes, timing parameters, and others. In the Page Turning Options mode (step 660), the system permits establishment of page turning options. For example, by utilizing the touch-screen input on the touch-screen display (or other input apparatus in conjunction with a non-touch screen display), the user can select page-turning options such as quick transition (nearly instant), fade, wipe, peel, or other effects. Additionally, the user can choose to set a time delay for the page turning time, and set time delays for transition of the page turn from the top of the page while leaving the bottom visible for a fixed (defined) time.

In a two-screen system, the second screen can continue to display the current page while the first screen can display the next page subsequent to that displayed on the second screen, with a predefined time delay added before changing the second (right) screen to its respective new page when implemented as a step (or delayed) page turn mode. In the stand alone mode of set up (step 665), the user sets up the music stand performance system as a stand-alone system, with each of the two Performer Subsystem operating independently thereafter as stand-alone. A single screen Performer system inherently operates as stand-alone. Where multi-screen (linked set) mode (step 670) is selected, the user further proceeds to define options by making selections of the displays of the Performer Subsystems defining the logical order, from first to last (e.g. right to left tom to bottom, etc.), that each of the Performer Subsystems (e.g., FIG. 5B (500-A; 500-B)) provide for display of music. In a preferred embodiment, the linked system permits the user to define each of the linked subsystems' displays as a left page (step 671) as one or more middle pages (step 672) (where appropriate), and as a right page (step 673). This can be extended to various sizes (e.g. 3", 8", 10", 12", 15", 17", 19", etc.) and multiple display pages (2 screens, 3 screens, 4 screens, and so forth) and to provide additional options (e.g., changing display orientation from portrait to landscape and vice-versa).

The system can be set to default (with no external user input) upon start up to commence operation in the performance mode and can display a predefined piece of music in accordance with start up parameters. Alternatively, the user can actively select the performance mode (step 640). In the performance mode, control and management of display of the music data, as well as page changes, caching, buffering of data to increase operational speed, are provided. Forward and backward page changes can be implemented in various ways. In one embodiment, page changes are responsive to touching specified areas of the screen. These areas can either be in the same area where the music is displayed or in an area of the screen not covered by the music data.

For example, in FIG. 5, a forward page change would be mode responsive to a touch of screen (504) and a backward page change could be made responsive to a touch of screen (503). The pages on the screens (503; 504) would change by two pages with screen (504) always containing (displaying) the next logical page after the page displayed on screen (503). In FIGS. 1 and 4, a forward page change would be responsive to a touch of the right side of screen (135; 404). The backward page change would be responsive to touching the left side of screen (135; 404). The page change in FIGS. 1 and 4 would only change the displayed page by one. In FIG. 6, a forward page change is responsive to a touch of screen (605) and the right side of (604). The backward page change is responsive to a touch of screen (603) and the left side of screen (604). In the manner described for FIG. 1, the pages would be ordered by their position but in FIG. 4 each subsystem would move 3 pages.

As illustrated in FIG. 8, Appliance Options logic (1006) provides the user with selection of display and page-turning options regarding the presentation of the appliance. For example, on one selected options screen display, selection of one button toggles the background color between various levels from normal (white) to inverse (black). Another button provides for selection of changes in the transition between Immediate, Step and Reveal types of page transitions. Alternatively, or additionally, each of the performer subsystems is selectively responsive to an external control signal which triggers selective dimming and brightening of the brightness level of the display and/or remote control of page changes, or downloading of program, control, or music data.

The system and methodology of the present invention eliminates most of the annoyances in performing music using any written notation (whether on paper or electronically displayed on a presentation apparatus such as a screen) is smoothly performing music and timing "flips of pages", as well as the inefficiency and time losses involved in the communication of change to a third party. This even more important when user is marching, and/or where both hands are required simultaneously to play an instrument.

As discussed above herein, in accordance with the present invention when a new section of music is displayed on an appliance, there are multiple page-turn transitions that can occur depending upon setup selection. A first transition is the Quick or Instant page-turn. The display of new information immediately replaces the current displayed sections with the new sections to be displayed.

A second transition is a step change page-turn. The first portion of the entire display immediately changes when the transition starts (such as activated by a touch or switch or other activation). The first portion is the top half (approximately) of the display in the case of a single screen display (stand-alone mode) appliance. In the case of combined "linked set" appliances, the entire display of the first appliance in the linked set group immediately changes. After a user definable delay, or system default delay, the rest of the displayed sections are changed and new data is displayed. During the transition, a bar (a gray or colored wide line) is displayed between the old display and new. This allows the musician to quickly observe the music transition process and determine which transitions have occurred.

A third transition method is a reveal page-turn, where the new sections progressively reveal themselves to replace the older display from the first section to the last in a smooth transition. The music does not move, the new music simply progressively covers up the old. The speed of the transition can be controlled by the musician, or controlled by a system default value.

The display options provided include not only the one screen and two screen options and multiple screen options where there are more than two screens, but additionally provide partial page (e.g. marching band or half screen) options as well as multiple cascaded screen options.

The presentation upon the display apparatus for music is at least one of the same page as equivalent printed music, a subsection of the equivalent printed music, and a completely repaginated version of the equivalent printed music. Alternatively, or additionally, text, scripts, or other image data can be displayed.

Where music data has predefined sections defined (such as definition of predefined sections embedded within the music data), the display shows one or more of the predefined sections in a logical order.

For a two-page display, the presentation upon the display apparatus can range from a portion of a page of the printed music equivalent to two or more pages of the equivalent printed music.

The format of the displayed music can be identical to or vary from the printed sheet music from which the displayed music is derived. If the displayed music is divided into sections, e.g., individual systems (a complete set of staff lines), measures or notes, a subsection of the printed sheet music, then the music needs to have predefined sections in order for the display to show single or multiple sections in a logical order. The appliance interprets the size and logical order of the sections in order to currently determine and anticipate subsequent numbers of sections and measures to display on the screen. Thus, a screen can display two or more pages, or a portion (or portions) of a single page (or from multiple pages) of the printed music score or composition from which the music is derived. The screen can display music that has been re-paginated to include a different number of measures or sections than are printed per page on the corresponding hard-copy of the music.

The sections can be advanced via several alternative methods. For example, the screen can have a touch-sensitive surface, enabling the user to touch the right side of the screen and cause the sections to advance instead of turning a physical page. Touching the left side of the screen will cause the sections to go to the previous logical sections or pages.

Alternatively, a physical button or a switch can be used to advance or revisit the sections to be displayed. The physical button or switch may be located on the appliance or connected external to the appliance for the operation by the hand, foot, leg, arm, etc. Optionally, an external signal can trigger page turn on the appliance.

Additionally, the sections can be advanced by an external signal from one appliance to another. When appliances are linked as a set and are networked and synchronized, in the linked mode one appliance displays the even pages (typically left side) and the other appliance displays the odd pages (typically right side)—like a book. For example, the two coordinated appliances in a linked set respond to the signals from each other and display the appropriate sections; though their respective display formats may vary. In a synchronized mode, the left side of the "screen" is actually the entire left display, because the user perceives the "screen" to be the composite of all the appliances used to display the music. In a synchronized mode, the right side of the "screen" is actually the entire right display, because the user perceives the "screen" to be the composite of all the appliances used to display the music. A signal sent to advance the displayed images causes all synchronized appliances to advance the same number of pages as are displayed at the time the signal is sent. For instance, if two pages are displayed at the time a signal is sent to advance, then the next two pages of the same music score will be the displayed. Alternatively, the user can set up page turns to be one (or other number of) page(s) at a time on the linked set.

The display can advance the music by page option, or by a user selection of one of many options (e.g., scrolling, tablature, video graphic, tutorial display, etc.).

Figure 18:
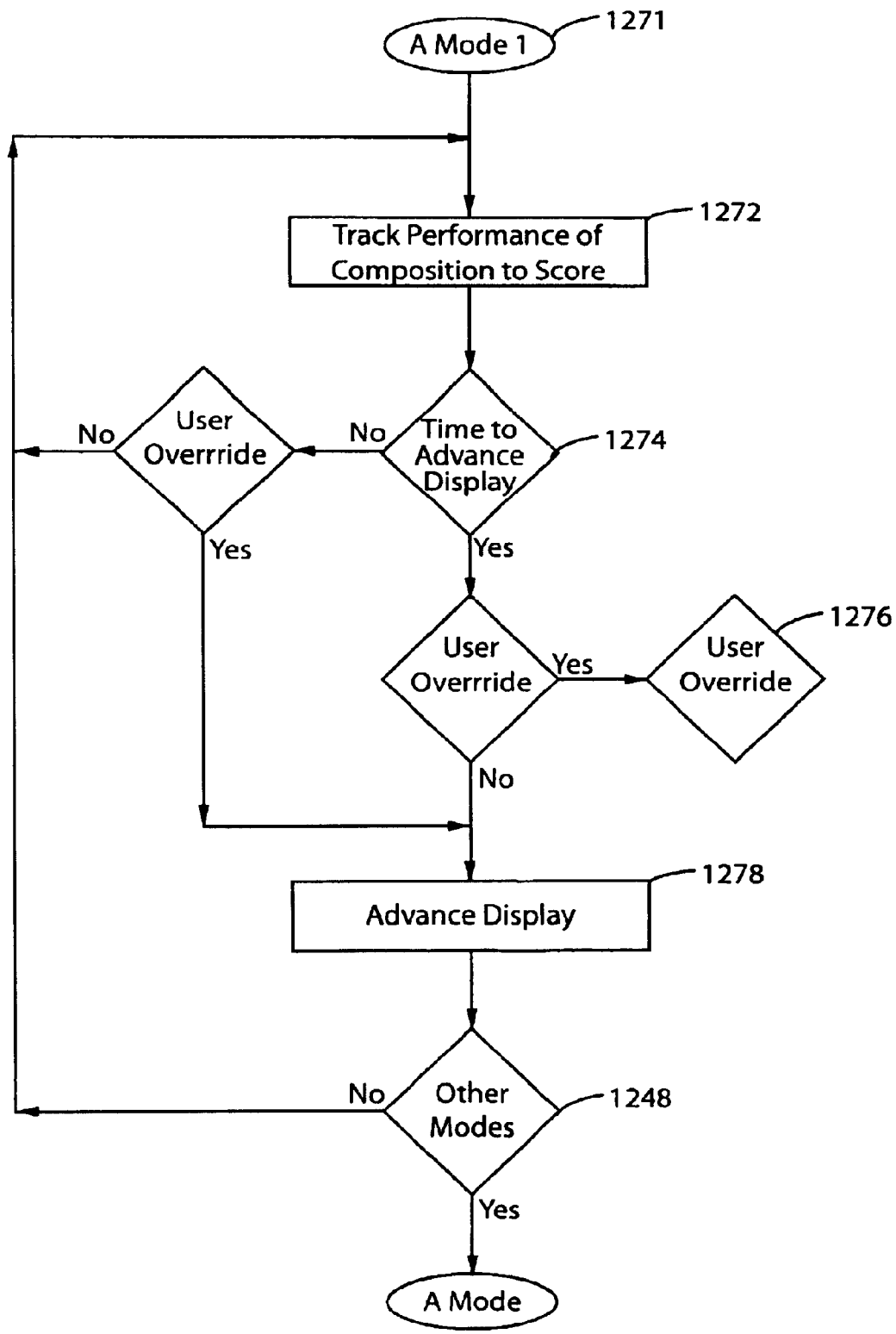
FIG. 18 illustrates the automated mode 1 for auto-advance operation (1242) of FIG. 15A, where the user has selected an auto-advance performance mode, "A Mode 1" (1271), wherein the system tracks the performance by the user of the composition to the music notation (e.g. composition or score) (1272).

Referring to FIG. 18, the automated mode 1 for auto-advance operation (1242) of FIG. 15A is illustrated, where the user has selected an auto-advance performance mode. In this mode "A Mode 1" (1271), the system tracks the performance by the user of the composition to the music notation (e.g. composition or score) (1272). Performance refers to the actual performance by an individual person (or people) who is (are) reading the musical score upon or composition which the performance is based. Whether that score is in tablature format, staff and clef and note notation, or some other format, the system generates appropriate signals to permit comparison of the user's performance to the musical score.

Figure 19:
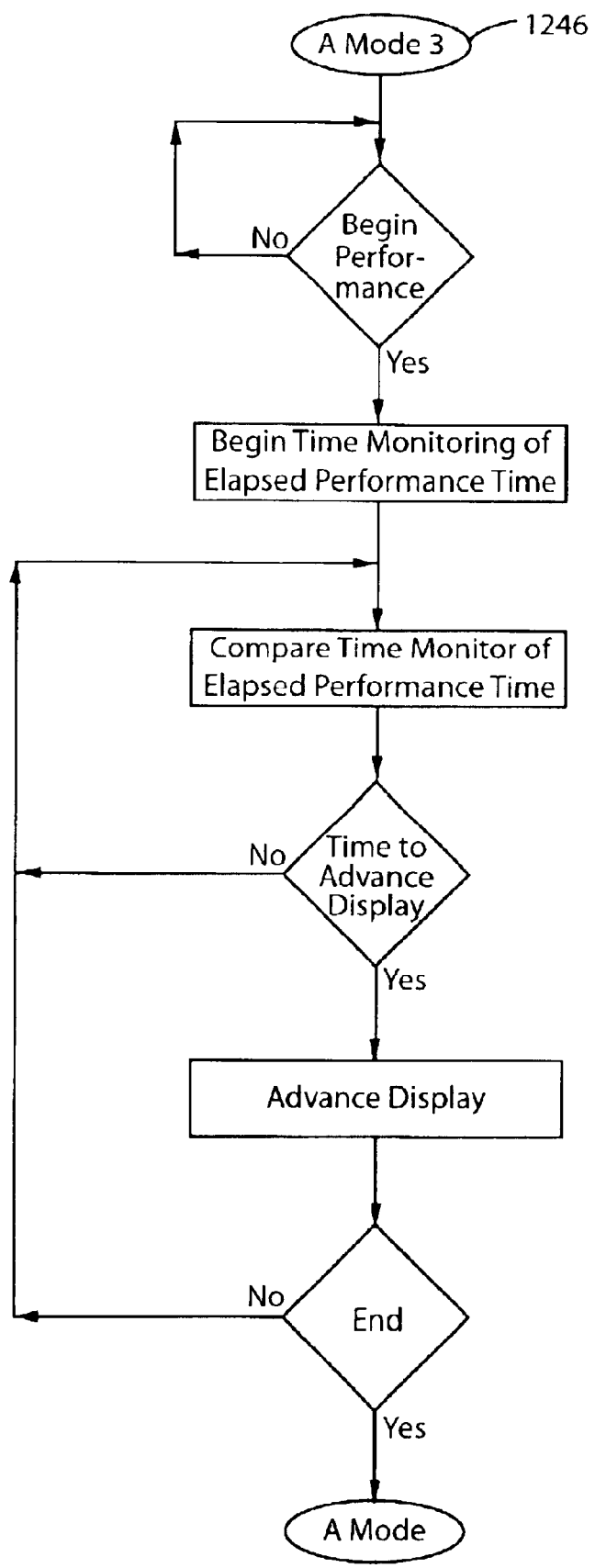
FIG. 19 illustrates automated mode 3 "A Mode 3", the performance mode (1246) wherein the operation is as in automated mode 1 (auto-advance mode) except that no user over-ride is permitted and wherein its primary purpose is to accompany the performer during the entire performance of a score as an automated page turner.

As illustrated in FIG. 19, automated mode 3 "A Mode 3" is the performance mode (1246). In this mode, the operation is as in automated mode 1 (auto-advance mode) except that no user over-ride is permitted. Its primary purpose is to accompany the performer during the entire performance of a score as an automated page turner. The tracking of the "page turning" to the performance can optionally be based on inputs or criteria independent of a performer's actual performance input (e.g., microphone), such as a built-in metronome clock, a central control (e.g., a conductor or special user input), an externally provided page turn signal, etc. In one embodiment, the appliance provides for a manual override mode which provides for an emergency stop, and switch over to Manual Mode. Additionally, performance characteristics can be tracked, computed, and reported as in the teaching and training mode. Training feedback can optionally be provided real-time, or subsequent to completion of performance, to assist the performer as in the training mode. Alternatively, the score can be presented in a moving score mode (e.g., vertically, horizontally, or otherwise) or a linear presentation as opposed to a page turning display.

Figure 20:
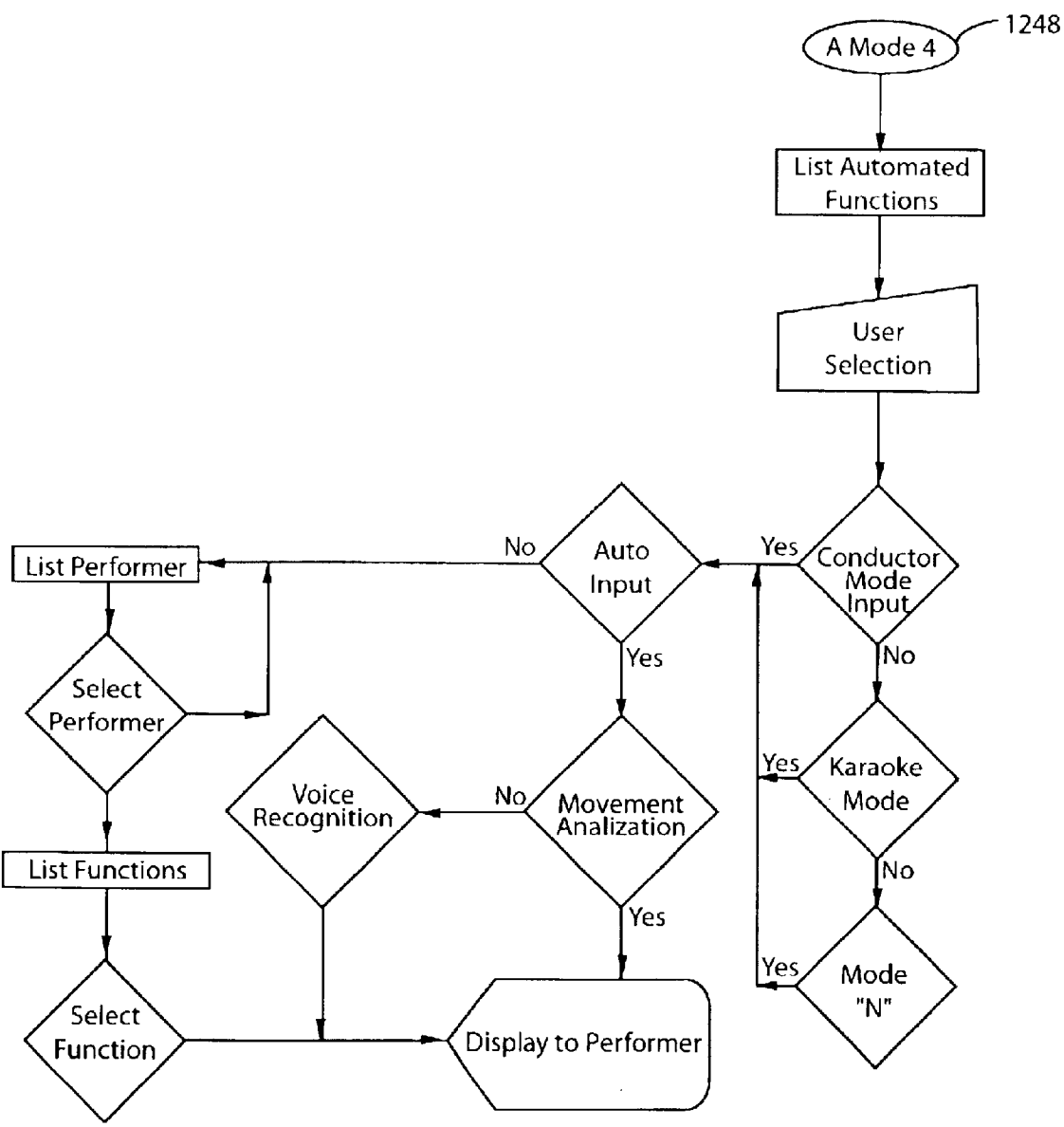
FIG. 20 illustrates the operation of automated mode 4 ("A Mode 4") which provides for the processing of other automated functions selected by the system, such as conductor mode, karaoke mode, etc.

FIG. 20 shows the operation of automated mode 4 ("A Mode 4") which provides for the processing of other automated functions selected by the system. These modes can include conductor mode, karaoke mode, etc.

Referring again to FIG. 18, in accordance with another aspect of the present invention, means are provided for moving through the printed (displayed) notation of the music in synchronization with the live performance from the displayed musical notation.

Based on a comparison, a decision is made pursuant to selection criteria programmed into the system (such as the rate at which the piece is being played, the time signature, the tempo, the rhythm, and the advancement of the music on the available display), the display presentation is advanced (1274 and 1278). In some cases, the music might move backwards, such as with a repeat or a D. S. Coda. The presentation of the display tracks the performance to permit smooth, uninterrupted playing or singing. The capability can be provided for the user to over-ride this auto-advance, such as for practicing where it is desired to keep going back over sections. In this case, a user over-ride option (1276) is permitted to alter the automated operation. Upon activation or cessation of user over-ride, the system can be programmed to stop, to automatically return to the regular auto-advance mode, to jump to a defined location, or to process other auto-modes (1270) of FIG. 15A.

The override can cause the progression to go backwards or forwards in the music score, irrespective of the normal progression of reading of it. The performance mode Auto-Mode blocks the user override to permit performance according to proper material timing. This automatically moves through the musical score as written and preferably shows an indication of metronome time and an indication of the proper place in the score where the performer should be for that instrument at any specific time. This is especially valuable in a conductor mode of networked communication, where a conductor couples to one or more music workstations. The conductor (or Librarian) can optionally be provided override, stop, start, and tempo change capabilities as a "super-user" in all modes.

Additional types of inputs that can initiate a "page turn" include voice or sound recognition apparatus built into the electronic music stand system. This sound recognition apparatus has the ability to use pattern recognition specific to the sound, or specific to the user voice and/or words being spoken (for extremely high accuracy). Of course, any type of user actuated device such as a foot or hand switch, or head motion device, or sound or voice recognition system touch screen input, etc. In a preferred embodiment, is selectively permitted to control the activation or override of the normal progression of the music's play.

As illustrated in FIG. 14, in one embodiment, the user input means (411) is comprised of a key switch device, such as a touch membrane keypad or capacitance touch surface. In a preferred embodiment, the user input is provided via a touch screen display technology. Touch screen technology permits the programmable display of user interactive icons and legends including text and graphics making possible unlimited customization of user input structure according to task needs. Thus, to create a musician intuitive interface, specific switches or sequences of touches to the touch screen can be associated with common use icons from the task being performed in conjunction with words to provide ultimate clarity. User error is virtually eliminated, with the aid of automatic entry error detection, defined fields, mandatory fields, etc.

Alternatively, microphone input (527) can provide for coupling of user speech to a processing subsystem (such as a Master Music Controller (415)) or processor sub-system ((280) of FIG. 2) that uses any of a number of commercially available and well-known speech recognition algorithms. These algorithms provide for speech recognition input control, either solely or as a supplement to touch screen or other tactile input mechanisms.

Voice recognition and response to conductor (or other person's) commentary can supplement the system. The system could record the message, interpret to whom the conductor directed the message and convey it audibly or translate it into a text or icon display as a part of the system's audiovisual presentation. Alternatively, or additionally, instant messaging, can be provided via voice recognition, keyboard input, touch screen input, audio input, or a combination of these.

In accordance with one aspect of the present invention, means are provided to accept inputs from one or more sources that initiates a "page turn". Types of inputs include conventional touch input apparatus (such as key switches or capacitive touch pads), motion sensing gear, sound recognition, external control signaling, and automatically when operating in the operational mode of Auto Mode. The motion sensing gear can be for a portion of the performer's body, such as a head tilt sensor or an optical eye movement sensor, etc.

A new form of communication is created in that both the process of communicating via standard notation is respected and adhered to, while at the same time permitting interaction and communication of music media signals.

The input of monitored movement data is provided to the user workstation, permitting precise mechanics training such as finger position, the angle of striking of strings relative to the neck of a violin (or guitar, etc.) or they can be used to permit the virtual performance of music by a performer using a virtual link apparatus such as a virtual reality glove or bow and/or pick movement detection apparatus. The user can then perform a piece with their own personalization without any musical instrument in fact.

For example, the guitar portion for a piece of music could be displayed in notation form and actually performed according to the timing of movements of the user's fingers (either actual fret positions, or only timing information). To add further reality, a mock guitar, keyboard, flute, or other instrument can be used and combined with virtual effects to provide for music performance and personalization. Thus, for entertainment purposes, users could perform as part of a symphony orchestra playing a violin portion. If they performed out of time, they would hear their instrument's performance out of synch with the rest of the orchestra's performance.

Figure 21:
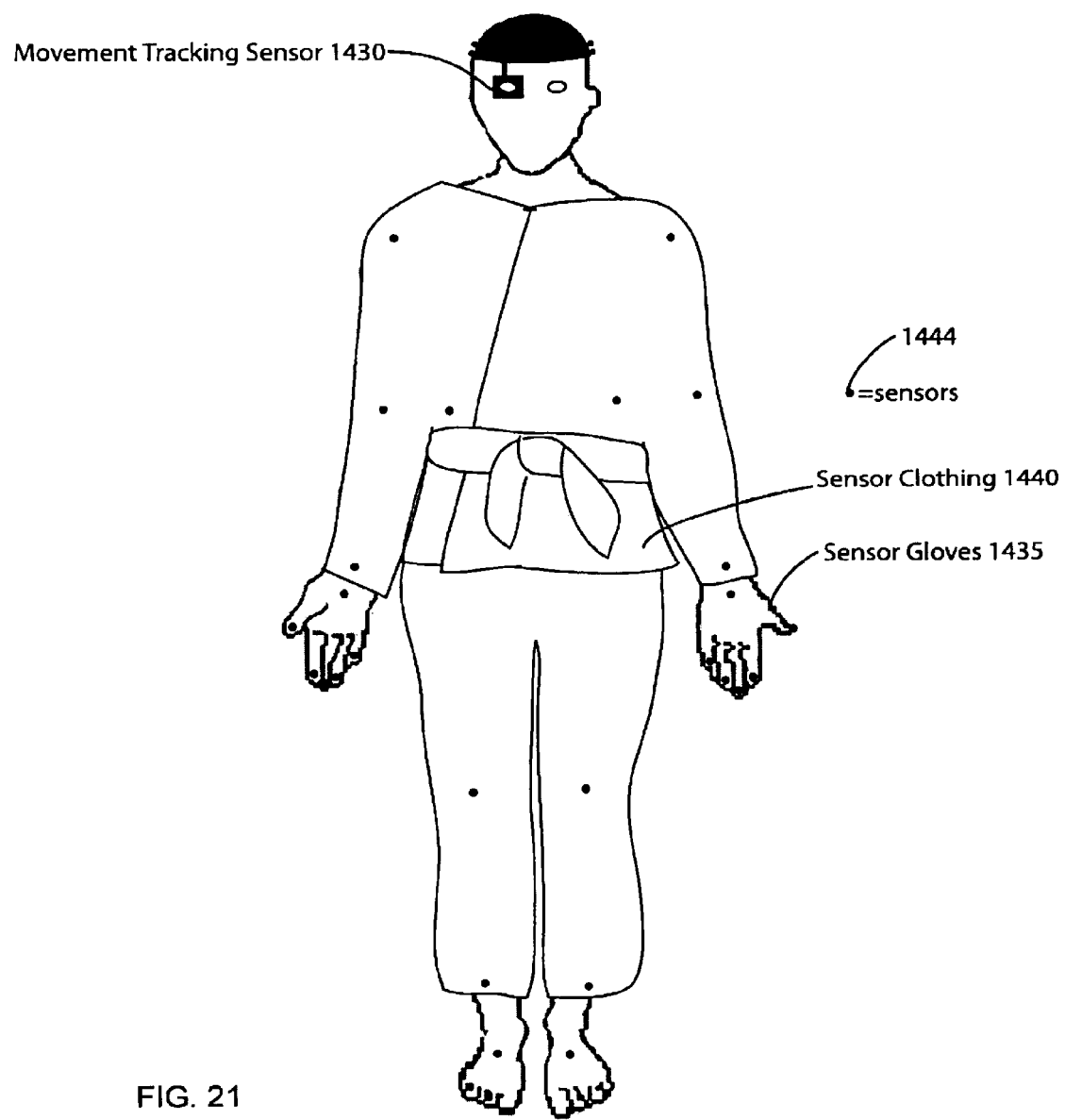
FIG. 21 illustrates a conductor, stage hand, or other person with a sensor glove on each hand (1435) and a head and eye movement monitor (1430), and also illustrates the conductor wearing full body sensor equipment (1440).
Figure 22:
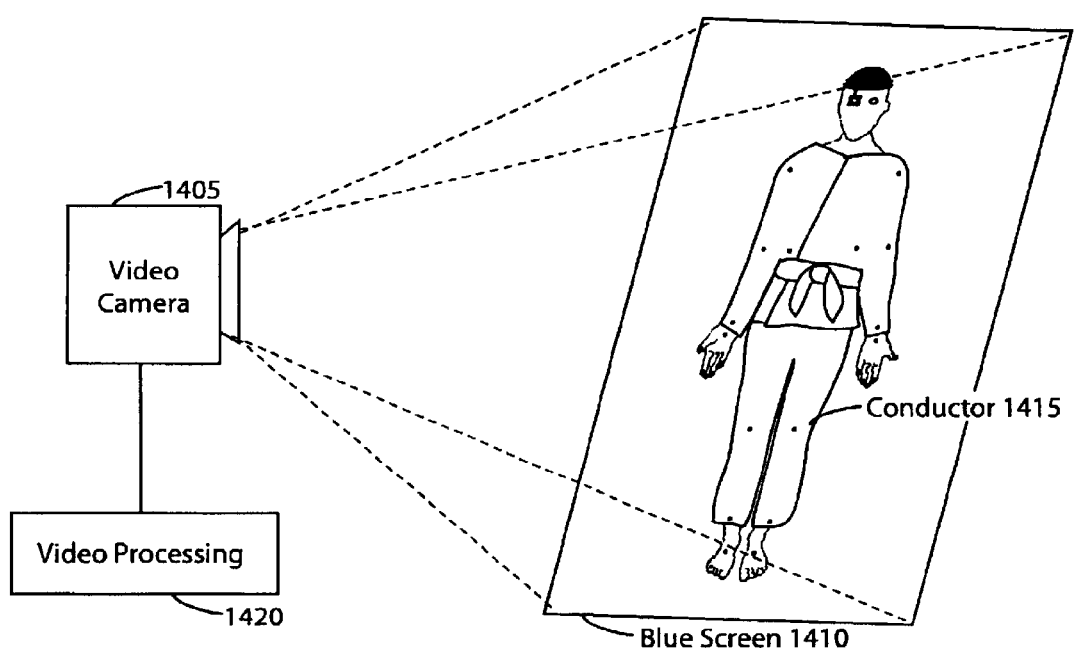
FIG. 22 illustrates an embodiment wherein only the gloves (1435) or body sensors (1444) are used, and the movement of the glove or sensors is captured by a video system.

FIG. 21 illustrates a conductor, stage hand, or other person with a sensor glove on each hand (1435) and a head and eye movement monitor (1430). The figure also illustrates the conductor wearing full body sensor equipment (1440). Either embodiment or combined embodiments can be used to map body movements. If only the gloves (1435) or body sensors (1444) are used, the movement of the glove or sensors can be captured by a video system, as illustrated in FIG. 22.

In one embodiment, a motion sensor subsystem (422) monitors motion of a target person and responds with signal outputs in accordance with predefined movement interpretation characteristics parameters, such as for a conductor.

In conductor mode, a conductor can control communications of signals to his or her performer (such as "increase volume", or "increase tempo", or "play staccato"). Icons can be provided where the conductor simply touches a touch screen (or other input mechanisms) to supplement his hand and body motions to permit more effective communication with the performers. Alternatively, as illustrated in FIGS. 9 and 10, in a more advanced system version, the conductor's movements are first learned by a monitoring system, based on user definition and assignment of meanings for movement to provide an expert knowledge database.

This system also provides for tracking of movement input. As illustrated in FIG. 22, a video camera (1405) provides for input of the conductor (1415) against a backdrop (e.g., blue screen) (1410), which is processed by video processing unit (1420), or, alternatively as shown in FIG. 21, via body glove technology (gloves (1435) or sensors (1444) or sensor clothing (1440) or head or eye movement tracking sensor (1430) (such as used in virtual reality, flight simulation, avionics equipments (such as jets and space travel), and sports players for analyzing movement) to provide the necessary movement input signals. This movement input is analyzed utilizing the expert knowledge database (either learned or preprogrammed) to automatically generate a display (video and/or audio) to provide local visual and/or audio reinforcement on the local display (such as overlaying on a then unused portion of the music score display as a picture in a picture) to permit audio and video reinforcement of the conductor's body language. Thus, for example, "a hush" body language signal that is directed towards a particular section of the orchestra would automatically be interpreted to cause the system to indicate, and only on that particular section's respective displays, a message (e.g., a big face with a finger in front of it making a hush sound, and possibly with a "hush" sound simultaneously output from a speaker (in rehearsal mode)). The conductor mode provides many benefits to performance and communication.

There are numerous ways to embody the conductor movement interpretation system. As illustrated in FIGS. 21 and 22, one is utilizing the body movement detection apparatus prevalent in virtual reality, sports medicine, etc., as discussed above, to identify specific movement patterns or signal parameters associated with certain movement patterns, to initiate a display presentation, audio, video, or audiovisual to provide a presentation associated with the movement of the conductor. Alternatively, other techniques can be used such as taking the video feed from a video camera or other video source (e.g. VCR) and having the conductor interpret his movements and assign them unique meanings, to create a lexicon of his movements and corresponding meaning.

For example, rapid downward movements of the hand from up to down, in a certain manner, indicate "decrease the volume." When he points at a particular section at the same time as he is doing that, he is indicating that only that orchestra section is to reduce volume. In this manner, either camera input of movements, glove sensing of movements, or other techniques (such as audio, ultrasonic, etc.) can be used to track movement to permit associated meanings to be attached or indexed to particular signal parameters or parametric signals of the meaning of the movement parameters as provided by the conductor input device. For example, in the case of the virtual reality glove, that input would be the signal output of the glove as interpreted by associated software in a processor (such as a PC or a MAC). Alternatively, for example, in the case of video camera input, it could be pattern recognition or analog or digital signal comparison to determine the presence of certain signal patterns indicating to the system to initiate automatic communication of a conductor presentation. In so doing, the conductor is able to rapidly convey his meaning, focus it to a particular group of instruments, and be done with it. He doesn't have to focus very long or concentrate to make sure they've gotten his signal. Instead he can focus on listening to see if they got his message.

Simple things, like looking for the conductor's rapid hand movements, focusing on specific hand movement areas, facial and head movement, arm movements, and body language can all be programmed into the recognition knowledge base. Technology for complete mapping of body movement that are utilized in making video games of today are illustrated in Video Systems magazine, page 42, October 1995, Vol. 21, No. 11, and NEXT Generation magazine, pages 49–54, October 1995, both incorporated herein by reference.

As illustrated in FIG. 21, the conductor wears a sensor equipped body suit (1440) and gloves (1435). In another embodiment, the conductor wears only the sensor-equipped gloves (1435) of FIG. 9. In still another embodiment, the conductor's movements are picked up by the video camera ((1405) of FIG. 22) and processed, without using a sensor suit.

FIG. 22 illustrates a video camera (1405) and a standing conductor (1415) (or performing musician to be tracked or virtually linked to perform), with or without a blue screen (1410) behind him. The video camera (1405) feeds a video signal to the video processing system (1420) that utilizes signal processing to provide signal pattern recognition capability. The blue in the screen is filtered out in the signal processing, such as by an Ultimate or other process.

Other methods that capture motion rely on specialized sensors or markers (1444) placed on a performer's joints, such as via a sensor body suit (1440). Once motion has been filmed or analyzed, a data set is produced to interpret that movement into Cartesian co-ordinates. These co-ordinates provide the spatial location of each of those markers. This information is then cleaned up and can be input to an animation package, or fed to a processing system.

The use of virtual reality technology, including motion sensors and body gloves, permits monitoring of various other things (as shown in FIG. 21). For example, as shown in FIG. 22, a camera in conjunction with analysis logic, such as expert software, can monitor motion of role model (e.g. teacher) behavior and compare performer (e.g. student) behavior. Hand, finger, arm, leg, eye, head, body, and mouth movements can all be monitored and constructive critical feedback can be accumulated, analyzed, and fed back to the user or teacher, for performer training, or performances, or for conductor communication.

In any event, having now obtained knowledge related to recognition of the movements, the system can interpret them and utilize them to convey presentation information to the ensemble or orchestra or studio members, or to analyze a performer's movements, or to permit a virtual performance. One example would be a large screen television or multiple large screen televisions for viewing by the members of the viewing group. Alternatively, each music stand could provide for a picture in picture display of special movements of the conductor in areas of the display where music is not currently being played. Since the stand can have the intelligence to compare the performed music to the played music, that embodiment permits display of the message in potions of the music display area which have already been performed or are not going to be performed for some time (e.g., at least ten seconds in either direction; other criteria could alternatively be used, and can be set up for desired characteristics of the performing environment.)

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method for providing for a video display responsive to image data related to a visual presentation, stored in an image database, the method comprising:

defining a selected page of image data from the image database;

preparing display data to generate the visual presentation responsive to the image data for the selected page;

defining first slices of the display data for a first orientation;

defining in a second orientation second slices of the first slices, grouping the second slices to define logical sections;

ordering the first slices from beginning to end;

ordering the second slices from beginning to end;

mapping the first slices, the second slices, the logical sections, and the ordering of the first slices and of the second slices;

storing the mapping in a memory for selective retrieval of selected display data; and providing for the video display of the visual presentation responsive to the mapping and the selected display data.

2. The method as in claim 1, wherein the first orientation equals vertical, wherein the second orientation equals horizontal, wherein the beginning equals top for vertical, wherein the end equals bottom for vertical, wherein the beginning equals left side for horizontal, and wherein the end equals right side for horizontal.

3. The method as in claim 1, wherein the step of providing for the display of the image is further comprised of:

defining a display width and display height for the windows to be used for display of the image; and selecting from the logical sections to determine a best fit to the display width and the display height responsive to the mapping and the display data;

and displaying selected ones of the logical sections on the video display to provide a best fit responsive to the selecting.

4. The method as in claim 1, further comprising:

providing user-defined page-display parameters for viewing the selected display data;

ordering the logical sections responsive to the user-selected page display parameters;

generating a user mapping data file comprising the ordering of the logical sections; and providing for the video display of the selected display data responsive to the mapping.

5. The method as in claim 1, further comprising:

selecting portions of the selected display data and the respective selected logical section, as a first logical section for bookmarking a first bookmark;

selecting a specific location within the portions;

associating an associated identification (ID) with the specific locations;

providing bookmark information;

associating the bookmark information with the associated ID and the specific location;

providing for video display of the specific location responsive to user input based selection of the respective bookmark information.

6. The method as in claim 5, further comprising:

associating the bookmark information and the associated ID with a second bookmark associated with a second logical section of the logical sections, other than the selected first logical sections, for the bookmark information;

selecting the first bookmark responsive to the user input;

searching for the second bookmark having the associated ID of the respective first bookmark, responsive to the selecting of the first bookmark;

obtaining specific locations associated with the second bookmark responsive to the searching; and providing for visual display of the display data for the specific locations associated with the second bookmark.

7. The method as in claim 5, further comprising:

providing for user input of (a) selections for bookmarking, (b) specific locations and (c) the bookmark information, via at least one of a user touch-screen input display, and at least one switch input.

8. The method as in claim 5, further comprising:

providing a bookmark selection mode for displaying as a video display the bookmark information and the respective associated ID; and for providing for selection of the respective specific locations responsive to a bookmark selection input; and displaying a music visual display for the selected specific location.

9. The method as in claim 8, further comprising:

providing a video display of a table of bookmarks representative of the bookmark information for a plurality of the bookmarked locations.

10. The method as in claim 9, further comprising:

structuring a layout of a plurality of bookmarks in the video display for the table of bookmarks so as to appear within the video display of the bookmark information in the table of bookmarks located in a structured visual physical juxtaposition and visually related so as to convey information content by relative placement of the bookmarks in the video display.

11. The method as in claim 10, wherein the structured layout provides the information content relating to major movements, minor movements, relatively close sections, and relatively far sections via color and position of the bookmarks in the table of in the bookmarks in the video display.

12. The method, as in claim 1, wherein the visual presentation is of music, wherein the image data is music data, and wherein the image database is a music database.

13. The method as in claim 1, wherein the page-display parameters are at least one of page-size, orientation and resolution.

14. The method as in claim 1, wherein the selected visual presentation data is communicated to a remote memory.

15. The method as in claim 1, further comprising:

storing data for the defined logical sections as respective addresses in the memory, wherein the addresses point to the selected display data;

mapping the addresses in accordance with the ordering of the logical sections;

generating a mapping data file comprising the mapping of the addresses;

storing the mapping data file in the memory; and utilizing the mapping data file to reconstruct the logical sections.

16. The method as in claim 1, further comprising:

providing an overlay of user-defined annotations atop the video dispaly of a respective area of selected data for viewing;

generating a mapping of the user-defined annotations to the respective selected dispaly data; and providing for the video display of the selected display data with the user- defined annotations responsive to the mapping.

17. The method as in claim 16, further comprising:

storing data for the defined logical sections as respective addresses in a memory, wherein the addresses point to the selected dispaly data;

mapping the addresses in accordance with the ordering of the logical sections;

generating a mapping data file comprising the mapping of the addresses;

storing the mapping data file in a memory;

storing the user-defined annotations as user-defined data associated with respective selected display data; and utilizing the mapping data file and the user-defined data to reconstruct a visual presentation of the logical sections with the user-defined annotations overlaid atop the respective area.

18. The method as in claim 17, further comprising:

selecting a specific user as a selected specific user from a plurality of specific users;

associating the user-defined annotations for the selected specific user with the selected specific user; and providing for selective video display of the respective user-defined annotations for the selected specific user responsive to the selecting of the specific user from the plurality of users.

19. An image display system comprising:

a source of an image database providing image data representative of visual images;

providing display data for generating a video presentation responsive to the image data;

a video display providing a video presentation having a definable display size;

a processing subsystem comprised of a processor, memory providing instruction data and other data; and a user input providing at least for user selection of the display size, wherein the processor is responsive to the user selection of the display size and to the instruction data, providing for successive sub-sectioning of a composition of the display data providing for definition of a page of display data; definition of first slices of the display data for a first orientation; and definition of a second orientation of second slice of the first slices to define logical sections;

wherein the processor provides for ordering the first slices from beginning to end; and then ordering the second slices from beginning to end;

wherein the processor provides for storing in the memory a mapping of the first slices and of the second slices for selective retrieval; and wherein the video display provides a visual presentation of the visual images responsive to the mapping.

20. The system as in claim 19, wherein the visual images are representative of visual images of music notation.

21. The system as in claim 19, wherein the visual images are representative of visual images of text.

22. The system as in claim 19, wherein the first orientation equals vertical and the second orientation equals horizontal; wherein the beginning equals top for vertical; wherein the end equals bottom for vertical; and wherein the beginning equals left side for horizontal, and wherein the end equals right side for horizontal.

23. The system as in claim 19, wherein the user selection of the display size is utilized in defining a maximum display width and a maximum display height for the video presentation; wherein selected ones of the logical sections are selected to determine a best fit to the maximum display width and the maximum display height responsive to the mapping; and wherein the selected ones of the logical sections are provided as the video presentation on the video display so as to provide a best fit.

24. The system as in claim 19, wherein responsive to the user input of selecting portions of the image data of the selected logical sections for bookmarking, and selecting a specific location within the portions and providing bookmark information, the system associates an associated identification (ID) with the specific location; and wherein the system further provides for associating the bookmark information with the associated ID and the specific location; wherein thereafter the processor subsystem is responsive to the user input, to provide for selective video display of the specific location responsive to user input based on the respective bookmark information.

25. The system as in claim 24, wherein the bookmark information is associated with a second associated ID; wherein the system is responsive to the user input, for selecting a first bookmark; wherein the processing subsystem searches for a second bookmark having a respective first associated ID equal to the second associated ID of the respective first bookmark, responsive to the selecting of the first bookmark, to obtain the specific locations associated with the second bookmark responsive to the searching; and wherein the system provides a video display of the visual presentation for the specific location associated with the second bookmark.

26. The system as in claim 24, wherein the user input provides for selection of bookmarking, identification of specific locations and entry of bookmark information via at least one of a user touch-screen input display, at least one switch input, and voice recognition.

27. The system as in claim 24, wherein the system provides a bookmark selection mode for displaying the bookmark information and the respective associated ID;
wherein the user input provides a bookmark selection input; wherein selection of the specific location is responsive to the bookmark selection input; and wherein the video display provides a video presentation for the selected specific locations.

28. The system as in claim 27, wherein the system further provides a video presentation for a table of bookmarks representative of the bookmark information for at least some of the bookmarked locations.

29. The system as in claim 28, wherein there are a plurality of bookmarks having respective associated bookmark information and further having respective associated bookmark locations, wherein the processing subsystem provides for structuring for display a layout of at least some of the bookmarks in the video presentation of the table of bookmarks in a relationship to convey information content by relative placement of the respective bookmarks to one another in the video presentation.

30. The system as in claim 29, wherein the bookmarks are displayed in colors, wherein the color of the bookmarks in the video presentation is utilized in the structuring the layout of the bookmarks to convey relative position of ordering of the video presentation associated with the respective bookmarks to one another.

31. The system as in claim 29, wherein the structured layout provides information content relating to relative importance of the specific location as to relatively close sections, and relatively far sections, via position in the video presentation display of the respective bookmarks in the table of bookmarks in the video presentation.

32. The system as in claim 30, wherein the structured layout in the video presentation of the bookmark information provides information content relating to relative importance of the specific location as to relatively close sections, and relatively far sections, via color and juxtaposition in the display of the respective bookmarks in the table of bookmarks in the video presentation.

33. The system as in claim 19, further comprising: a network interface for communicating the selected display data to a remote system for video display.

34. A method of displaying a video presentation of performance notation for performance data comprising:
processing a defined page of the performance data to provide display data for generating the video presentation for the displaying of a visual page of the performance notation
defining display parameters;
selecting logical sections from the display data responsive to the display parameters;
determining logical ordering of the logical sections and defining advancement of display of the performance data responsive to the display parameters;
displaying the display data as a video display presentation responsive to the logical sections and the defined logical ordering.

35. The method as in claim 34, wherein the performance notation is music notation, and wherein the performance data is music data.

36. The method as in claim 34, wherein the performance notation is script and wherein the performance data generates a video display presentation of script pages.

37. The method as in claim 34, further comprising:
evaluating the performance data to find a largest logical section, responsive to the display parameters, and utilizing the largest logical section to define a scale utilized in providing the video presentation for other ones of the logical sections to be displayed; and providing a video display presentation responsive to the evaluating.

38. The method as in claim 34, further comprising:

providing for user definition of at least some of the display parameters.

39. The method as in claim 34, further comprising:

defining page-size and pagination of the video display presentation of the performance data responsive to the display parameters.

40. The method as in claim 34, further comprising:

altering the logical ordering of the logical sections responsive to display advancement control parameters; and advancing the display presentation responsive to the altering the logical ordering.

41. The method as in claim 40, wherein the display advancement control parameters are for navigating to specific ones of the logical sections and are of at least one of a repeat, a jump ahead, multiple branches and returns, a CODA, and a jump back, the method further comprising:

displaying the specific one of the logical sections on a video display responsive to the display advancement control parameters.

42. The method as in claim 34, further comprising:

initially defining page-size and pagination for the video display presentation of the display data responsive to a default ordering of the logical sections of the performance data.

43. The method as in claim 42, wherein the performance data is coupled from a source, the method further comprising:

initially defining the page-size and pagination for the default ordering of the logical sections of the display data responsive to parameters defined by the source.

44. The method as in claim 43, further comprising:

providing for user definition of at least some of the display parameters as user-defined parameters; and logically ordering and displaying the logical sections responsive to the user-defined parameters, rather than in the default ordering.

45. A method for processing and structuring data to provide for video display presentation thereof, the method comprising:

providing a database comprising at least one data file having plurality of pages of presentation data each having a corresponding video presentation which can be generated;

processing the presentation data for a selected one of the pages to generate respective display data for the respective corresponding video presentation;

defining the display data into defined pages having a given display resolution and a given size;

defining first slices, for each of the defined pages, of the display data for a first orientation;

defining second slices of each of the first slices to define logical sections;

ordering the first slices from beginning to end, ordering the second slices from beginning to end; and displaying a best-fit number of logical sections on each of the defined pages of the video presentation at the given display resolution and the given size.

46. The method as in claim 45, further comprising:

mapping of the first slices and the second slices, respectively, to the ordering of the first slices and the second slices, respectively.

47. The method as in claim 45, wherein the data file is music data, and wherein the video presentation is of pages of music notation.

48. The method as in claim 45, wherein:

the first orientation equals vertical, and the second orientation equals horizontal, where the beginning equals top for vertical, where the end equals bottom for vertical, where the beginning equals left side for horizontal, and where the end equals the right side for horizontal.

49. The method as in claim 45, wherein:

the first orientation equals horizontal, and the second orientation equals vertical, where the beginning equals top for vertical, where the end equals bottom for vertical, where the beginning equals right side for horizontal, and where the end equals the left side for horizontal.

50. A method for providing a video presentation display of music images responsive to music data in a music file from a music database, comprised of:

generating music image data utilized in the video presentation display responsive to the music data;

first defining logical pages of the music image data;

ordering the logical pages of music image data so as to be in a logical page order in correspondence to a defined page ordering parameter;

obtaining a first page;

defining first slices;

obtaining a first slice;

defining second slice for the first slice;

repeatedly obtaining a next first slice, and if found, defining second slices, until there are no remaining frames of the first slices and a completely sliced page is then completed; and mapping the first slices and the second slices in a logical ordering;

providing for generation of a video presentation display responsive to the mapping.

51. The method as in claim 50, wherein defining the first slices by at least one of:

obtaining user input to describe break points between the first slices; and automatically finding horizontal lines which cross blank portions of a current display page.

52. The method as in claim 51, further comprising:

obtaining user input to describe break points between the second slices to define the page ordering parameter.

53. The method as in claim 51, further comprising:

obtaining previously stored information associated with the current display page to define the page ordering parameter.

54. The method as in claim 51, further comprising:

automatically finding measures in the music image data to define the page ordering parameter.

55. The method as in claim 50, further comprising:

continuing processing when no more first slices are found to define the page as a completely sliced page, and proceeding to obtain a next page, and repeating the method until no further pages are available.

56. The method as in claim 50, further comprising:

ordering the second slices responsive to the page ordering parameter;

creating logical groups of the second slices by repeating the method until completed, by:

(a) first creating an empty logical group;

(b) getting a next ordered second slice, if available;

(c) processing to determine whether the next ordered second slice will fit on the video presentation display along with other second slices in the respective logical group;

(d) adding the respective next ordered second slice if it is determined that it will fit, and adding the slice to the respective logical group;

(e) retrieving the next ordered second slice;

(f) determining when the respective next ordered second slice cannot be added to the respective logical group and storing in a defined order the respective logical group in a local storage;

(g) determining when there are no more second slices to process, and storing in a defined order the respective logical group in the local storage; and;

providing for visual display of the logical groups of second slices in the defined order stored in the local storage.

57. The method as in claim 56, further comprising:

associating each of a plurality of bookmarks with various respective logical group locations on the pages;

selecting the bookmarks for display;

ordering the bookmarks in a same order as the logical groups are stored in local storage;

associating for every bookmark, a location on the respective logical page so that a respective bookmark is associated with a respective one of the logical groups when the respective bookmark falls within a displayable area of the video presentation display covered by the respective logical group.

58. The method as in claim 57, wherein each said bookmark has a respective type as one of a composition, bookmark, a section bookmark, and a simple bookmark, the method further comprising:

selecting one of the bookmarks;

checking the respective bookmark to determine its type and whether it is at least one of the composition bookmark indicating a beginning of the composition bookmark, the section bookmark and the simple bookmark;

treating all following logical blocks as a part of a same composition responsive to determining the type as the composition bookmarks until another composition bookmark is found;

treating all of the following logical blocks as a part of a section of the music data responsive to determining the type as a section bookmark until another section bookmark or a composition bookmark is found; and treating only a single one of the logical blocks as associated with a simple bookmark responsive to determining the type as a simple bookmark.

59. The method as in claim 58, further comprising:

creating a display list for video presentation of the composition bookmarks, the section bookmarks, and the simple bookmarks;

associating within the display list, a common display color with each of the types of bookmarks.

60. The method as in claim 59, further comprising:

determining whether a specific bookmark is associated with a respective logical block within a current displayed section;

displaying the bookmark as a black button in a list of bookmarks responsive to the determining the specific bookmark is associated with the respective logical block.

61. The method as in claim 57, further comprising:

associating an object with a selective one of the respective bookmarks;

associating the location of the selected one of the respective bookmarks with the respective objects; and associating the respective logical group for the selected one of the respective bookmarks with the respective object.

62. The method as in claim 61, further comprising:

providing a presentation responsive to the respective object concurrently with the display of the related logical groups.

63. The method as in claim 62, wherein the object is comprised of at least one of:

control data, a video image, a drawing component, a sound image, and a movie.

64. The method as in claim 61, further comprising:

initiating a defined action responsive to the object.

65. The method as in claim 64, wherein the defined action is responsive to an event, wherein the event is comprised of:

providing an initial presentation;

selecting one of the logical group and respective objects; and providing one of creation of and destruction of at least one of the logical groups and the respective objects from the stored information in the local storage.

66. The method as in claim 64, further comprising:

causing a specific logical block to be displayed responsive to the object, and sending information to another system causing a changing of state of an object of said another system.

* * * * *

UNITED STATES PATENT AND TRADEMARK OFFICE
CERTIFICATE OF CORRECTION

PATENT NO. : 7,098,392 B2
APPLICATION NO. : 10/353656
DATED : August 29, 2006
INVENTOR(S) : Sitrick et al.

It is certified that error appears in the above-identified patent and that said Letters Patent is hereby corrected as shown below:

Column 52, line 20, "orientation second" should read --orientation, second--.
Column 52, line 41, "for the win-" should read --for win- --.
Column 52, line 42, "image and" should read --image data and--.
Column 52, line 53, "page display" should read --page-display--.
Column 52, line 58, "claim 1" should read --claim 3--.
Column 52, line 64, "locations" should read --location--.
Column 53, line 11, "sections" should read --section--.
Column 53, line 30, "ID, and" should read --ID and--.
Column 53, line 31, "locations" should read --location--.
Column 53, line 51, "of in the bookmarks" should read --of bookmarks--.
Column 53, line 57, "claim 1" should read --claim 4--.
Column 53, line 60, "selected visual" should read --selected display data for the visual--.
Column 53, line 61, "presentation data is" should read --presentation is--.
Column 54, line 10, "dispaly" should read --display--.
Column 54, line 10, "selected data" should read --selected display data--.
Column 54, line 13, "dispaly" should read --display--.
Column 54, line 15, "user- defined" should read --user-defined--.
Column 54, line 20, "dispaly" should read --display--.
Column 54, line 58, "slice" should read --slices--.
Column 55, line 44, "input, for" should read --input for--.
Column 55, line 54, "location" should be --locations--.
Column 56, line 6, "locations" should read --location--.
Column 56, line 10, "bookmarked locations" should read --bookmarked specific locations--.
Column 56, line 47, "notation" should read --notation;--.

UNITED STATES PATENT AND TRADEMARK OFFICE
CERTIFICATE OF CORRECTION

PATENT NO. : 7,098,392 B2
APPLICATION NO. : 10/353656
DATED : August 29, 2006
INVENTOR(S) : Sitrick et al.

It is certified that error appears in the above-identified patent and that said Letters Patent is hereby corrected as shown below:

Column 57, line 47, "having plurality" should read --having a plurality--.
Column 58, line 13, "equals the right" should read --equals right--.
Column 58, line 20, "equals the left" should read --equals left--.
Column 58, line 28, "of music" should read --of the music--.
Column 58, line 34, "slice" should read --slices--.
Column 58, line 43, "wherein defining" should read --wherein the defining--.
Column 58, line 44, "slices by" should read --slices is by--.
Column 59, line 31, "in local" should read --in the local--.
Column 59, line 39, "composition," should read --composition--.
Column 59, line 50, "bookmarks" should read --bookmark--.
Column 60, line 21, "selective" should read --selected--.
Column 60, line 24, "objects" should read --object--.
Column 60, line 41, "group" should read --groups--.

Signed and Sealed this

First Day of January, 2008

JON W. DUDAS
*Director of the United States Patent and Trademark Office*

UNITED STATES PATENT AND TRADEMARK OFFICE
CERTIFICATE OF CORRECTION

PATENT NO. : 7,098,392 B2  Page 1 of 1
APPLICATION NO. : 10/353656
DATED : August 29, 2006
INVENTOR(S) : Sitrick et al.

It is certified that error appears in the above-identified patent and that said Letters Patent is hereby corrected as shown below:

Title Page Item (63), "Related U.S. Patent Application Data" Field, line 3,
"09/492,218, filed on Jan. 27, 2000, and a continuation-in"
should read:
--09/492,218, filed on Jan. 27, 2000, which is a continuation--

Title Page Item (63), "Related U.S. Patent Application Data" Field, line 4,
"-part of application No. 09/039,952, filed Mar. 16, 1998,"
should read:
--of application No. 09/039,952, filed Mar. 16, 1998,--

Column 1, line 10,
"continuation-in-part application of Ser. No. 09/039,952 filed"
should read
--continuation application of application Ser. No. 09/039,952 filed--

Signed and Sealed this

Thirty-first Day of March, 2009

JOHN DOLL
*Acting Director of the United States Patent and Trademark Office*